(12) United States Patent
Trustman et al.

(10) Patent No.: US 11,774,634 B2
(45) Date of Patent: Oct. 3, 2023

(54) SYSTEMS AND METHODS FOR DETERMINING SNOWPACK CHARACTERISTICS

(71) Applicant: Board of Regents of the Nevada System of Higher Education, on Behalf of the University of Nevada, Reno, Reno, NV (US)

(72) Inventors: Benjamin Trustman, Truckee, CA (US); Scotty Strachan, Reno, NV (US)

(73) Assignee: Board of Regents of the Nevada System of Higher Education, on behalf of the University of Nevada, Reno, Reno, NV (US)

(*) Notice: Subject to any disclaimer, the term of this patent is extended or adjusted under 35 U.S.C. 154(b) by 905 days.

(21) Appl. No.: 16/091,958

(22) PCT Filed: Apr. 7, 2017

(86) PCT No.: PCT/US2017/026690
§ 371 (c)(1),
(2) Date: Oct. 5, 2018

(87) PCT Pub. No.: WO2017/177189
PCT Pub. Date: Oct. 12, 2017

(65) Prior Publication Data
US 2019/0107646 A1 Apr. 11, 2019

Related U.S. Application Data

(60) Provisional application No. 62/320,172, filed on Apr. 8, 2016.

(51) Int. Cl.
*G01W 1/14* (2006.01)
*G01D 21/02* (2006.01)
(Continued)

(52) U.S. Cl.
CPC .............. *G01W 1/14* (2013.01); *G01D 21/02* (2013.01); *G01G 17/04* (2013.01); *G01N 5/00* (2013.01)

(58) Field of Classification Search
CPC .................................. G01W 1/14; G01G 17/04
See application file for complete search history.

(56) References Cited

U.S. PATENT DOCUMENTS 3,372,586 A * 3/1968 Chadwick ............... G01F 23/20
73/170.21
3,442,343 A * 5/1969 Marion ................... G01G 19/02
177/134
(Continued)

FOREIGN PATENT DOCUMENTS

EP      0984251      3/2000
KR      1772323 B1 * 4/2016

OTHER PUBLICATIONS

International Search Report and Written Opinion, dated Jul. 11, 2017, issued for PCT/US2017/026690, 10 pages.
(Continued)

*Primary Examiner* — Jamel E Williams
*Assistant Examiner* — Alex T Devito
(74) *Attorney, Agent, or Firm* — Klarquist Sparkman, LLP

(57) ABSTRACT

A system for determining snowpack characteristics includes a weight plate, at least one pressure sensor, and an inert plate surrounding the weight plate. The weight plate and the inert plate can be spaced apart from one another, and, in some cases, the weight plate has a perimeter and the inert plate surrounds the entirety of the perimeter of the weight plate with a gap formed therebetween.

13 Claims, 47 Drawing Sheets

(51) Int. Cl.
*G01N 5/00* (2006.01)
*G01G 17/04* (2006.01)

(56) References Cited

U.S. PATENT DOCUMENTS

| | | | | |
|---|---|---|---|---|
| 3,522,858 | A | * | 8/1970 | Christensen ............ G01W 1/14 |
| | | | | 177/208 |
| 3,975,641 | A | * | 8/1976 | Morrison ............... G01N 23/06 |
| | | | | 250/357.1 |
| 4,166,997 | A | | 9/1979 | Kistler |
| 5,313,022 | A | | 5/1994 | Piroozmandi et al. |
| 5,686,841 | A | * | 11/1997 | Stolarczyk ............. G01N 22/04 |
| | | | | 324/635 |
| 6,005,199 | A | | 12/1999 | Harada et al. |
| 6,832,522 | B2 | * | 12/2004 | Schaefer ................... G01L 1/20 |
| | | | | 73/715 |
| 2002/0194922 | A1 | * | 12/2002 | Schaefer ................... G01L 1/20 |
| | | | | 73/720 |
| 2003/0188590 | A1 | | 10/2003 | Lee, Jr. et al. |
| 2015/0232209 | A1 | * | 8/2015 | Jalenques ................ B65B 3/06 |
| | | | | 141/83 |

OTHER PUBLICATIONS

Johnson et al., "The influence of thermal, hydrologic, and snow deformation mechanisms on snow water equivalent pressure sensor accuracy," *Hydrological Processes* 16(18): 3529-3542, 2002.

* cited by examiner

SYSTEMS AND METHODS FOR DETERMINING SNOWPACK CHARACTERISTICS

CROSS REFERENCE TO RELATED APPLICATIONS

This is the U.S. National Stage of International Application No. PCT/US2017/026690, filed Apr. 7, 2017, which was published in English under PCT Article 21(2), which in turn claims the benefit of U.S. Provisional Application No. 62/320,172, filed Apr. 8, 2016. The provisional application is incorporated herein in its entirety.

STATEMENT OF GOVERNMENT SUPPORT

This invention was made with United States government support under grants EPS-0814372, 1230329, and IIA-1301726 awarded by the National Science Foundation; the United States government has certain rights in the invention.

FIELD

The present invention relates to water management systems, including systems and methods for determining snowpack characteristics.

BACKGROUND

Water from melting snow is a source of fresh water that is an integral resource in many regions worldwide. Runoff from mountainous terrain provides water for municipal, commercial, recreational uses and power generation. For example, in the Western United States, it is estimated that 40-70% of precipitation falls as snow and that snow melt is responsible for 80% of soil moisture and stream-flow. Furthermore, on an annual basis, snow is the largest fresh water reservoir supporting regional water use. Understanding both snow water equivalent (SWE), the amount of water in the snowpack, and spatial distribution patterns can be useful for informing water management decisions, such as reservoir management and water allocation for irrigation.

Spatial and temporal variability in snowpack dynamics, such as spatially different accumulation and melt, pose complications in quantification of snow distribution and, thus present challenges in both measurement-based and modeled estimations of water amounts. In particular, variability in snowpack density is under-studied, with snow depth measurements outnumbering snow density measurement by 30:1. Though snow depth has more variability, both in space and time, than density, there is still substantial variability in density even within samples taken only meters apart indicating that depth alone cannot be used to obtain SWE. For example, snow density can vary as much as 30% in samples taken as close as one meter. Because of this variability and the shortcomings of existing systems for measuring snowpack, more accurate methods and systems for determining snowpack and snowpack variability are needed.

SUMMARY

Various innovations are described herein for characterizing snowpack dynamics, including those related to the spatial and temporal variability of SWE. In some embodiments, the systems can provide continuous measurement of SWE using a novel pressure sensor. In some applications, the novel sensor can be smaller and less expensive than traditional pressure sensors, allowing for high density deployment.

In one embodiment, a system for determining snowpack characteristics is provided. The system can include a weight plate, at least one pressure sensor, and an inert plate surrounding the weight plate. The weight plate and the inert plate can be spaced apart from one another, and, in some cases, the weight plate has a perimeter and the inert plate surrounds the entirety of the perimeter of the weight plate with a gap formed therebetween.

In another embodiment, a method is provided for installing a sensor array of two or more units of the systems. The method can include collecting observation data from the sensory array and estimating snowpack using snow depth, density, and snow water equivalent (SWE) measurements.

The foregoing and other objects, features, and advantages of the invention will become more apparent from the following detailed description, which proceeds with reference to the accompanying figures.

DETAILED DESCRIPTION

Figure 1:
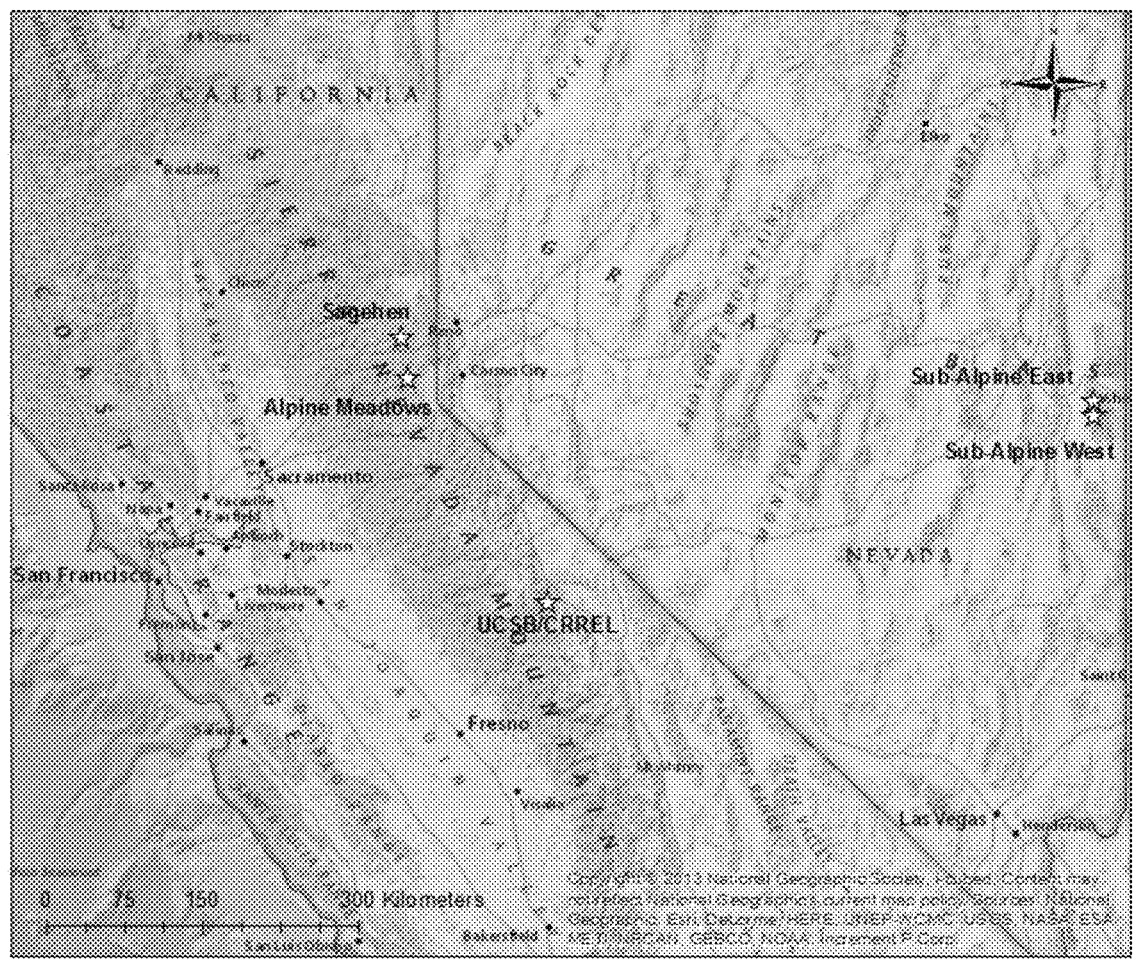
FIG. 1 is a map of locations for SWE pressure sensor testing.
Figure 2:
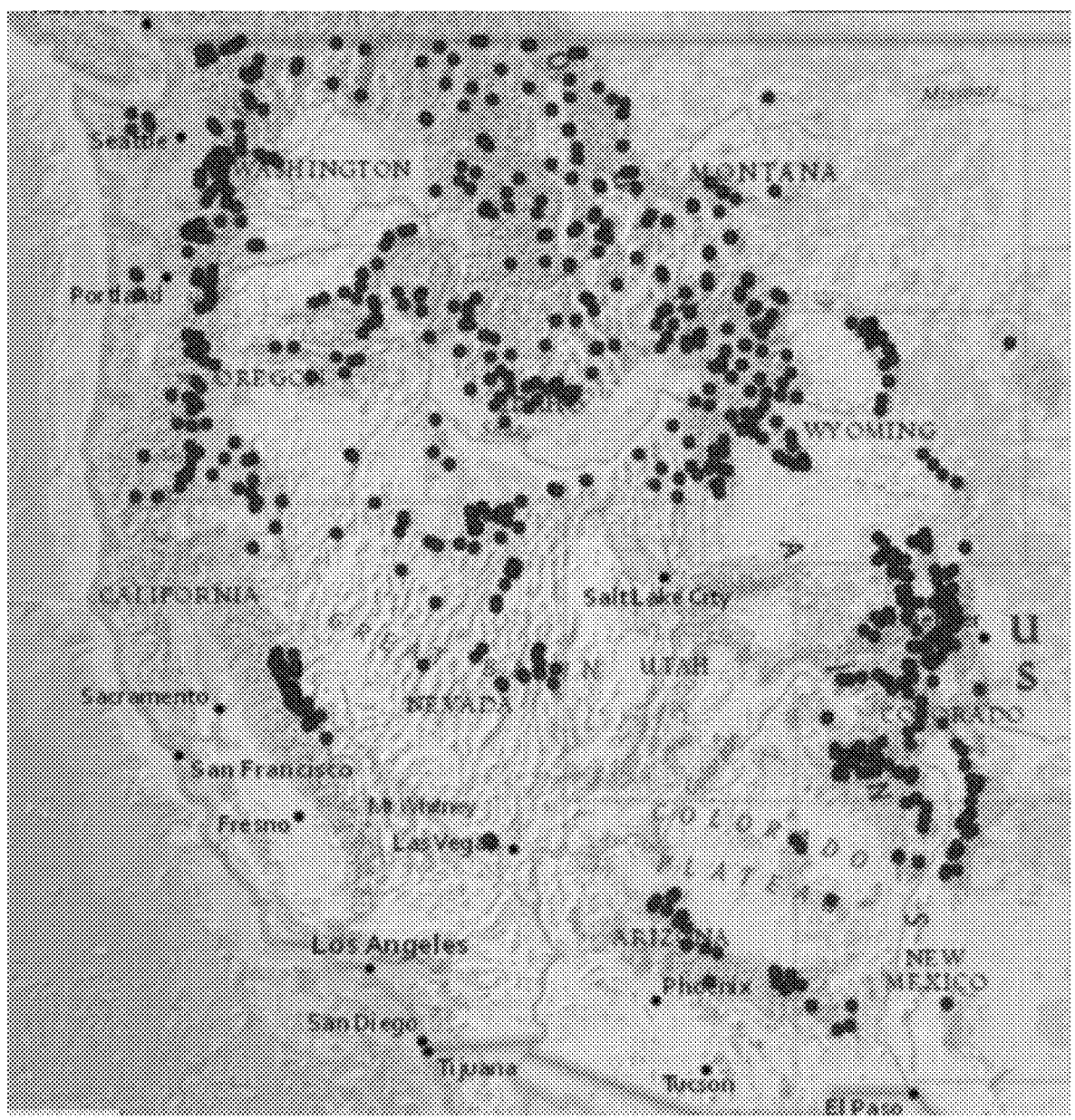
FIG. 2 is a map of active NRCS SNOTEL stations.

The following description is exemplary in nature and is not intended to limit the scope, applicability, or configuration of the invention in any way. Various changes to the described embodiment may be made in the function and arrangement of the elements described herein without departing from the scope of the invention.

As used in this application and in the claims, the singular forms "a," "an," and "the" include the plural forms unless the context clearly dictates otherwise. Additionally, the term "includes" means "comprises." Further, the terms "coupled" or "associated" generally mean electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

Innovations are described herein for determining snowpack and snowpack variability, including by measuring snow water equivalent (SWE). The spatial variability of the snowpack (i.e., SWE, snow depth, snow density) affects melt rate and the timing and volume of fresh water availability. SWE is defined as the height of snow ($h_s$) multiplied by the bulk density ($\rho_s$) of snow as it relates to the density of water ($\rho_w$):

$$SWE = h_s * \frac{\rho_s}{\rho_w}. \tag{3}$$

Measurement of SWE is used to inform water management decisions. Approaches include taking snow cores with a hollow tube and automated, fluid filled snow pillows. Airborne and space-borne SWE measurement technology requires ground based measurements in order to validate the remote sensing model estimates of SWE, but the current measurement network was not designed to support these advanced platforms.

SWE variability is more pronounced in mountainous regions compared to open snow fields found in the arctic and mid-west United States, where the majority of snow resides in the Western U.S. In these mountainous regions, topography and snow redistribution by wind can play an important role in snow density which suggests that several measurements would be needed to establish a representative SWE value. Another factor contributing to density variability is snowpack evolution over time. The range of snowpack density can change over time in any location based on several dynamics such as temperature, depth, wind, and heat flux. In general, snow density increases over time as snow grains within the snowpack are subject to metamorphic changes. With the shortage of density measurements, time-density models are used to characterize snowpack evolution and estimate SWE using only depth measurements.

Recent studies on climate change predict changes in the timing of snowmelt, influencing the timing of streamflow which in turn can affect sustainability of water resources by altering the availability of water. Changes in temperature, wind and precipitation regime can have substantial effects on the snowpack evolution. Climate change studies, indicating a decline of regional snowpack, suggest that sub-alpine and other terrestrial systems in the arid west will encounter longer and more intensified periods of water stress. Predictions of change from snow dominated areas to rain dominated in the Western U.S., based on historical and predicted temperature regimes, show that snow cover will recede and peak snowpack will occur earlier.

As technological advances in remote sensing and SWE modeling evolve, the existing ground based measurement infrastructure, even in heavily monitored basins, is not sufficient to verify model simulations of SWE, nor was it designed for that purpose. Some regions, such as the Hindu Kush in Afghanistan, have few to no measurements yet are completely reliant on seasonal snowpack for their survival. Changes in timing of seasonal runoff can have devastating effects on crop production and the subsequent livelihood of millions of inhabitants in these regions. With roughly one-sixth of the world population living in snowmelt dominated regions with low water storage, potential changes in seasonal snow regimes highlight the need for increased, accurate measurements and modeling techniques.

SWE Measurement Techniques

Today there are two commonly used techniques to measure Snow Water Equivalent (SWE): manual snow courses and automated snow pillows. A snow course consists of several manual snow core measurements taken in selected locations 20-100 meters apart. Cores are taken with a tube that has a sharpened end to cut through snow layers, and after collection are weighed. This method produces both depth and density measurements that can be used to calculate SWE. Weighing of manual snow cores was pioneered by Dr. James Church (University of Nevada, Reno) in the 1930's. Church's Mt. Rose Federal Sampler (Standard Federal) and variations of it are still widely used in snow course measurements. A snow course produces a SWE measurement for one single day and time. Snow courses are usually performed once or twice a year at designated locations chosen for maximum snowpack. These snow courses were employed in favor of snow pit analysis to try and characterize the spatial distribution of the snowpack for two reasons: first, the snow-tube is far less destructive to the snowpack than a snow pit; second, a snow pit analysis consists of digging a pit with squared walls to the bare ground surface and taking a sample of specific volume at graduated increments on the wall. Though this technique is the most accurate, it is by far the most time consuming of all the available methods. In the early 1960's, a new tool was developed to measure the mass of a snowpack through the use of a fluid filled snow pillow. This application is an automated system that provides continuous SWE data throughout the snow season. By the late 1970's, the U.S. Soil Conservation Service began to implement a network of automated SNOpack TELemetry (SNOTEL) sites using snow pillows to provide data from high snow accumulation regions. Currently the Natural Resources Conservation Service (MRCS) has 666 active SNOTEL stations in the Western United States. In addition, California has 98 active snow sensors run by several agencies including the California Department of Water Resources, U.S. Bureau of Reclamation, U.S. Army Corps of Engineers, and several water utility districts.

SNOTEL sites are either outfitted with rubber pillows or galvanized metal pillows filled with fluid, where a pressure transducer located in a standpipe measures the fluctuation of fluid as it relates to weight distributed on the pillow. Original pilot studies found that pillows measuring less than 10 ft. in diameter or having less than 50 ft.$^2$ surface areas did not consistently register snowpack under all conditions found in the Sierra Nevada Mountains. The large size of the snow pillow sensor and its accompanying station requirements creates limitations on the placement of SNOTEL sites based on topography and, in many cases, permitting. Sensors that measure snowpack mass, like a snow pillow, have been developed using loadcell technology. An electronic loadcell is a transducer that converts a mechanical force into an electronic signal, which can be calibrated to monitor SWE and eliminate the need for a fluid filled pillow. Studies have assessed the viability of an array of loadcell sensor designs for SWE measurement and source of sensor measurement errors. The goal has been a design as effective or better than existing snow pillow sensors.

Several other methods have been developed to measure SWE in recent years. Campbell Scientific has a SWE sensor that measures terrestrial gamma radiation and its changes in attenuation through a snowpack. Ground penetrating radar and dielectric tape are also used. All of these emerging technologies have limitations based on cost (gamma radiation), depth of snowpack (ground penetrating radar), location and installation. None of these products have been employed in large scale snow observation projects such as SNOTEL.

Measuring snow water equivalent and snow density accurately is inherently difficult. The Standard Federal sampler has shown between 6 to 11.2 average percent error overestimation when used properly, compared to snow pit measurements. Errors in core sampling can be caused by numerous factors. First, a snow core should measure ≥80% of the snow depth. This can be difficult due to collapsing of the snowpack layers during insertion of the corer as well as snow that could be lost through the slotted sides that are shaved off from twisting action as the tube is inserted to the snow. A soil plug acquired with the core sample (removed before weighing) ensures a full sample was taken but sometimes does not exist due to the ground conditions. Without a soil plug there is possible loss of snow sample as the core is removed from the snowpack.

Figure 3:
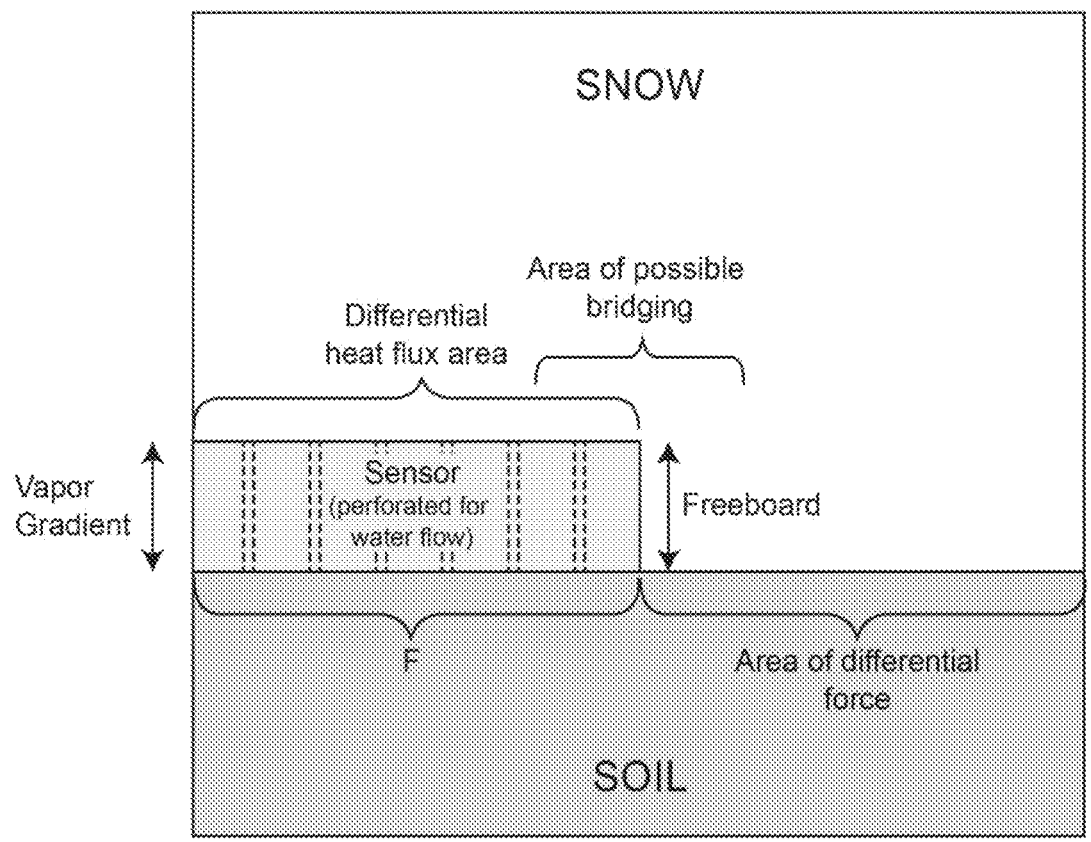
FIG. 3 is an example of sensor error potential for the electronic loadcell ground based pressure sensor.

The accuracy and precision of snow pillows depend on site characteristics, equipment and installation techniques. Many inherent issues, such as fluid leakage or damage caused by wildlife, can be mitigated through design. However, frequent inaccuracies are caused by physical snowpack dynamics such as ice layers and differential melting during freeze/thaw cycles. For example, SWE over- or under-measurement are often attributed to edge effects or bridging. Snow bridging occurs when some or all of the mass of a snow load is transferred to the surrounding snow, typically due to snow melt or vapor gradient flow to the snow above the sensor, as shown in FIG. 3. Bridging most commonly occurs during freeze/thaw periods, when the snow is undergoing a diurnal melt cycle. The sensor has different thermal properties than the surrounding soil which causes a change in vapor gradient resulting in snow melt at the sensor surface. Sub-freezing nighttime temperatures refreeze the snow and in turn can create a void space above the sensor. Physical properties of snow during rapid settlement can also cause edge effects. Errors attributed to differential snow settlement occur when stress concentrations along the perimeter of the sensor increase due to rapid settling following a heavy snowfall event as well as when snowmelt rates at the sensor differ from snowmelt rates at the ground surface. Error magnitude is a function of the freeboard (distance of the sensor above ground surface) of the sensor and viscosity of the snow.

SWE over-measurement errors in loadcell pressure sensors occur when the heat flux through the sensor is less than the surrounding soil. SWE under-measurement errors occur when the heat flux through the sensor is greater than surrounding soil. These are illustrated in FIG. 3. These errors can be prevented by reducing the height of the sensor from the ground surface (freeboard), and by using perforated sensor material to allow water flow and heat exchange through the sensor to the soil surface. When errors occur at sites with independent snow depth measurements, corrected SWE values (SWE') are calculated using a reference snow density ($\rho_{ref}$) based on the average snow density and depth ($h_s$) at the start of the sensor error. Correction equations are used until SWE sensor measurement and error corrected measurements intersect.

Initial snow density is given by, $$SWE' = \frac{\rho_{ref}}{\rho_w} h_s \quad (1)$$

where $$\rho_{ref} = \frac{h_s}{SWE} \rho_w \quad (2)$$

and $\rho_{ref}$ is reference snow cover density at the time prior to the error.

A key component to the measurement of SWE, or lack thereof, is the cost. Beginning with manual core samples, which give a measurement of depth, density and SWE at one point in time, one site visit for several samples may take 1 hour of time for two people. Adding drive time and several sites visits over long distances the cost of manual snow coring can increase rapidly. Core sampling also presents limitations in mountainous terrain due to remote locations and avalanche danger. Using snow machines and helicopters (which has been done) drive costs up exponentially. Manual samples produce one SWE value for one moment in time and it is well known that a snowpack changes over the season so getting multiple measurements is recommended for accuracy of water estimation. Snow pit sampling is far more labor intensive and intrusive to sampling sites rendering them impractical for multiple sampling schemes. The snow pillow was designed to take continuous measurement throughout the snow season, but size and cost can limit where they are located. A snow pillow (just bladders) may cost over $4000 and a SNOTEL site kit including the snow pillow, bulk precipitation standpipe and transducers may be $8000 or more (Rickly Hydrological Company, Columbus, Ohio USA). These costs do not include the metal net that is usually placed on top to deter bears from damaging the bladders, which can cost over $2000. In total, the actual cost of installation, including instrumentation of weather station, telemetry and permitting for a SNOTEL station may cost over $35,000.

Spatial Variability of SWE, Snow Depth, and Snow Density

Snowpack distribution at the watershed scale is influenced by timing of accumulation, wind redistribution, temperature, elevation, and aspect of a landscape. At the plot scale, accumulation and wind redistribution can be affected by micro-topography, preferential deposition, interception in forested areas, and local advection creating highly unpredictable snowpack variability. Spatial variability of a snowpack can be divided into two categories: fixed, which are predictable parameters such as elevation, vegetation, slope and aspect, i.e., factors that essentially do not change; and random, which are unpredictable parameters such as micro-topography or small scale changes in ground surface, fallen logs, tree wells and small scale wind effects. Though no factors are truly random, unpredictable small changes can have substantial effects on snowpack. Snowpack also goes through metamorphosis starting almost immediately after snowfall leading to redistribution and modifying the density of the snowpack. Climate and snowpack age have a strong effect on the variability of snow density as well as total depth of the snowpack. Shallow and early season new snow has greater variability in density, due to meteorological effects such as temperature and wind during accumulation, than late season slush snow which has undergone greater snow metamorphosis or ripening. Thus, temporal and spatial variability complicates up-scaling of SWE from point measurements to grid values for large scale SWE model estimations.

Records indicate that depth measurements outnumber SWE measurements 30 to 1 and that the dynamic range of snow depth across spatial gradients of large datasets (n>5000) can be up to 4 times greater than that of density. In spite of a smaller range, snow density ranges from 5-32% in samples taken within 1-10 meters. Considerable variation in density and SWE over short distances (<10 meters) can be discounted when measuring and modeling over large homogenous snow covered areas, such as arctic plains or larger open meadows, where statistical variance can be overcome by distance. In mountainous terrain where most of the snow resides in the U.S., smaller topographical changes can have large effects on density. Thus, in order to make an accurate SWE measurement, both snow depth and density must be measured. The disparity in depth to density measurements is a function of the effort required for each. Manual snow depth measurements can be taken quickly and efficiently with visual snowstakes or a snow probe. Newer digital probe models even have memory and GPS (Avatech, Park City, Utah, USA). Automated snow depth sensors are widely used in remote weather stations and are relatively inexpensive (≈$100-700) compared to pressure sensors used to measure SWE (≈$5000). Recently, airborne LiDAR (Light Detection and Ranging) that can take large numbers (n>5000) of accurate snow height measurements above ground to 1 meter resolution has become prevalent. LiDAR has been used to get depth measurements by measuring areas when snow is not present and then re-measuring the same area at specific times throughout the snow season. Though LiDAR can get accurate depth measurements over larger areas, density measurements are still required to close the circle and measure SWE. Studies using airborne LiDAR have shown that ground based depth measurements are typically placed in areas of higher than average snow depth. Manual depth measurements, though quick and efficient, can be costly in man hours and cannot be performed in remote mountainous areas due to inaccessibility or avalanche danger. Furthermore, manual measurements only give a measurement at one point in time. This same drawback is true for LiDAR measurement. LiDAR far exceeds manual measurements in cost based on expenses for flight time which include not only the sensor but the crew, fuel and airplane and in order to get a depth measurement a minimum of two flights need to be performed.

Advances in remote sensing have broadened the option for large scale modeling of SWE and to assess spatial variability across large scales. Several parameters of snow can be detected by spectral reflectance signatures. Estimates for albedo and grain size, which directly effects albedo, can be obtained through these signatures. Multispectral signatures can also be translated to snow covered areas in complex mountainous terrain. Passive microwave attenuation though the snowpack is another measurement that can be made from remote sensing. This technique can be translated into SWE and depth but has limitations in deeper snowpack. Furthermore, all remote sensing based models rely on some ground measurements for calibration and validation. Many measurements are needed to characterize the spatial variability of depth, density and in turn SWE and the costs associated with large scale ground measurement are currently prohibitive. In addition, physical properties within the snowpack may induce measurement errors, in particular effects such as bridging, and over- or under-measurement.

Loadcell-Based Pressure Sensor with Adjacent Inert Area

In one embodiment, a loadcell is used in conjunction with an aluminum plate having a weight plate area and an outer inert area designed to accept the edge effects that cause bridging. As used herein the term "inert area" means an area adjacent the weight plate area to reduce bridging effects as discussed below, allowing for more accurate measurement of SWE. In some embodiments, the "inert area" and the weight plate area are spaced apart from one another, such that there is a gap therebetween in a horizontal plane of the weight plate area.

Figure 5:
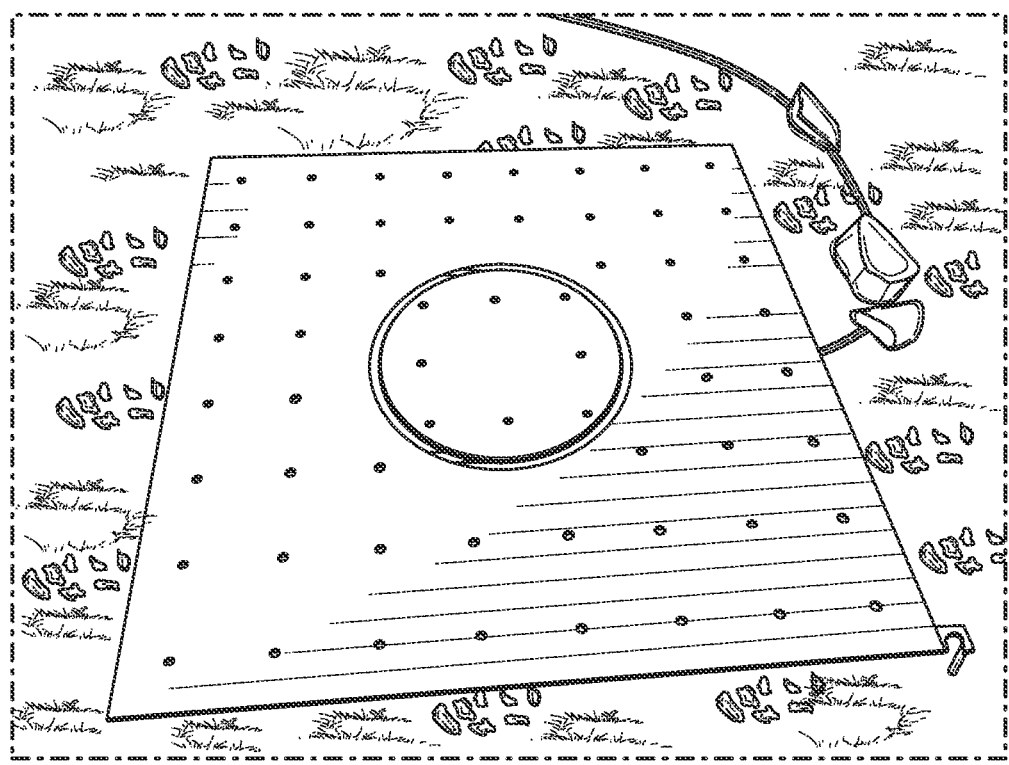
FIG. 5 depicts an SWE sensor at a test site.

In some embodiments, the weight plate and the inert plate are spaced apart from one another. For example, the weight plate can have a perimeter and the inert plate can surround the entirety of the perimeter of the weight plate with a gap formed therebetween as shown in FIG. 5. The inert plate can be one continuous piece of material or it can be formed in multiple sections (either coupled together or separately mounted).

The weight plate and outer inert area (such as the outer square shown in FIG. 5) can both be perforated with holes. For example, 6.35 mm holes may appear roughly every twelve to fifteen cm, as shown in FIG. 5. Perforations allow water to flow through the sensor and saturate the soil surface underneath to limit the heat differential between saturated soil adjacent to the sensor and the sensor itself. The difference in heat flux occurring at sensor surface and the adjacent soil can lead to bridging. The weight plate sits on one or more aluminum plates attached to the square outer area and may sit below the surface. For example, as shown in FIG. 5, the weight plate may sit on two aluminum plates roughly seven cm below the surface. The whole inert area is framed by aluminum square tubing. For example, as shown in FIG. 5, 1"×1.5" (2.54 cm×3.8 cm) aluminum square tubing surrounds the inert area. The sensor may be installed flush to the soil surface and anchored by metal rebar that is placed through holes in the excess square tubing at all four corners, as shown in FIG. 5.

Figure 4:
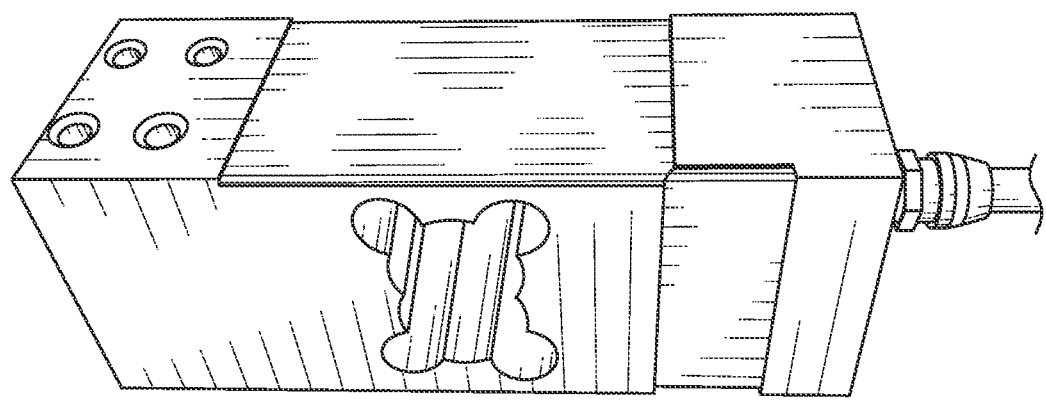
FIG. 4 is a photograph of a Loadstar RAP3 single point resistive loadcell.

FIG. 4 illustrates an exemplary loadcell, the Loadstar RAP-3 single point resistive loadcell that may be used with the SWE sensor described herein. The RAP-3 is a strain gauge loadcell. A strain gauge loadcell consists of four resistors configured to create a Wheatstone Bridge (an electrical circuit measuring two legs of a bridge circuit, unbalanced and balanced). The resistors are attached to a stainless steel block that bends as force is applied to a single point. The resulting strain generates an electrical signal measured in millivolts per volt of input (mV/V). This signal is sent to a Campbell data logger (CR800 and CR1000; Campbell Scientific, Logan, Utah USA).

Sensor Calibration and Verification

Figure 6:
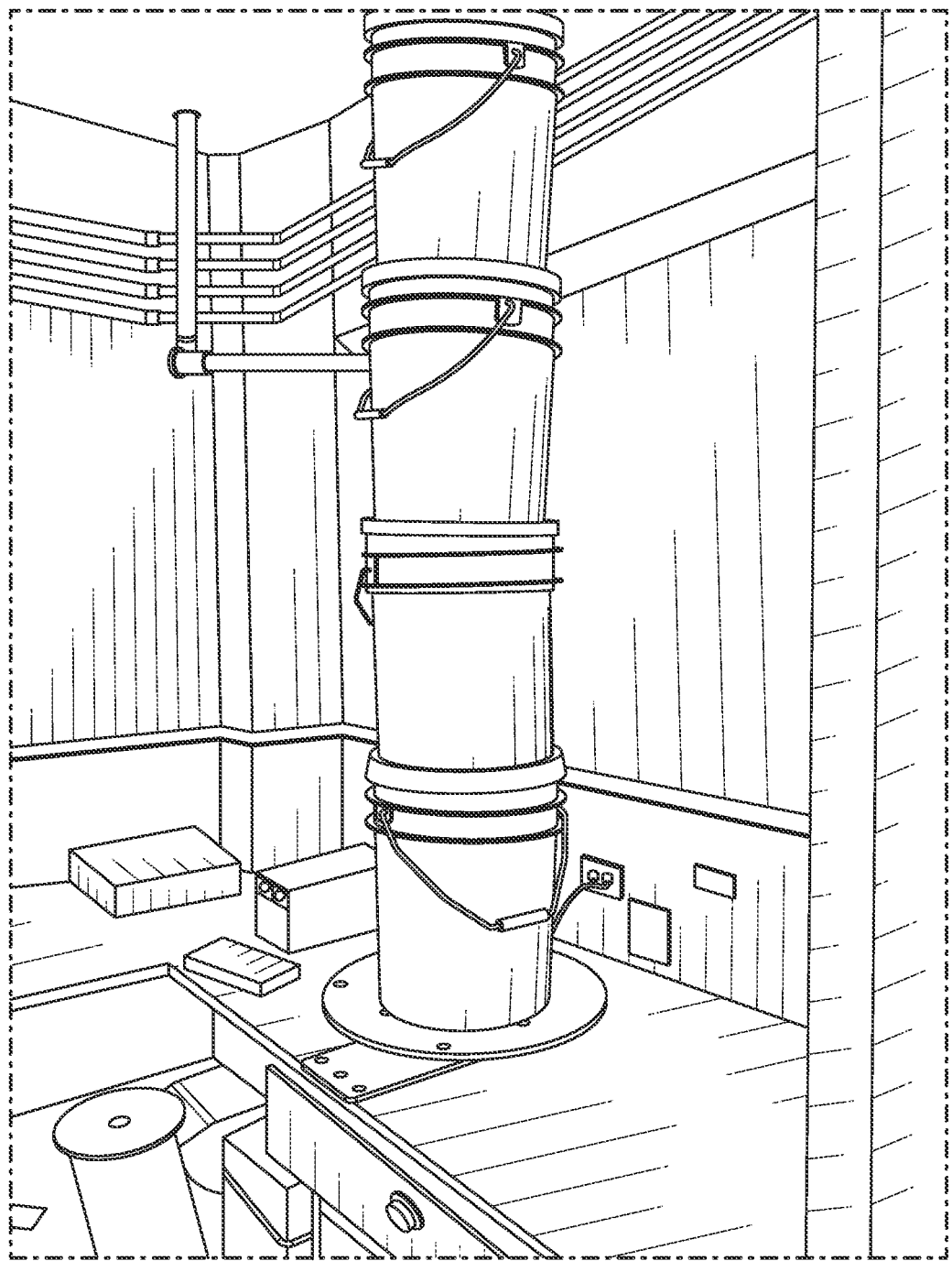
FIG. 6 depicts calibration of weight plates using water and five gallon buckets

To properly measure SWE, a conversion coefficient between the electric signal and the mass applied to the sensor's weight plate must be generated. One approach to weight calibration of the plate is use of varying amounts of water and specified weights to generate a conversion coefficient between the electric signal and the mass applied to the plate. This coefficient can then be used to calculate mass from millivolts. For example, sensors may be calibrated using water in five gallon buckets, as shown in FIG. 6. There should be little difference in the weight plate measurement whether the plate is clamped to a workbench as opposed to secured to a sensor frame during calibration. An empty bucket may be weighed for a tare weight. Five liters of water can be added for each measurement until the bucket is full. Another tare weight may be taken after adding another bucket on top. This process can be continued until, for example, a total of thirty liters ($\approx$30 kg) of fluid is added. All recorded values should be recorded and tares removed to associate water to millivolts. Centimeters of water can be calculated by equating liters of water to cubic centimeters then dividing the volume by the area of the weight plate. The slopes for numerous sensor calibrations can be used to create an average slope for use as a multiplier in a datalogger program for SWE measurement readings. The datalogger for SWE measurement may be programmed to take ten minute measurements of maximum SWE, minimum SWE, average SWE as well as the raw millivolt readings from the sensor and create an hourly average measurement. The raw millivolts may be recorded in case any post collection data processing needs to be done, such as calibration adjustments.

In order to verify the performance and linearity of the SWE cells in real conditions, one may also perform calibrations directly with installed plates in the field. If calibration results are outside the manufacturers calibration of repeatability (which for the RAP-3 has been <0.02 percent) they may still be within the linearity calibration (which for the RAP-3 has been <0.02 percent with $r^2 \geq 0.999$). Clearly installed loadcells may be subject to some differences in signal response. These differences may be attributed to several things such as, changes in environmental conditions (e.g. temperature), cable length affecting voltage distribution (e.g. as the cable length increases the excitation voltage can degrade based on signal loss, thus lowering the amount of signal the sensor is receiving and then returning based on the principles of the circuitry), and diurnal power fluctuation (e.g. increase in power distribution with increased solar input, or in simple terms the power system is stronger when the batteries are being charged in daylight).

Figure 7:
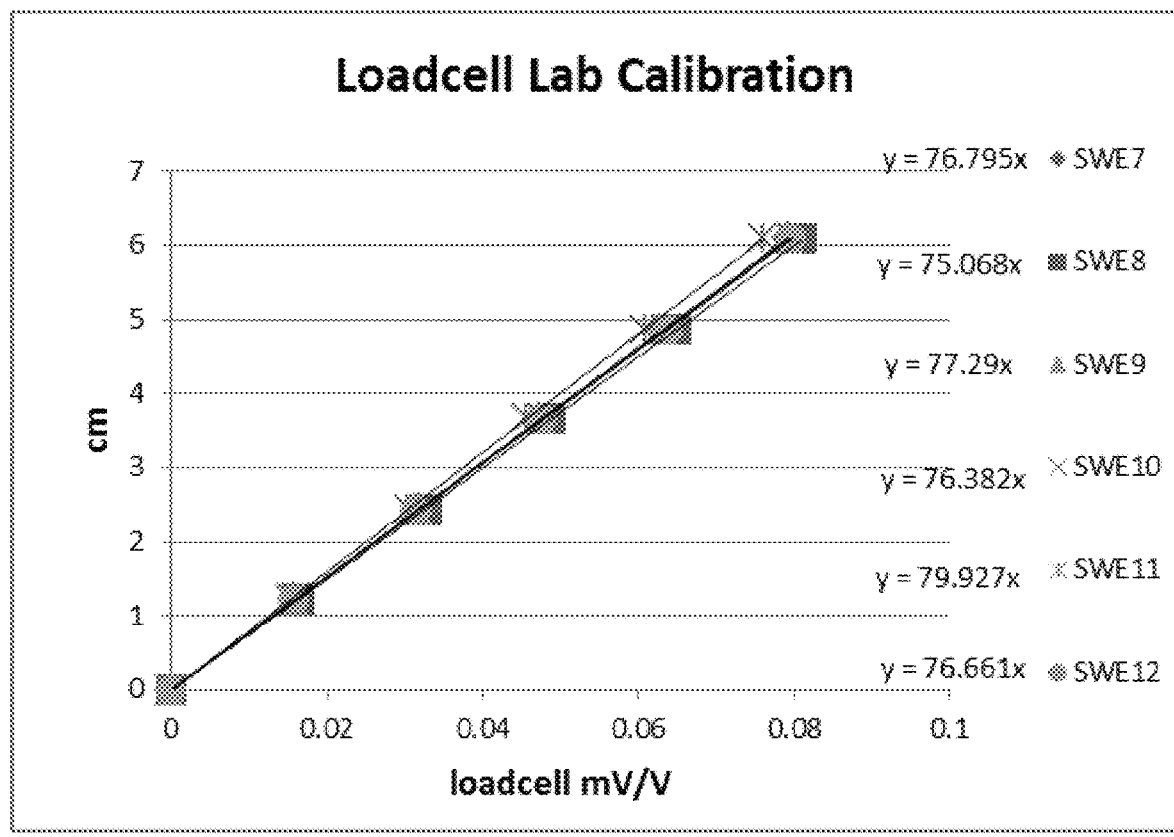
FIG. 7 is a graph of exemplary conversion coefficients for SWE plates, calculated using 2 kg weights for the lab calibration.

Sensors may also be calibrated in the lab using weights. FIG. 7 shows conversion coefficients for this approach using 2 kg weights. Deployed sensors can be assigned coefficients based on lab and/or field calibrations.

Sensor Weight Testing

Weight testing to validate the stability of a sensor under an estimated maximum load may be conducted in the lab. In order to calculate a realistic maximum load, a peak SWE can be chosen from a potential sensor location. For example, from water year 2011 at the Central Sierra Snow Lab the peak value of SWE was 184 cm. This location is known for its large maritime snowpack and the 2011 water year SWE was estimated at $\approx$165% of the 30 year average SWE from 1981 through 2010 for the Sierra Nevada Mountain Range. First, using a weight calibration test a kg/cm ratio may be derived for the sensor, which is then used to determine a kilogram value for the given SWE. For example, for an SWE of 184 cm and a kg/cm ratio of 10:6, the kilogram value would be 307 kg (184 cm/6 cm*10 kg=307 kg). Weight plates may then be incrementally added to the sensor in over several days to assess maximum load capacity and sensor drift. For example, a calibration using five 20.4 kg plates could be performed on SWE 1 and SWE 3 to compare to the 2 kg calibration coefficients. Ideally, calibration results remain highly linear, e.g., SWE 1 $r^2$=0.9999, and SWE 3 $r^2$=0.9998. Slopes of any of these calibrations can be done using either 5V excitation or 2.5V excitation. Results using the 5V are different because sensors return more mV/V if they are given higher voltage; thus the different excitation levels are generally not comparable.

Exemplary Sensor Deployment.

Exemplary sensor deployment was performed in three mountain regions of the Western United States:

1) The Sagehen Creek Experimental Forest (39° 26'57.52" N, −120° 17'07.72" W) located 32 kilometers from Lake Tahoe in the Tahoe National Forest. Sagehen has a maritime climate with a typically large, dense snowpack averaging three meters at lake level (Lake Tahoe) and up to seven meters on the peaks.

2) The Snake Range in eastern Nevada (38° 54'21.88"N, −114° 18'31.96"W), an intermountain/continental climate with typically dry, low snow density, averaging one to three meters of total snowpack on the highest peaks, and 3) Mammoth Mountain Ski Resort (37° 38'35.21" N, −119° 01'44.88" W) located on the eastern side of the southern Sierra Nevada Mountains, exhibits characteristics of both maritime and continental climate regimes. Mammoth is known for deep snowpack characteristic of the Sierra Nevada Mountains but can exhibit a drier less dense snowpack compared to the western side of the Sierra Nevada. Five SWE sensors were deployed at sites with a series of existing meteorological and environmental instrumentation.

FIG. 1 illustrates the locations of sensor testing, including: Sagehen Creek Field Station, Sagehen Creek Experimental Forest, CA; Alpine Meadows Ski Resort, Lake Tahoe, Calif.; CRREL UCSB Eastern Sierra Snow Study Site, Mammoth Mountain, Calif.; Subalpine east, Nevada Climate-ecohydrology Assessment Network (NevCAN), Great Basin National Park, NV; Subalpine west, Nevada Climate-ecohydrology Assessment Network (NevCAN), Mt. Washington, Snake Range, Nev.

Figure 8:
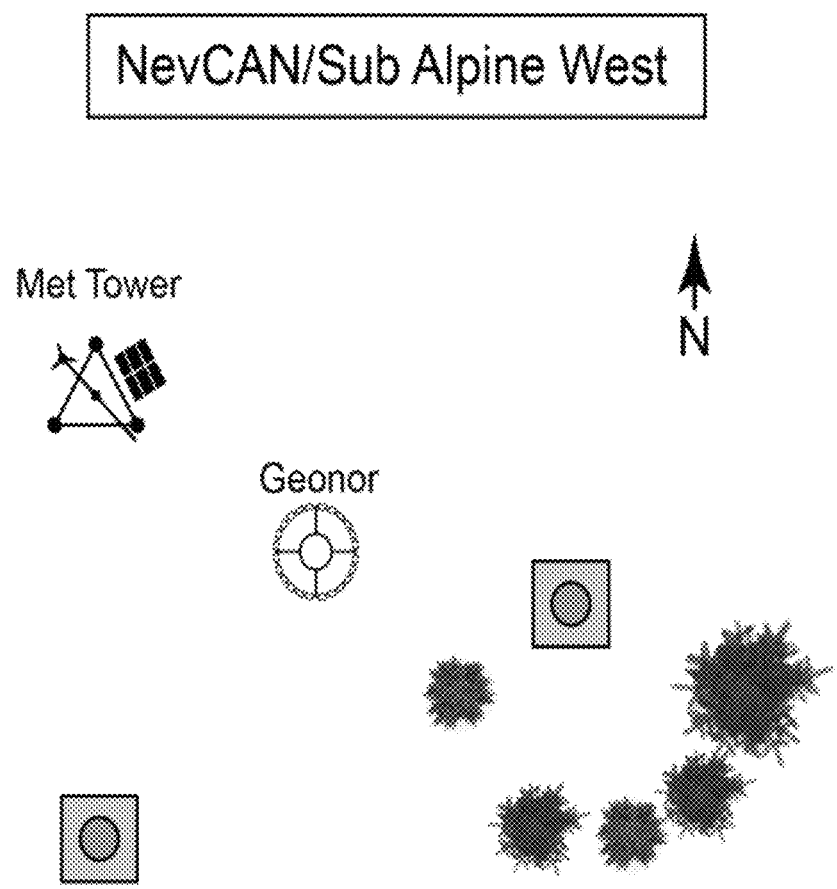
FIG. 8 depicts an exemplary sensor deployment.
Figure 9:
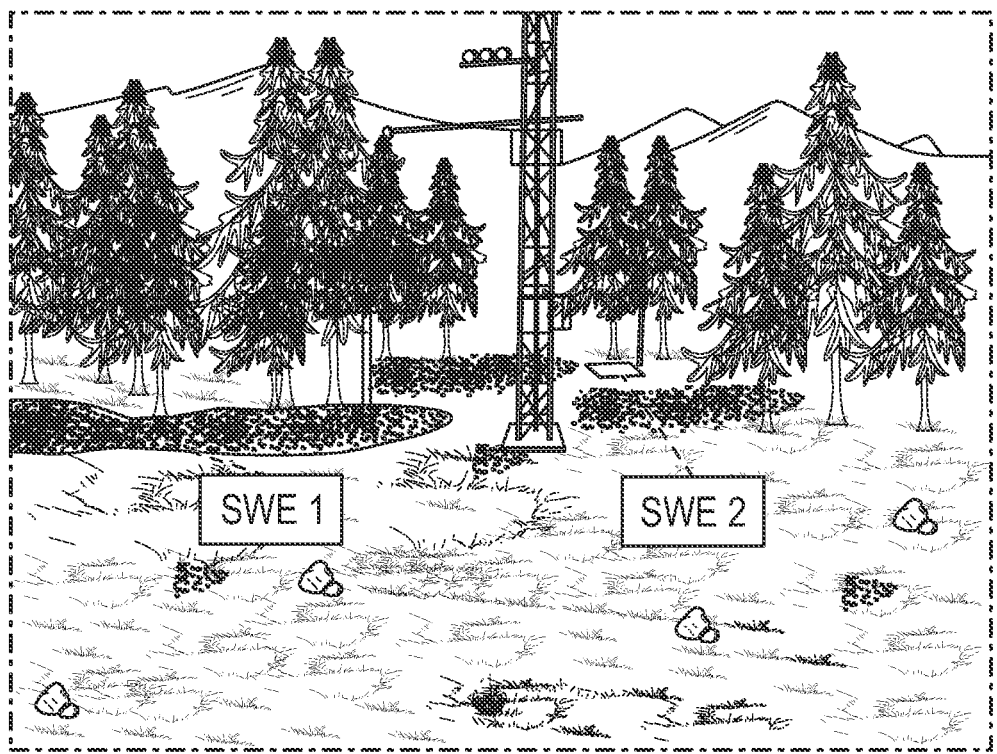
FIG. 9 depicts an exemplary sensor installation.

Three sensors were placed in the Snake Range, Nev. which is located 97 kilometers southeast of the city of Ely (see FIG. 1). This mountain range is home to the northern transect of the Nevada Climate-ecohydrology Assessment Network (NevCAN) (http://nevcan.dri.edu) and the Great Basin National Park. This network consists of climate monitoring stations that include measurement temperature, total precipitation and several other parameters (see Table 1), over the elevation gradient ranging from 1560 meters to 3355 meters. The two highest elevation sites, Subalpine West (two sensors elev. 3355 m) and Subalpine East (one sensor elev. 3070 m), are snow-dominated peaks that receive between one and four meters of snow annually. A total of five SWE sensors were placed in the field as summarized in Table 1. The sensors at the Subalpine West site were strategically placed in a shaded, wind protected area and in a sun exposed area (FIGS. 8 and 9). The sensor at the Subalpine East site is within fifty meters of, and has similar exposure to, the Wheeler Peak SNOTEL site (station 1147, National Resource and Conservation Service) that measures SWE with a snow pillow. An additional SWE sensor was located at the Sagehen Creek Field Research Station, located in the Sagehen Creek Experimental Forest watershed 18 kilometers north of Truckee, Calif. The Sagehen Research Station has a number of meteorological data sensors, including four snow pillows that measure SWE. The loadcell SWE sensor was placed within five meters of the snow pillow at Sagehen's Tower 1 site (elev. 1957 m). This plate was placed as close as possible to the snow pillow to compare measurements in a similar exposure. A fifth SWE sensor was installed at the Alpine Meadows Ski Resort (elev. 2121 m) located between Truckee, Calif. and Tahoe City, Calif. The resort is situated on Ward and Scott Peaks in the Lake Tahoe Basin, in the Ward Creek watershed. The sensor was located at the base of the resort adjacent to the Roundhouse chairlift. The resort collects meteorological data, including temperature, bulk precipitation, snow depth, and event based SWE that can be used for comparison to the installed sensor.

Additional Sensor Deployment Examples.

Figure 10:
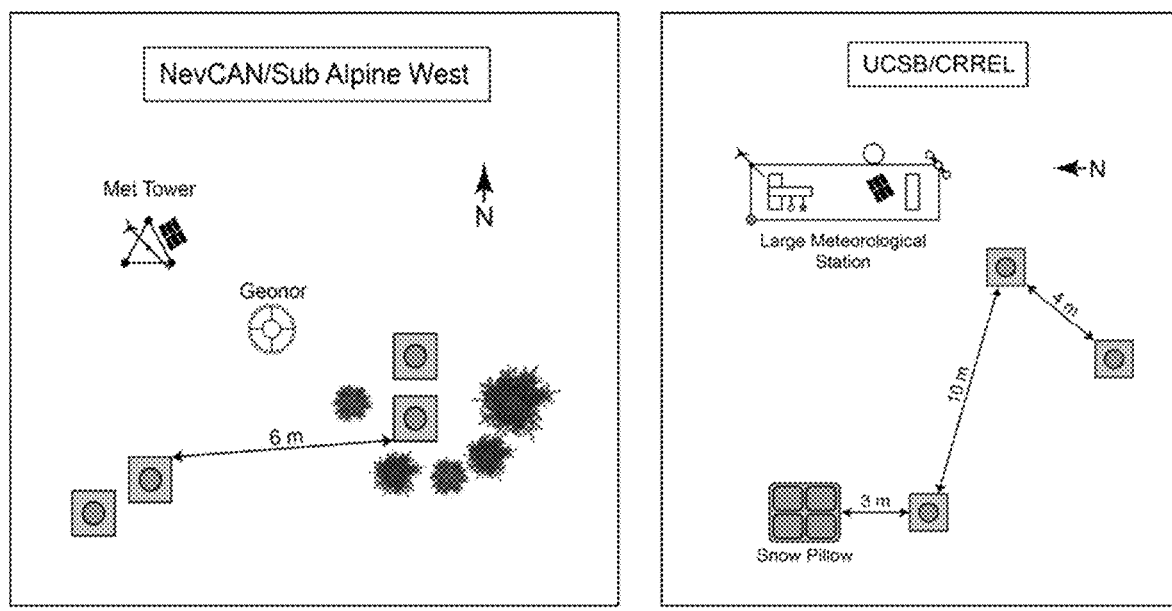
FIG. 10 depicts an exemplary sensor deployment.
Figure 11:
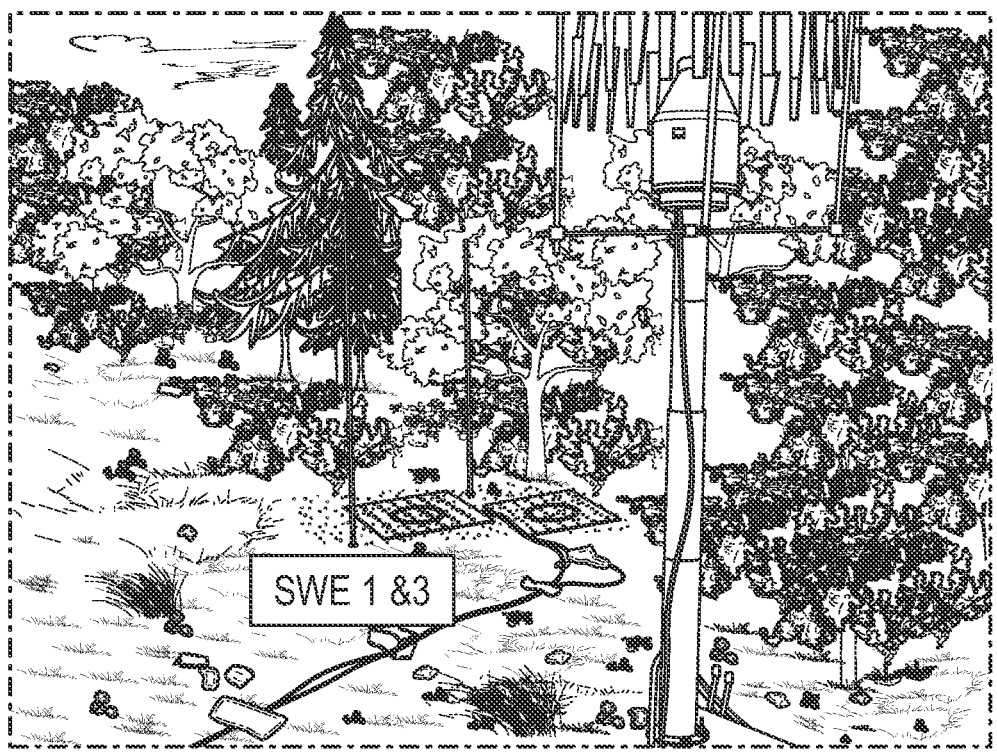
FIG. 11 depicts an exemplary protected zone installation of sensors.
Figure 12:
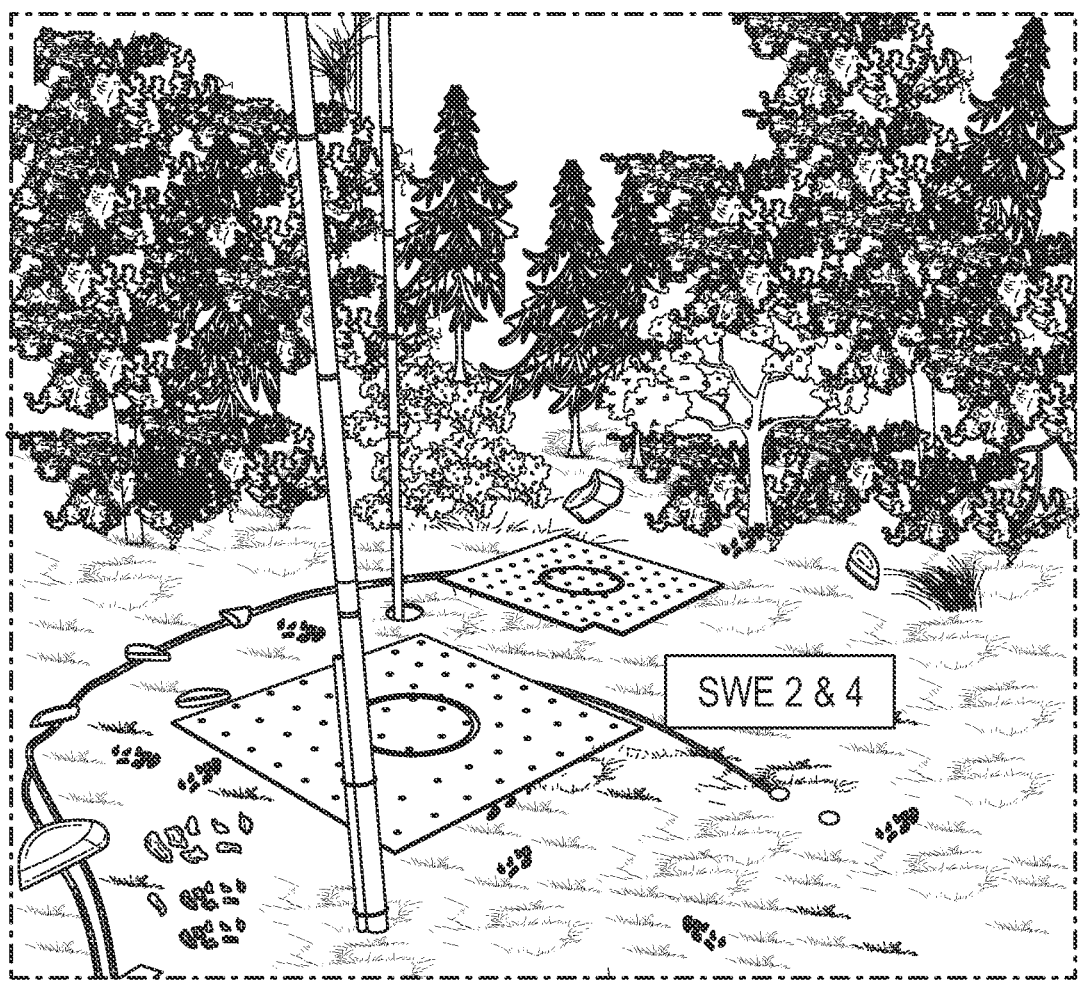
FIG. 12 depicts an exemplary exposed zone installation of sensors.

Two additional SWE sensors were deployed at the NevCAN subalpine west site in the Snake Range, Nev. (elev. 3355 m). These sensors were placed next to the existing sensors to create replicate measurements (FIGS. 10, 11 and 12). The Sagehen Tower 1 sensor was moved to the Tower 3 site (elev. 2118 m) and three additional SWE sensors were installed at the site. These sensors were placed between 5 and 30 meters of the snow pillow at the Tower 3 site. The sensors are arranged in a wooded area from under canopy to open area. This arrangement is designed to assess the variability of the SWE as it relates to forested settings. Three sensors were installed at the CRREL UCSB Eastern Sierra Snow Study Site (CUES) (http://snow.ucsb.edu/) located on Mammoth Mountain, Calif. (elev. 2940 m). The sensors are located in an area with minor topographical variation adjacent to the instrument tower. One sensor was placed next to the Judd ultrasonic depth sensor, one out in the open and one next to the snow pillow. The arrangement of these sensors allowed a snow course (manual cores) to be performed between sensors. This installation is in a location that would be considered to have relative homogeneity in the snow distribution.

Field and Lab Validation of New SWE Sensor

Analysis of the loadcell sensor response to accumulation and ablation of snow was performed by comparing the sensor data to other instrument readings. The sensors located at Subalpine West were compared to each other and visual depth measurements as well as bulk precipitation data. The sensor at NevCAN Subalpine East climate station was compared to the Wheeler Peak SNOTEL (NRCS station #1147) snow pillow and onsite snow depth data. The sensors located at the CUES snow observatory in Mammoth, Calif. were compared to the snow pillow located onsite as well as ultrasonic depth measurements. Manual snow cores taken adjacent to sensors were used to assess the variability of SWE. A snow pit was dug at each site visit to measure SWE by taking samples every 10 cm using a 1000 cc Kelly wedge cutter (Model: RIP 1 Cutter; Snowmetrics, Fort Collins, Colo., USA). Two sets of Kelly cutter samples were taken from each pit. In addition, incremental weight was added and subtracted to all plates over time during snow-free period to determine the accuracy and stability of the loadcell measurement in the field. Hence, validation of the sensors was determined by the response to lab tests and in the field by accumulation and melt of snow and manually added weights. Due to high spatial variability of SWE at small scales (<1 m), a number of samples were taken at small distances to provide confidence intervals of SWE to test if the SWE sensor measurements fell inside these intervals.

Snowpack and Sensor Error Analysis

Pressure sensor errors can either be caused by physical properties of the snowpack or by electronic malfunction. Real time data was monitored on a regular basis to determine if there were any errors. Troubleshooting was performed in the field after electronic malfunction of a loadcell was discovered from erroneous data. Manual snow pits were analyzed to create profiles of snow layers during each site visit to understand the layering of snowpack. This process consisted of digging a 1.5 meter square pit to the ground surface. Measurements of height, density and grain size of layers were noted for each identifiable layer using the Snow, Weather and Avalanches: Observational Guidelines for Avalanche Programs in the United States (SWAG) (A.A.A.a.U.F.S.N.A Center, 2010). Hourly camera images of the sensors from the NevCAN sites were also used to profile layering events and identify snow coverage of sensors. Other meteorological data were examined to estimate snowpack dynamics including, temperature (all sites), precipitation (all sites), solar radiation (NevCAN, Mammoth), soil temperature and moisture (NevCAN, Mammoth), soil surface water flux (Subalpine west), sensor temperature using thermistors (Mammoth), and hourly camera images (NevCAN, Mammoth). Using this data, a timeline of snowpack layering and dynamics could be constructed and verified by the pit analysis.

Spatial Variability and Snow Cores

Manual snow surveys were performed with a minimum of ten manual SWE measurements during site visit in March 2014, January 2015, February 2015 and March 2015 to quantify plot scale spatial variability of SWE. Initially core samples were taken directly adjacent to the pressure sensors (March 2014 and January and February 2015). Sample collection in March 2015 was taken in a transect through the sensor deployment area. This transect consisted of a number of samples taken in a straight line at increments of 0.2, 1, 3 and 5 meters. Twenty seven core samples were collected over a thirty nine meter length at the CUES site in Mammoth Calif., and sixty core samples were collected over seventy three meters at the NevCAN Subalpine West site in eastern Nevada. A semi-variogram to calculate the spatial variability of SWE samples was calculated using the equation:

$$\gamma(h) = \frac{1}{2N(h)} \sum_{N(h)} (z_i - z_j)^2 \qquad (6)$$

Where h is the lag distance between points, N(h) is the number of distinct pair sets at the given distance h where h=i−j, and $z_i$ and $z_j$ are sample values at the locations. The semi-variogram was used to determine the correlation length at which SWE measurements lose auto-correlation or become highly variable. Statistical resampling of independent measurements allowed estimation of the number of samples needed to obtain a mean value that was within 10% of the SWE population mean. Using MATLAB, a programming code was written to choose a SWE value from the complete set of sixty core samples from the Subalpine West site. Once a value was chosen, all values from samples within the threshold distance of the chosen sample were discarded and the process restarted. The resampling code was run one thousand times to verify results. Using the federal sampler measurements, both depth and density of the cores were calculated and compared to assess their effective relationship to the SWE measurements. Density was normalized using the equation:

$$\rho_n = \frac{\rho_{snow}}{\rho_{water}}. \qquad (7)$$

This equation produces a unit-less decimal value that is multiplied by snow height to calculate SWE. All graphic representations in this section show SWE and depth in meters. This decimal form can be compared to the unit-less density decimal value.

Spatial Variability and Pressure Sensors

SWE sensor measurements were also used to assess the spatial variability in snowpack. Two sets (<10 m apart) of co-located (<2 m apart) sensors were compared at the NevCAN Subalpine West site. Snow depth time series were created from daily pictures of graduated snow stakes placed next to each SWE sensor. SWE plates were within ten meters of the snow pillow and placed within three to five meters of each other at the CUES site. Depth measurements were used to determine the normalized density of the snow at each sensor using the equation:

$$\rho_n = \frac{SWE}{h_s}, \qquad (8)$$

where $\rho_n$ is the normalized density of snow and $h_s$ is the height (depth) of snow. The relationship between $\rho_n$, $h_s$, and SWE through time was evaluated for each sensor location.

Laboratory Testing of SWE Sensors

Figure 13:
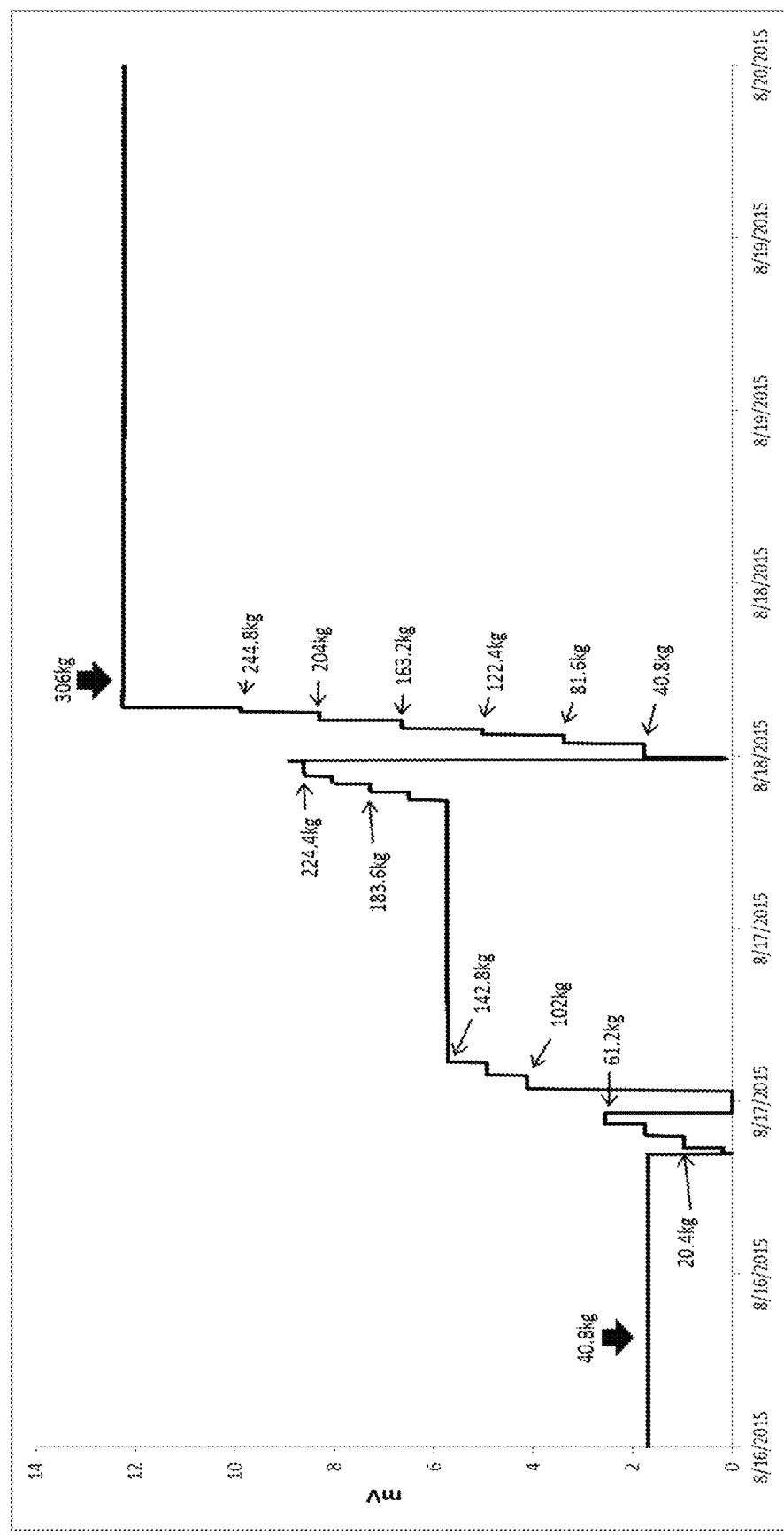
FIG. 13 depicts an exemplary time series of loadcell sensor response to increased weight up to a maximum load of 306 kg.

Weight tests to determine accuracy and stability of the sensor were performed in the Hydrology Technical Laboratory at the Desert Research Institute, Reno, Nev. Laboratory tests were conducted by adding 20.4 kg barbell weights in increments to a maximum of 306 kg. This weight (306 kg) is equivalent to the snow load that would be exerted on the SWE sensor by the maximum SWE recorded at the Central Sierra Snow Lab in 2011, which was estimated at 165% of the 30 year average. Tests were conducted over several days to evaluate sensor drift (FIG. 13).

Figure 14:
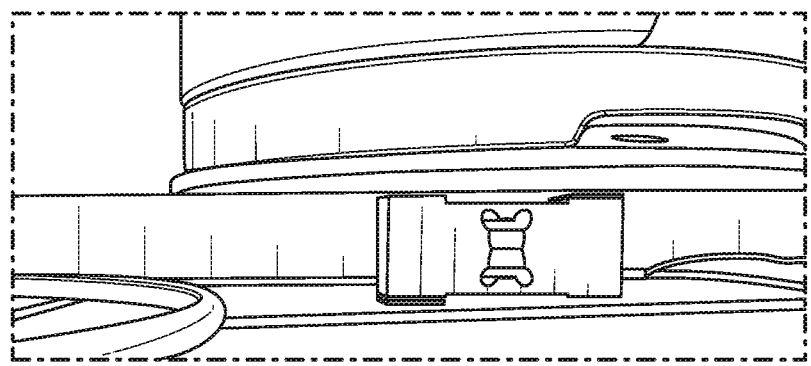
FIG. 14 depicts an exemplary sensor having a loadcell with a spacer.
Figure 15:
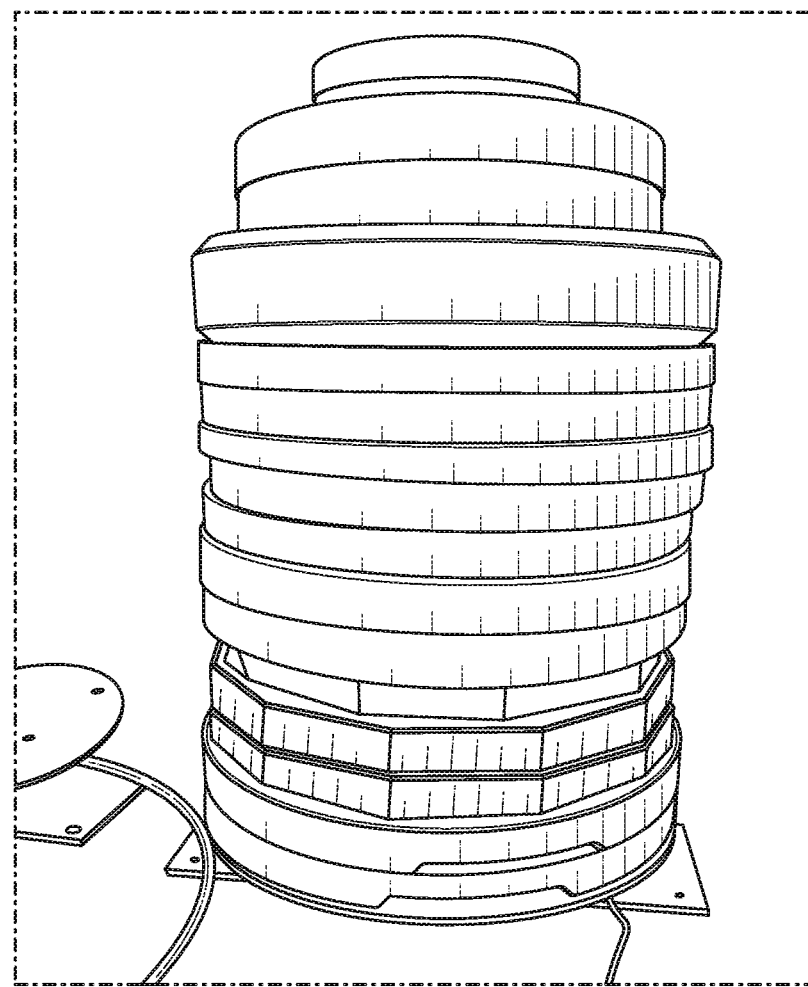
FIG. 15. depicts an exemplary sensor having a loadcell with two spacers, in lab test.
Figure 16:
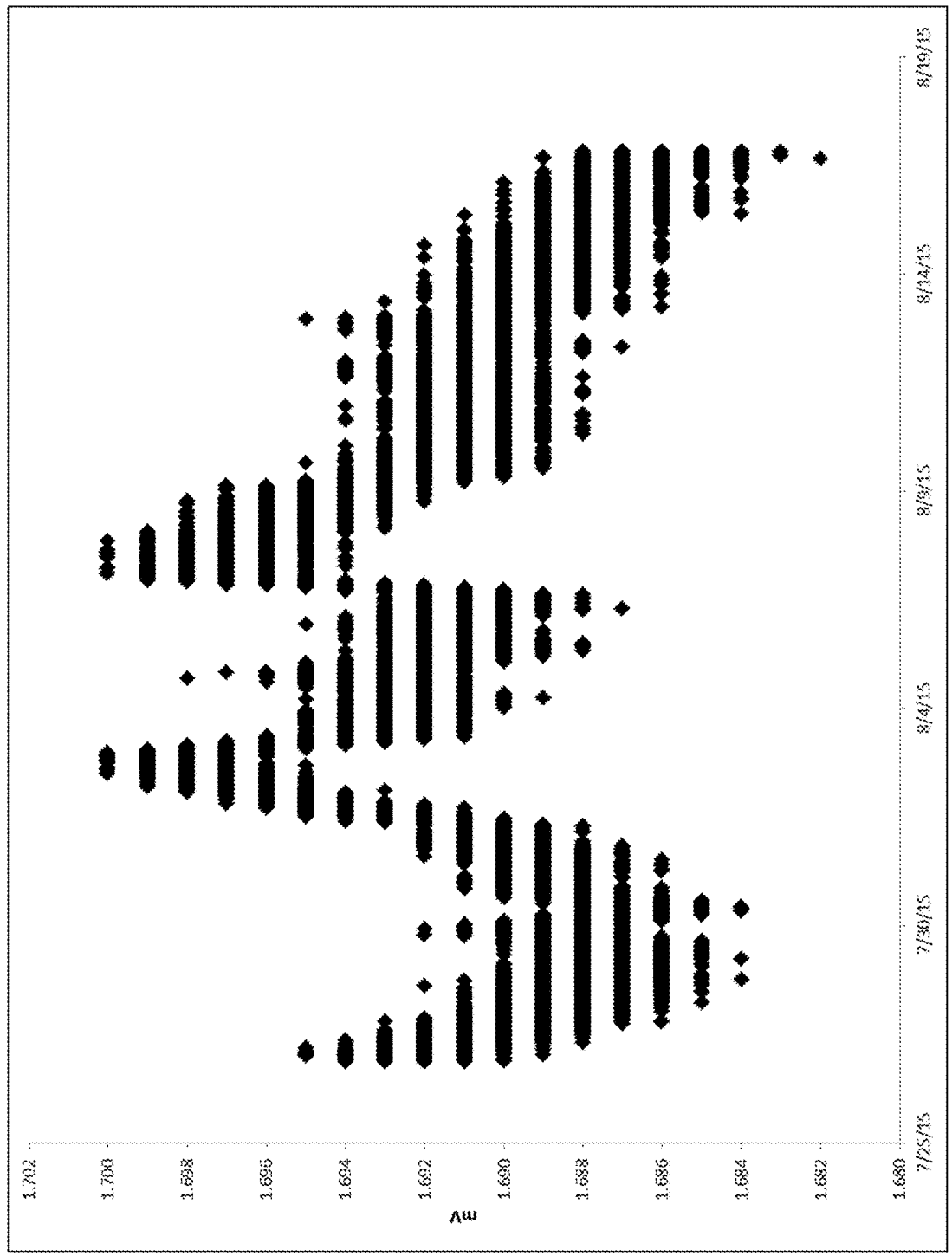
FIG. 16 is a graph of weight test results.

The sensor initially failed to continually record data at 224.4 kg, caused by the flex of the measurement plate exceeding the distance created by a spacer between the plate and the loadcell. The measurement plate came into contact with the opposite side of the loadcell, thus negating the strain on the gage (FIG. 14). In FIG. 14, the arrow points to the connection point when the loadcell stopped measuring due to overload of the single spacer at 224.4 kg. A second spacer was added to the sensor so it could accept the maximum load of 306 kg (FIG. 15). This maximum load of 306 kg is equal to 184 cm of SWE as recorded at the Central Sierra Snow Lab in the water year 2011. To estimate measurement drift, a load was left on the sensor over time. The first test was done with 40.8 kg of weight over roughly 1,440 hours. The sensor measurement varied from 1.68 mV to 1.70 mV, or $1.4 \times 10^{-5}$ mV/hr. A second test was done with the maximum load of 306 kg for roughly 63 hours. The sensor measurement varied from 12.22 mV to 12.25 mV, or $3.2 \times 10^{-4}$ mV/hr. The sensor drift, though changing with increased load, is very small and not significant enough to effect overall measurement of SWE. Furthermore the drift in measurement was not linear as it constantly fluctuated over time (FIG. 16). As shown in FIG. 16, a weight test was done to determine if the sensor will drift over time. This test was using 40.8 kg over 1440 hours with a measurement reading every minute. Note how the sensor measurement fluctuates over the time period which is a function of the electrical circuitry. The total change in measurement was equal to $1.4 \times 10^{-5}$ mV/hr over this time period. For the SWE sensor these short term fluctuations are minimal and insignificant with the long term change in measurement >0.01% of the total SWE. The maximum SWE of 184 cm from the Sierra Snow Lab in 2011 is equivalent to roughly seven meters of snow (calculated using the mean normalized density from manual measurements taken in the spring 2015 for this study). The Sierra Nevada snow depth is on the high range with its maritime climate, whereas depth in the Rockies, Alps and Pyrenees typically range between 2.5 to 4 meters. The results of the laboratory tests show that the pressure senor design can clearly accept the snow load from any of these typical snow dominated locations. Furthermore, the stability of the sensor under continual load suggests the pressure sensor would be able to accurately measure the SWE over the prolonged winter season.

Field Calibration Tests

Field calibration tests were performed at the Sagehen and Subalpine West study sites in the fall of 2014. Each sensor was tested using five 2 kg weights and the results were highly linear. Results for the Subalpine West sites four sensors had slopes varying from 77.79 to 83.77 and $r^2 \geq 0.9998$. The Sagehen sites four sensors field calibration results had slopes varying between 78.01 and 81.14 and $r^2 = 1.0$. The results of the field tests are highly linear and differences in slope are due to field installation of each sensor. These changes from lab testing reinforce the need for field calibration of the instruments in order to ensure measurement accuracy.

Figure 17:
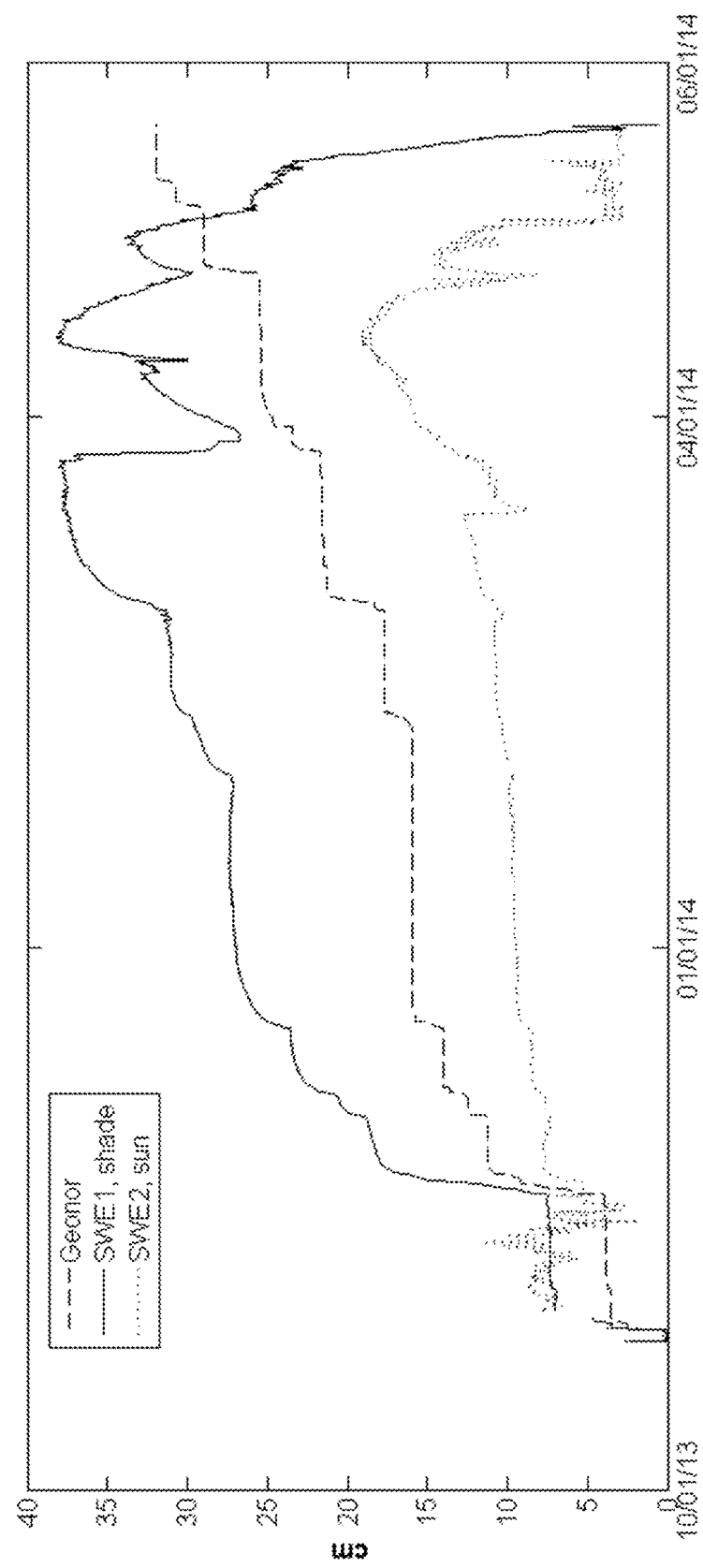
FIG. 17 is a graph comparing SWE plates and bulk precipitation results.
Figure 18:
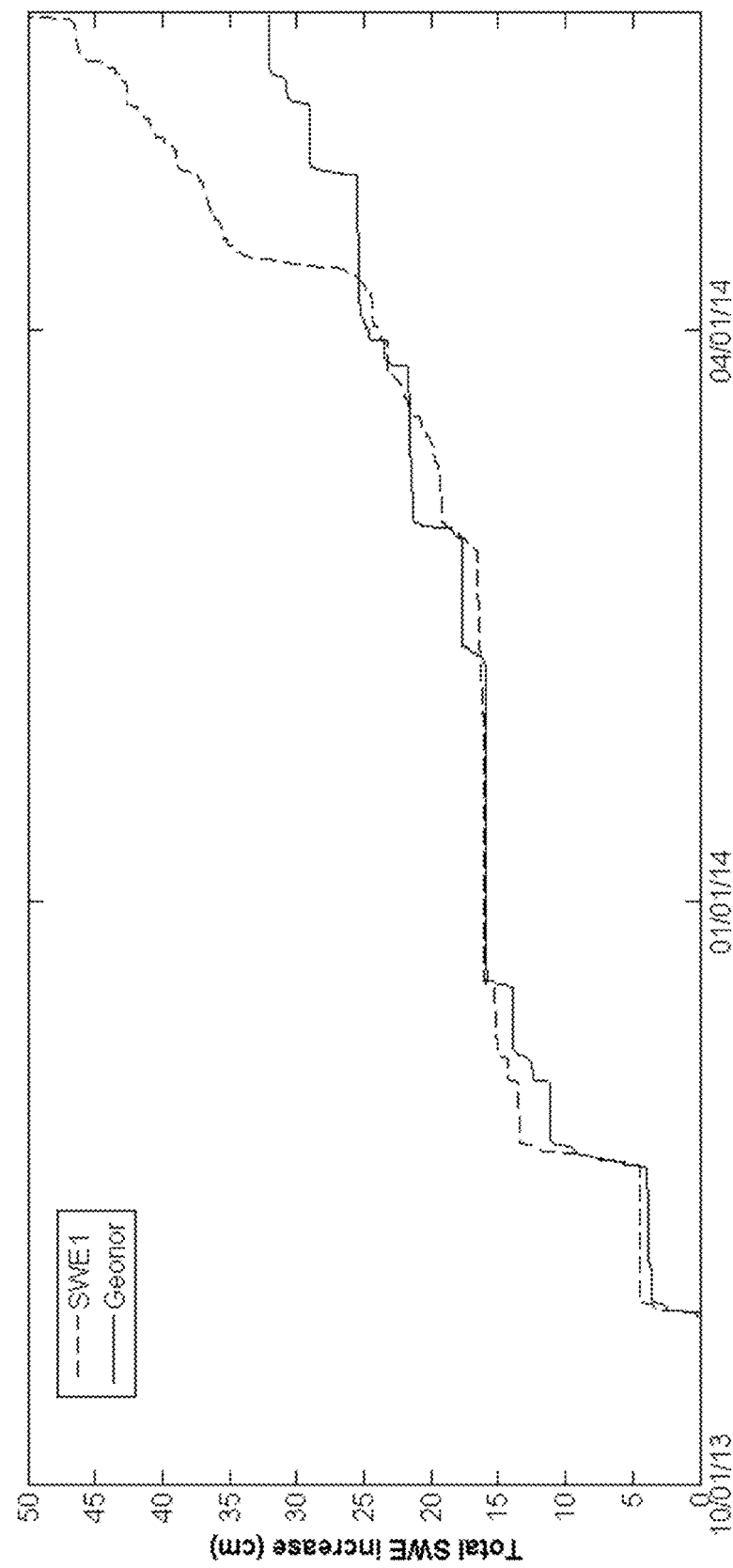
FIG. 18 is a graph comparing cumulative increase of SWE1 to the bulk precipitation gage.
Figure 19:
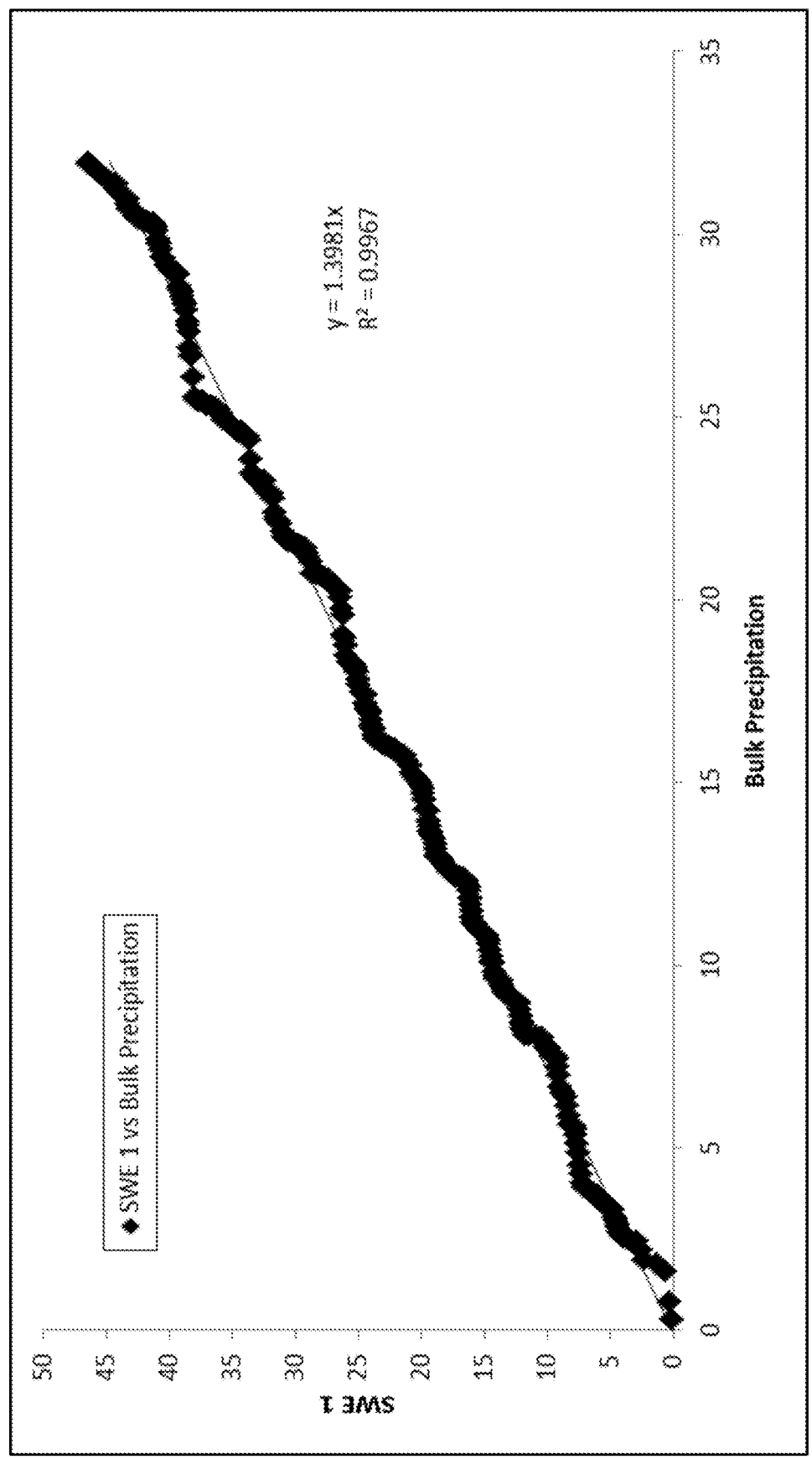
FIG. 19 is a graph comparing SWE sensor increase only to bulk precipitation gage increase.

Two SWE plate sensors from the 2013-2014 winter season were compared to a bulk precipitation gage (FIG. 17). Bulk precipitation was used to validate sensor response to precipitation input. The bulk precipitation gage measurement cannot be used for pressure sensor accuracy due to possible errors in both sensors based on the measurement methods. The bulk precipitation gage is 2.5 m above ground with an alter shield to reduce errors from wind and not subject to snow redistribution that can affect the ground based sensor measurement. The shaded sensor (SWE1) shows a strong response to increased mass with the accumulation of snow when compared to the increase in mass from the bulk precipitation gage. The sun exposed sensor (SWE 2) had less increase in response possibly due to a significant ice lens that was discovered during core sampling. The bulk precipitation gage only shows increases in precipitation. To compare the pressure sensor to the bulk precipitation gage, only increases in mass had to be examined. The total increase of SWE from the pressure sensor was calculated by adding all the hourly increases in the data for the complete time series. The SWE increases were then graphed versus the increases in the bulk precipitation gage (FIGS. 18 and 19). In FIG. 18, later season response and increase differences can be from sensor errors caused by snow bridging that resolve when the snowpack becomes isothermal (uniform temperature of 0° C.) and begins to melt and thus redistributing the mass onto the sensor. FIG. 19 shows excellent linearity, but absolute accuracy cannot be determined using these measurements due to the possible errors in both types of sensor and the differences in measurement which was between 35 and 40% at times. Results of the SWE 1 sensor increases compared to the bulk precipitation increases resulted in good correlation with an $r^2=0.9967$ and a slope of 1.39, but the p-value of 0.47 indicated that the results were not significant. The high p-value can be interpreted as the increase in bulk precipitation does not necessarily translate to the same direct change in the pressure sensor measurement as shown in FIG. 17 where SWE 1 is measuring ≈40% more SWE at times. The bulk precipitation gage has a smaller opening (15.9 cm) and is situated 2.5 meters above ground with an alter shield to reduce wind effects, thus only retrieving direct input of precipitation from the atmosphere whereas the pressure sensor is on the ground and can have input from both atmosphere and wind redistribution. This result can be justified as the bulk precipitation gages have continually shown bias towards under catch of precipitation caused by wind effects and present under estimation of precipitation even with wind protection. Furthermore, while precipitation gages such as these have inherent errors typically attributed to under catch, ground based sensors have inherent errors from redistribution and wind transport as well as edge effects. The high linearity and $r^2$ suggest that the sensors did both increase at the same time, but absolute accuracy cannot be determined due to the errors that are both located in the bulk precipitation gage and the potential errors with the pressure sensor. However, since correlations are so linear, it would allow you to correct any discrepancy based on field determinations of SWE.

Figure 20:
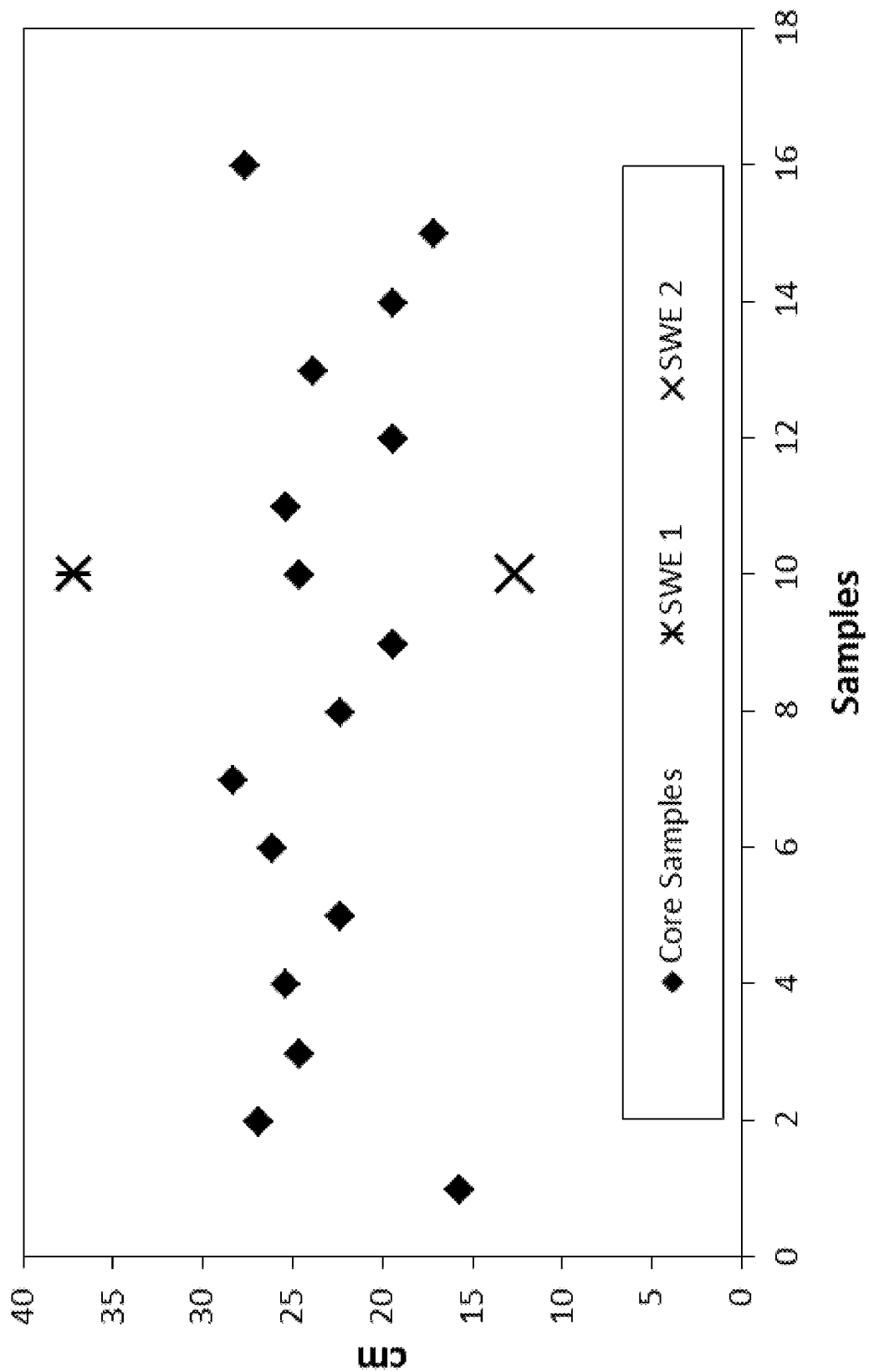
FIG. 20 is a comparison of manual SWE measurements with SWE sensor results.

A field site visit was accomplished by use of alpine touring skis in the spring of 2014 to the Subalpine West site in the Snake Range, Nev. to make manual SWE measurements and assess the snowpack. Sets of 8-10 manual SWE samples using a Mt. Rose Federal sampler were taken on Mar. 15, 2014 in 1 meter increments directly adjacent (<1 m) to each sensor. Results of SWE near SWE 1, in the shade, were from 15-28 cm from the samples taken within 10 meters. The mean SWE was 23 cm and the samples had a coefficient of variation of 17%. Samples collected next to SWE 2, in the sun, were from 17-27 cm from samples taken within 8 meters. The mean SWE was 22 cm and the samples had a coefficient of variation of 17% (FIG. 20). In As seen in FIG. 20, the results of 16 manual SWE measurements are between 15 and 28 cm of SWE with a mean of 23 and a standard deviation of 3.82. The SWE sensors measured 13 cm (sun) and 38 cm (shade). The pressure sensors were not measuring in the range of the manual measurements but within the +/−3 standard deviations of the manual measurements. These differences in measurement can be attributed to high variability of SWE within 1-10 m (López-Moreno et al. 2013). The mean of the two sensors was within 8% of the mean of the manual measurements, thus suggesting that multiple measurements of SWE may reduce uncertainties induced by spatial variability.

Additional Field Calibration Tests

Figure 21:
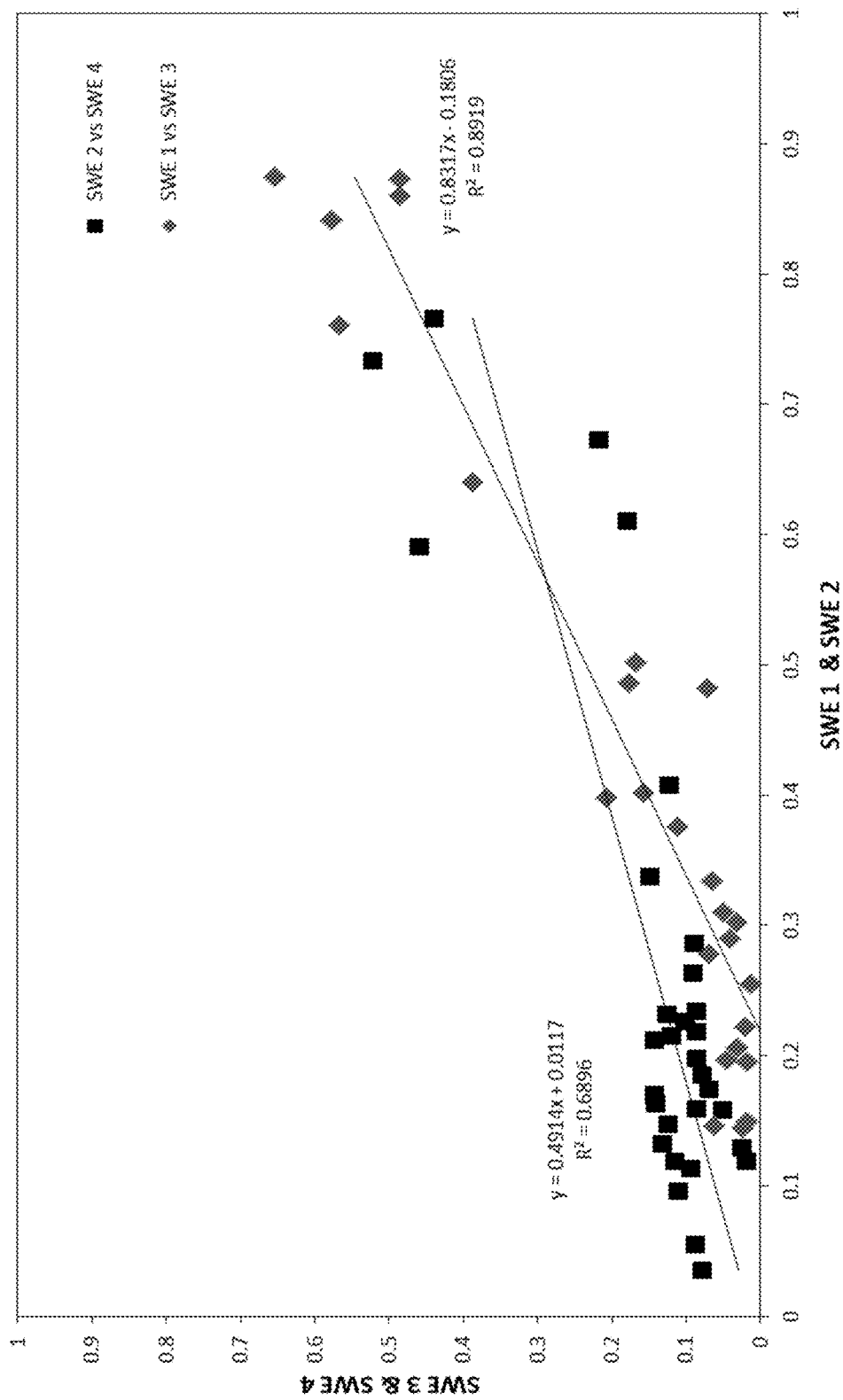
FIG. 21 is a comparison of SWE sensor pairs.
Figure 22:
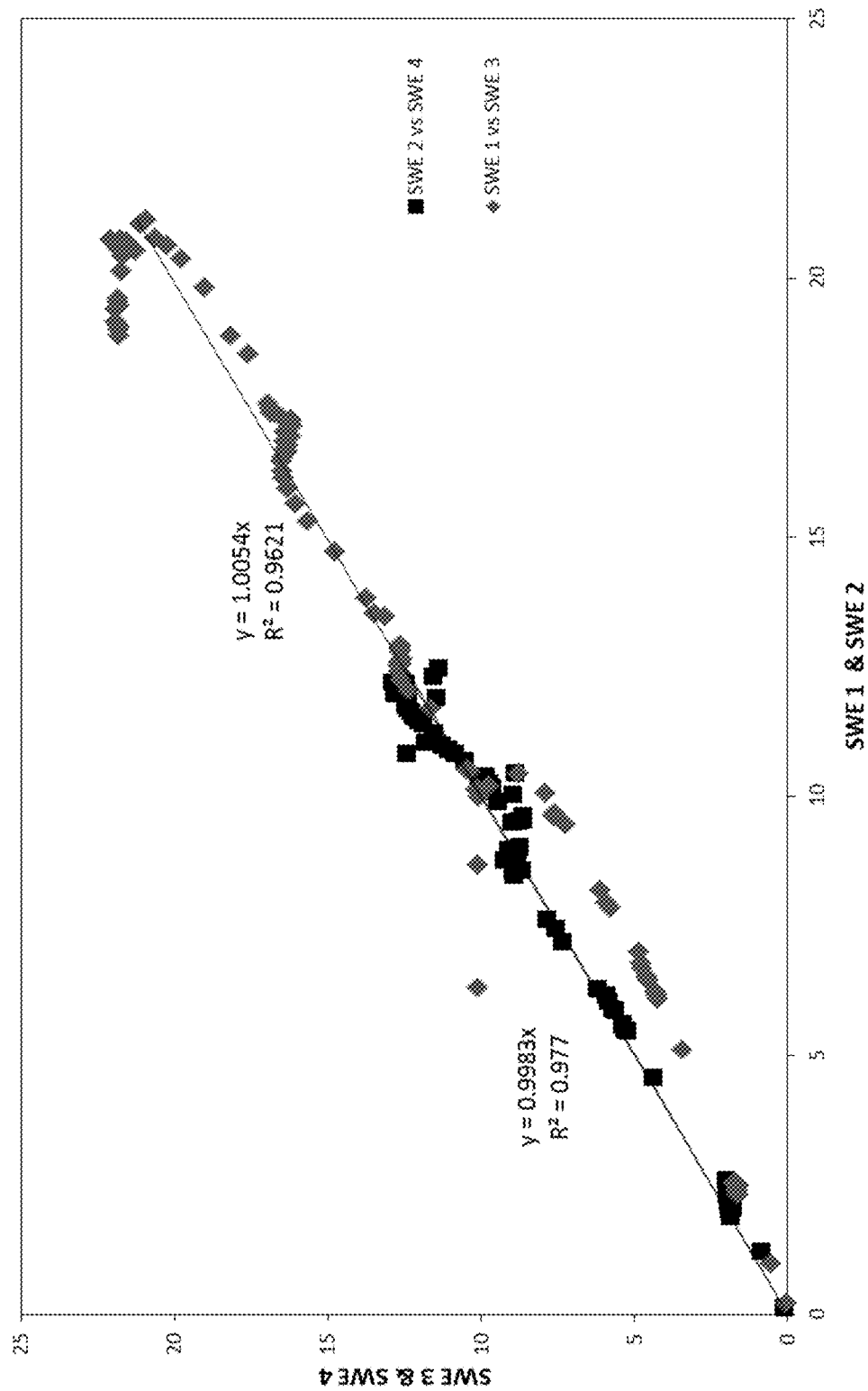
FIG. 22 is a comparison of changes in SWE for different sensors.
Figure 23:
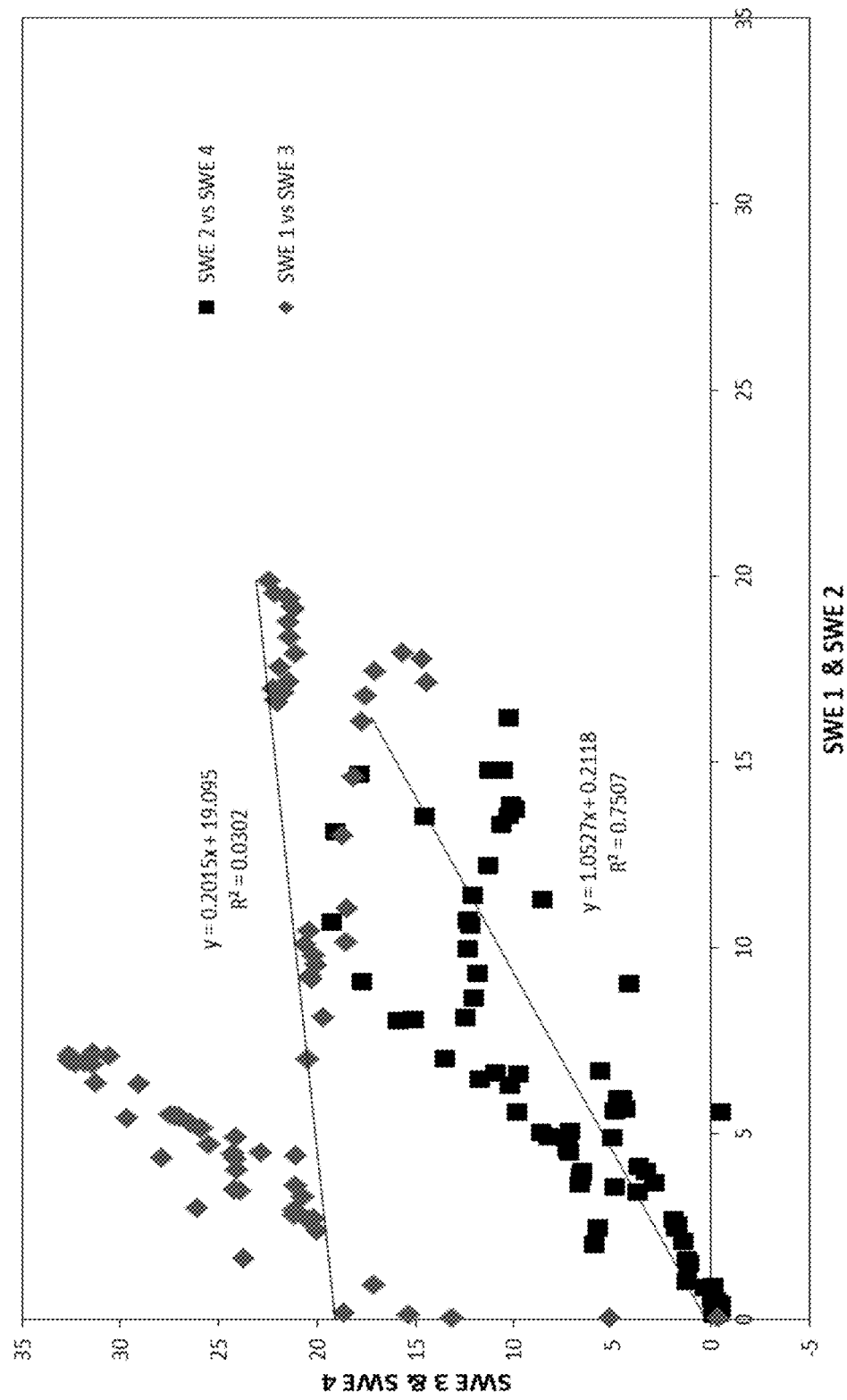
FIG. 23 is a comparison of changes in SWE for direct exposure sensors and shade protected sensors.

Two additional SWE sensors were installed next to the existing sensors at Subalpine West for replicate measurements during the 2014-2015 winter season. The two replicate SWE sensors show similar response to accumulation of snow with all regression results having significant p-values unless otherwise noted. Early season precipitation event analysis (smaller storms that do not create a continuous snowpack) showed better agreement between the shaded/protected pair than the sun/exposed pair. Results of early season comparison were SWE 1 compared to SWE 3 (shaded) $r^2=0.89$ with a slope of 0.8317, and SWE 2 compared to SWE 4 (exposed) $r^2=0.68$ with a slope of 0.4914 (FIG. 21). FIG. 21 depicts an early season comparison of SWE sensor pairs located at the NevCAN Subalpine West site. The shade protected sensors SWE 1 and SWE 3 had better correlation with an $r^2=0.89$ compared to the sun exposed pair of SWE 2 and SWE 4 that had an $r^2=0.69$. The late fall precipitation events typically result in ephemeral snowpack which supports the results of the comparison since the shade protected sensors can retain the snowpack longer than the sun exposed sensor pair. Accumulation to peak had good agreement between sensors for both sets of replicate samples. Results were: SWE 1 compared to SWE 3 (shaded) $r^2=0.96$ with a slope of 1.005, and SWE 2 compared to SWE 4 (exposed) $r^2=0.97$ with a slope of 0.9983 (FIG. 22). In FIG. 22, there is a comparison of the changes in SWE during accumulation to peak for sensors 1 versus 3 and 2 versus 4 to validate response and measurement of SWE sensors. Strong agreement between both sets of sensor pairs during accumulation is consistent with the results from the 2014 season comparison to accumulation compared to increase in bulk precipitation. This clearly shows that the sensors do respond to direct input of new snow onto an existing snowpack. Late season melt phase is when the snowpack can be extremely variable and results show that the sun exposed sensors had better agreement with a slope of 1.05 and an $r^2=0.75$ while the shaded sensors had a slope of 0.02 and an $r^2=0.03$ (FIG. 23). FIG. 23 shows a comparison of changes in SWE during the melt phase clearly show that direct exposure to solar radiation of SWE 2 and 4 result in better agreement than the shade protected sensor SWE 1 and 3. This exemplifies both the spatial variability in forested snowpack as it relates to melt timing as well as the need for multiple measurement points in such locations. This difference can be attributed to the shaded sensors having different melt rates between the set. SWE 3 was slightly downslope and closer to the trees giving it less sun exposure as the springtime sun angle changed. Early season and melt phase results are consistent with previous studies that have shown higher variability in both depth and density during these times. Specifically, early season precipitation events can lead to ephemeral snowpack and the shade protected sensors showed better correlation due to the retention of the small snowpack compared to the sun exposed sensor pair. Results from the exposed sensors compared to the shaded sensors support previous findings in melt phase variability as a function of snow density and solar radiation as shown in the sun exposed sensor pair that had equal exposure to solar radiation while the shade protected pair had differential exposure as SWE 1 was slightly more upslope from the trees and completely melted out before SWE 3.

Figure 24:
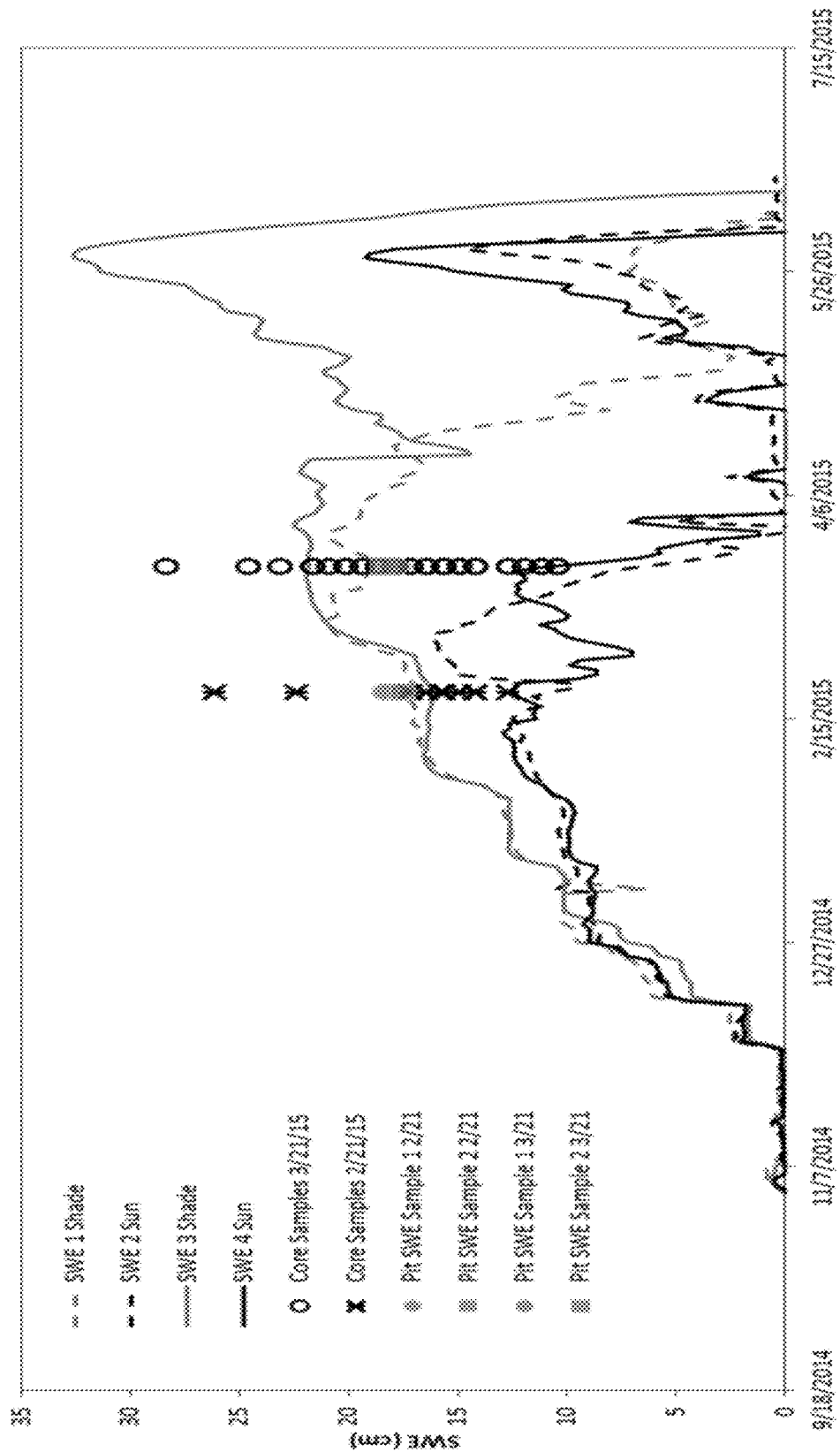
FIG. 24 is a winter season time series with replicate SWE sensors.

Two separate field site visits were made in the winter and spring of 2015 to acquire manual SWE measurements and snowpack assessments. The first set of snow cores on Feb. 21, 2015 were taken in 1 meter increments directly adjacent (<1 m) to each sensors, while the second set of snow cores on Mar. 21, 2015 was taken as a transect starting 16 meters down slope and ending 30 meters up slope of the sensor area. Snow cores were taken at intervals of 0.2 meters (adjacent to the sensors), 1 meter, 3 meters and 5 meters. Snow pits were sampled on each visit within 5 meters of the sensors. SWE of the snow cores taken in February ranged from 13 to 22 cm from the shaded sensors, and show a coefficient of variation of 18% and SWE of the snow cores from the exposed sensors ranged from 14 to 26 cm with a coefficient of variation of 24%. Sixty snow cores were taken during the March site visit and SWE values ranged from 10 to 28 cm, and show a coefficient of variation of 22% (FIG. 24). FIG. 24 depicts a 2014-2015 winter season time series from NevCAN Subalpine West site with replicate SWE sensors. The differences in the shaded sensors in the late season show the variability in the melt phase as shown in FIG. 23. Manual snow core samples have a lot of variability and thus cannot be used to directly measure the accuracy of the ground based pressure sensors but they can define a range in which the SWE sensor measurement can be compared. This variability needs to be taken into account when assessing sensor accuracy because taking snow cores directly on the sensor would have disturbed the actual sensor measurements.

Figure 25:
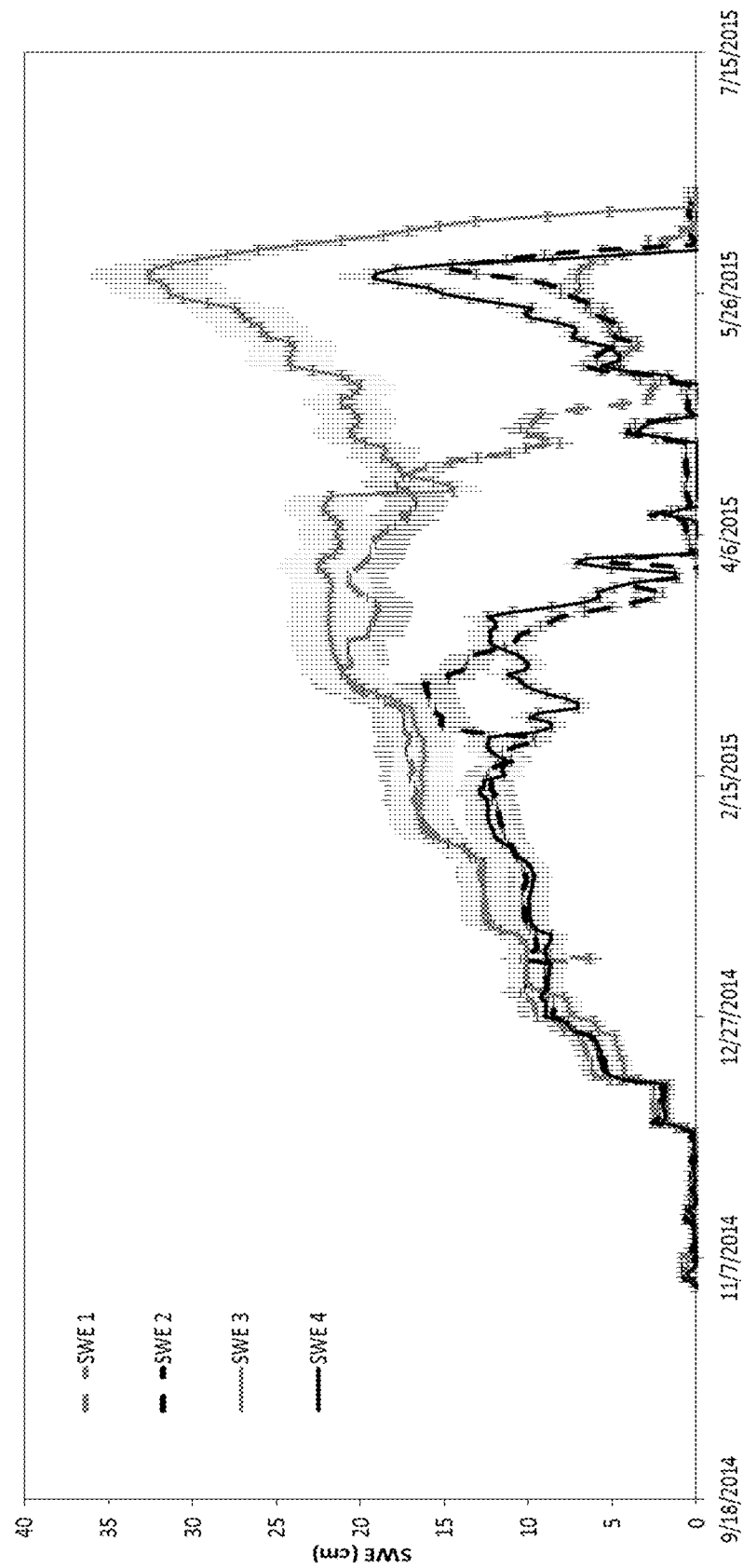
FIG. 25 is a graph of SWE sensor data showing variation from snow core samples.
Figure 26:
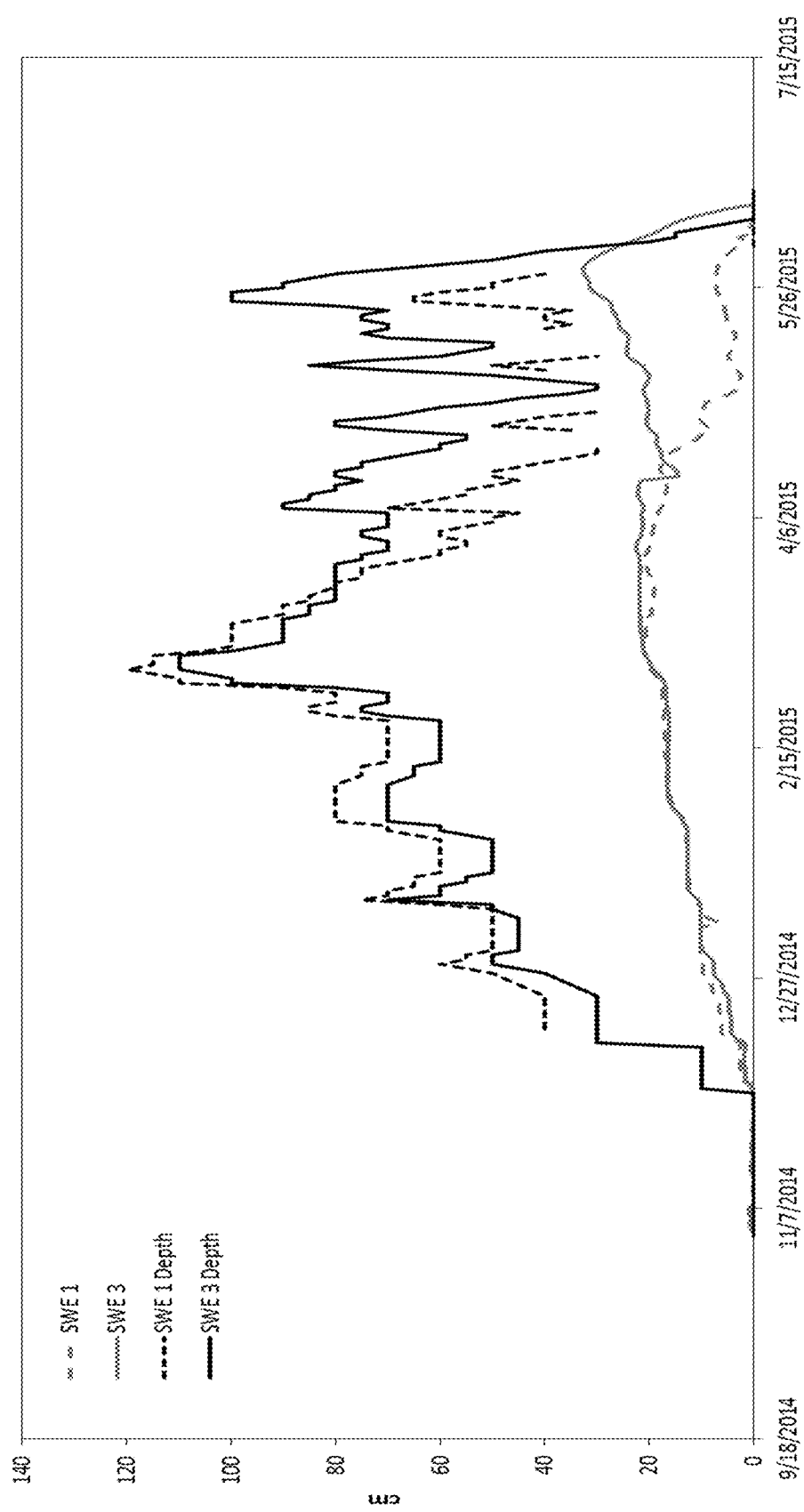
FIG. 26 compares sensors that are located in the shade to the visual depth estimates.
Figure 27:
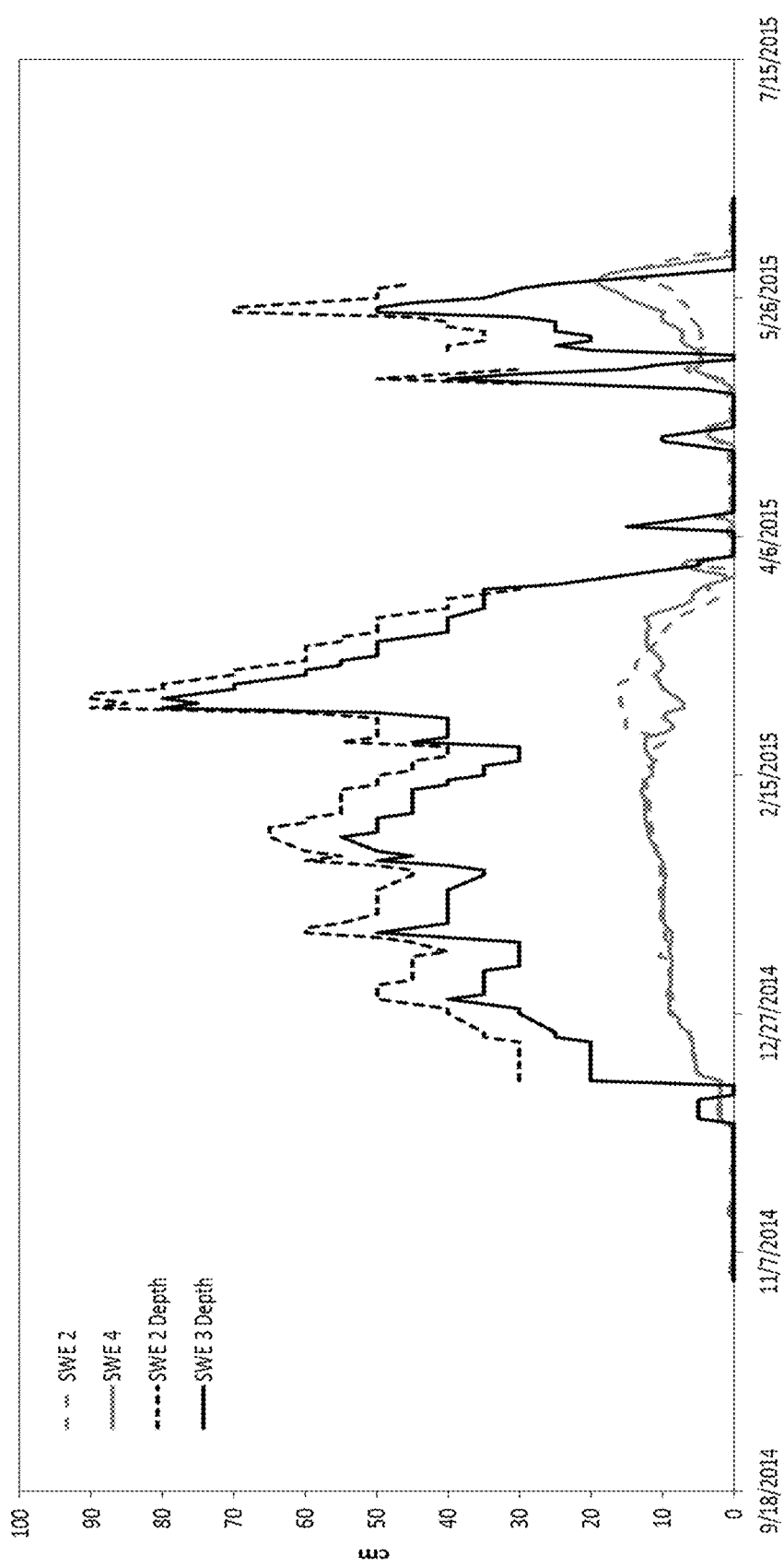
FIG. 27 compares sensors located in the sun exposed area the visual depth estimates.

Comparing the sensor readings using whiskers that represent one half of the coefficient of variation on each side of the time series of the co-located sensors in each set show sensor agreement within the one standard deviation of the manual snow cores until melt phase (FIG. 25). FIG. 25 shows SWE sensor data with whiskers representing the 22% coefficient of variation from the snow core samples taken from 0.2-5 meters apart. Using this metric the sensors show good agreement as the paired sensors weight plates are situated <2 m from each other. The sun exposed sensors SWE 2 and 4 have better agreement during melt as they had equal solar radiation whereas SWE 3 was shaded more than SWE 1 which resulted in more snow retention, higher SWE and later melt. Measurement variability during melt phase was confirmed by daily photos of snow stakes placed next to each sensor. These photos were also used to construct snow depth profiles (FIGS. 26 and 27). The angle of the camera did not allow visual confirmation of both snow stakes 1 (shade) and 2 (sun) below 30 cm. The snow stakes were marked at 10 cm intervals, and 5 cm estimates of snow depth were made by looking at the photos for each day. Although SWE is density related, the depth comparisons can validate the response of the co-located sensors. For instance, FIG. 26 shows how the shaded sensors differed in the later season as SWE 1 had much lower snow depth and melted out before SWE 3. The comparison of depth measurements to the sun exposed sensors show sensor response to smaller late season inputs after an initial melt out had occurred as well as the larger late season storm. The magnitude of the SWE measurements during the late season storm are consistent with previous studies of seasonal density patterns of snow with late season snow having much higher density.

FIG. 26 shows Sensors 1 and 3 that are located in the shade, compared to the visual depth estimates. Snow stake 1 was not visible below 30 cm in daily photos. Although SWE is density related the depth measurements verify the seasonal patterns measured by the SWE sensors. Divergence between the two sensors were the same in depth and SWE so that the measured differences of SWE between the sensors was likely real. FIG. 27 compares Sensors 2 and 4 located in the sun exposed area with the visual depth estimates. Snow stake 2 was not visible below 30 cm in daily photos. The depth measurements confirm an earlier seasonal melt out of the sun exposed sensors compared to the shade protected sensors. The snow depth measurements also confirm late season response to multiple precipitation events that resulted in ephemeral snowpack. The large late season storm in May 2015 had a high SWE measurement that would be consistent with studies showing higher density of snow in late season compared to early season.

Figure 28:
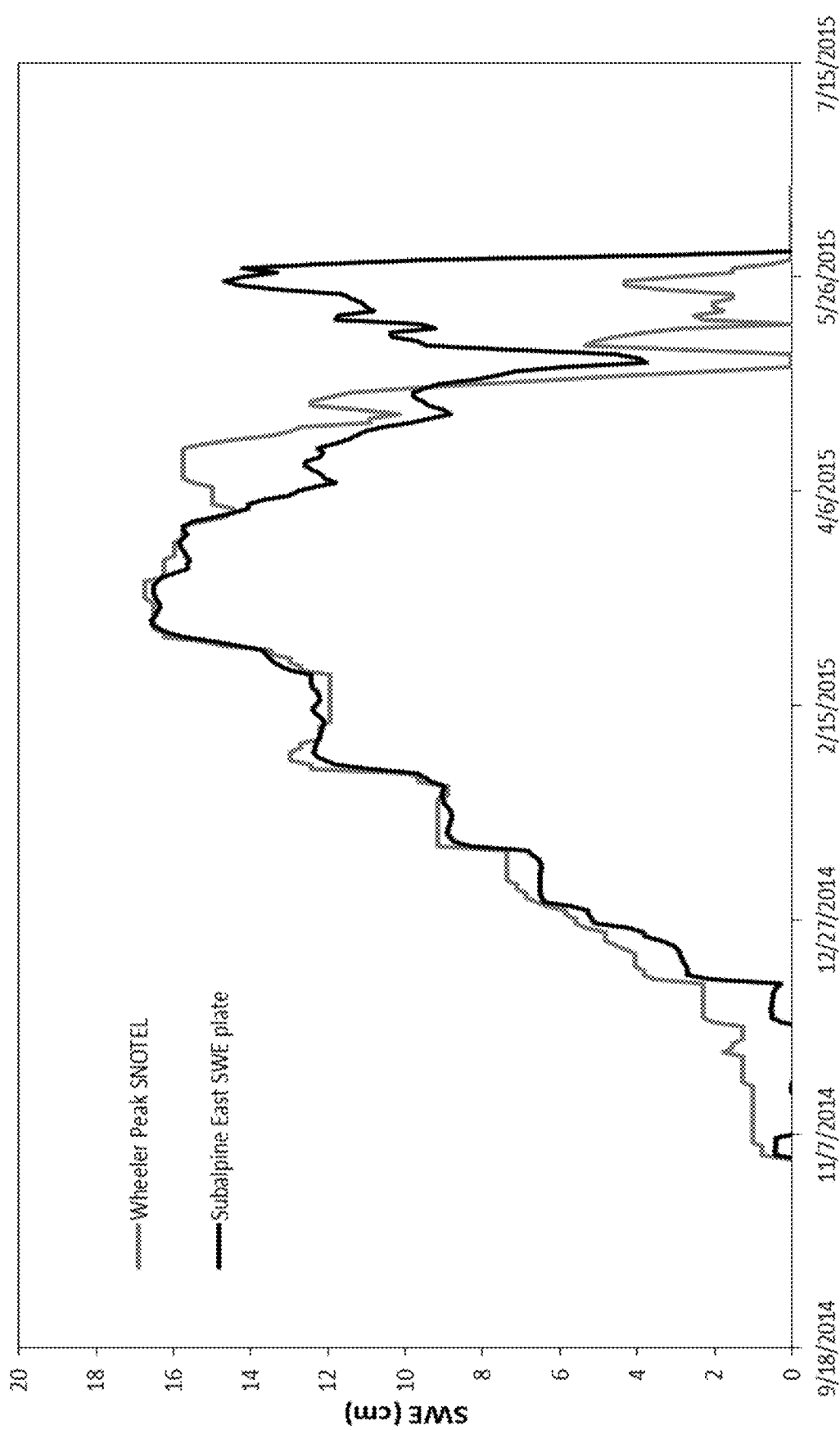
FIG. 28 compares results from an SWE plate and a SNOTEL station snow pillow.
Figure 29:
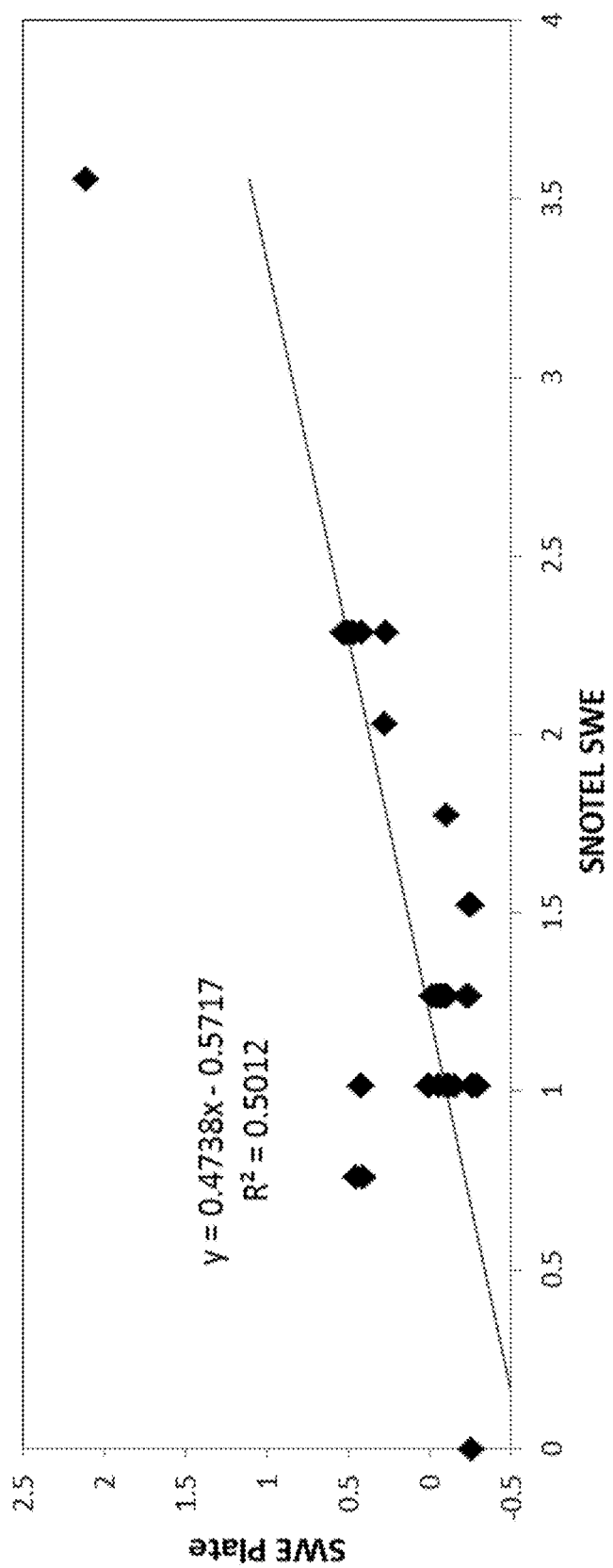
FIG. 29 is an early season comparison of a SNOTEL snow pillow and a loadcell SWE sensor.
Figure 30:
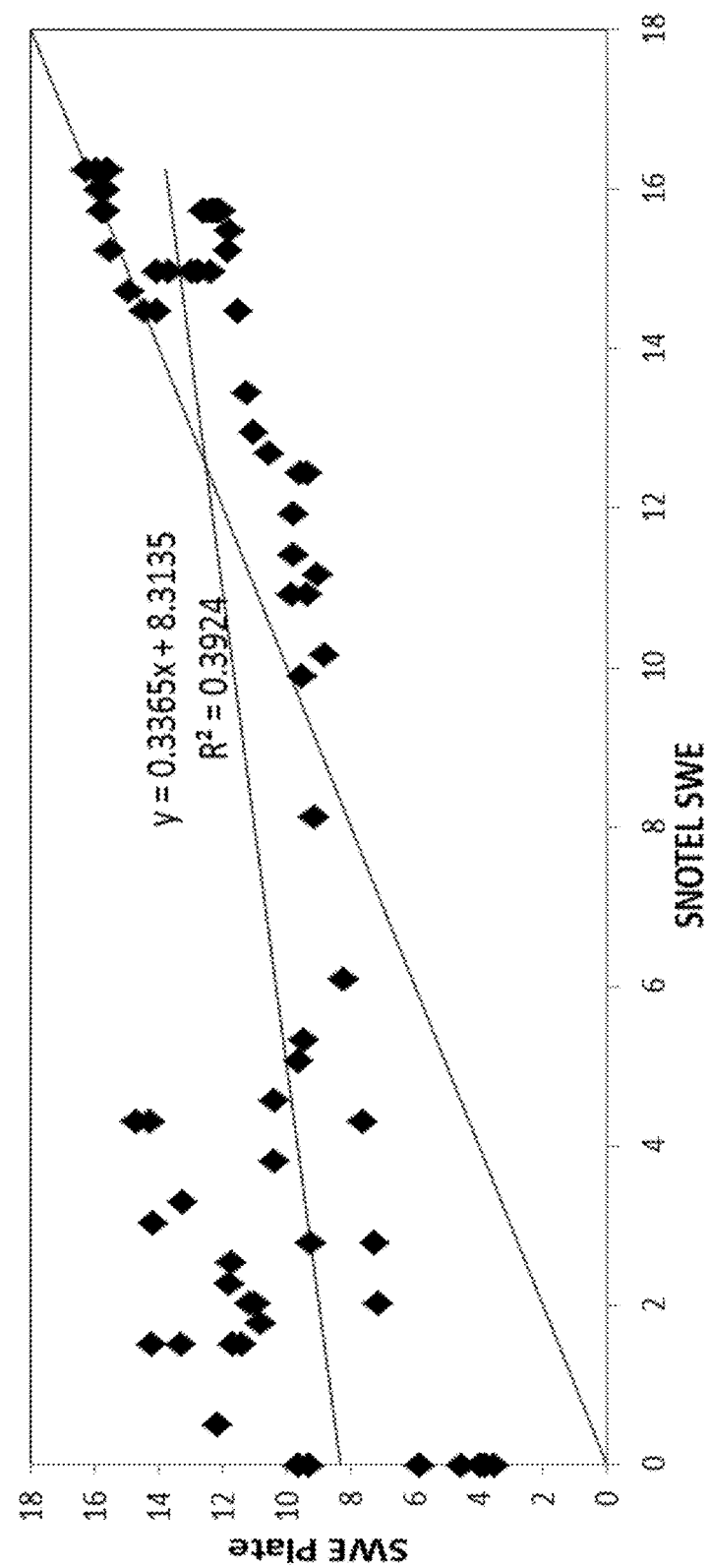
FIG. 30 depicts high variability between the sensors during the melt phase.
Figure 31:
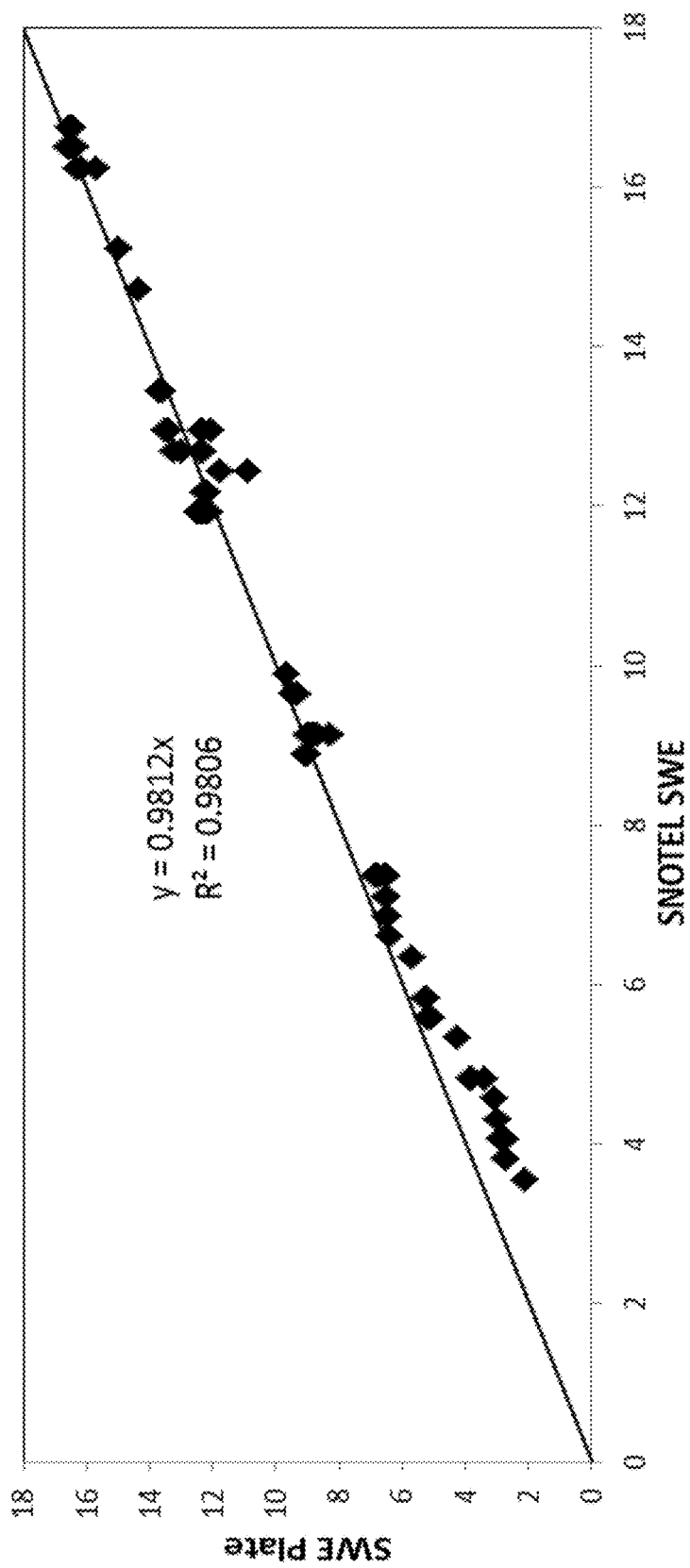
FIG. 31 is a comparison of the accumulation to peak of a snowpack for the SNOTEL pillow and an SWE sensor.

Additional field calibration tests were also performed at Subalpine East, Great Basin National Park, Snake Range, Nev. The loadcell was defective in 2013-2014 and no data was available for this season. The defective loadcell was replaced by the manufacturer the following spring. The 2014-2015 winter season data was compared to the Wheeler Peak SNOTEL (NRCS station #1147) snow pillow located 50 meters from the loadcell sensor (FIG. 28). FIG. 28 compares Subalpine East SWE plate and Wheeler Peak SNOTEL station snow pillow. The early and late season differences are due to the distance between the sensors being roughly fifty meters. The large late season difference was confirmed by photos that showed a large swath of snow remaining directly behind the meteorological sensor tower and that covered the SWE sensor when all other surrounding areas were snow free by which it is assumed that the SNOTEL pillow was melted out as well. The time series for the daily SWE values for the SNOTEL and loadcell sensor agree well when there was a snowpack, but show differences in the early season intermittent snowpack and the late season melt. Early season snowpack is intermittent with fluctuating temperatures whereas late season melt is different due to density of snowpack and sun exposure. Linear regression of the SWE sensors compared to the SNOTEL snow pillow for early season intermittent snowpack and late season melt resulted in slopes of 0.47 and 0.34 and $r^2=0.50$ and $r^2=0.39$ respectively. The accumulation period for the sensors was determined by the start of continual snowpack. Comparing the SWE senor data to the SNOTEL pillow for the period of record from the start of accumulation to the peak SWE showed good agreement with the linear regression resulting in a slope of 0.98 and an $r^2=0.98$ FIGS. 29, 30 and 31). FIG. 29 depicts an early season comparison of the SNOTEL snow pillow and the loadcell SWE sensor at Subalpine East. The sensors did show some similar response to early season storms but the distance between the sensors can account for the differences in actual measured SWE as early season snowpack can be highly variable. FIG. 30 illustrates how the melt phase showed high variability between the sensors. This was confirmed by daily photos at the Subalpine East site that showed a large swath of snow covering the SWE sensor while all the surrounding areas were snow free. We assume the SNOTEL data is real as the snow pillow is located in a similar aspect to that of the snow free area in the pictures closest to the Subalpine East tower. FIG. 31 depicts the comparison of the accumulation to peak of the snowpack for the SNOTEL pillow and the Subalpine East SWE sensor. These sensors showed very good agreement when there was a continual snowpack. This agreement is a strong indication that the SWE sensor is measuring the response to input as well as SWE itself as the snow pillows have been accepted as accurate for over forty years.

Figure 32:
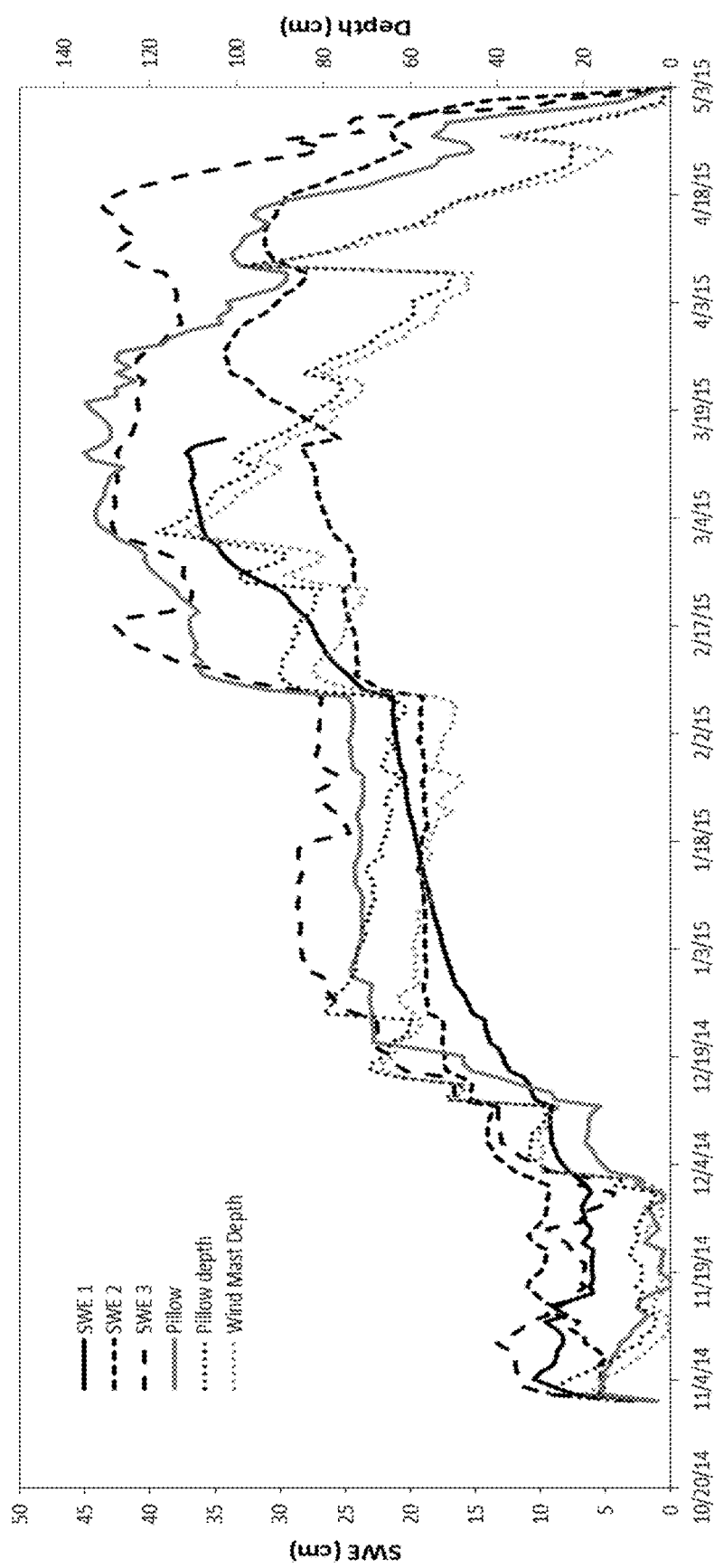
FIG. 32 is a comparison of three SWE sensor plates to corresponding snow pillows.
Figure 33:
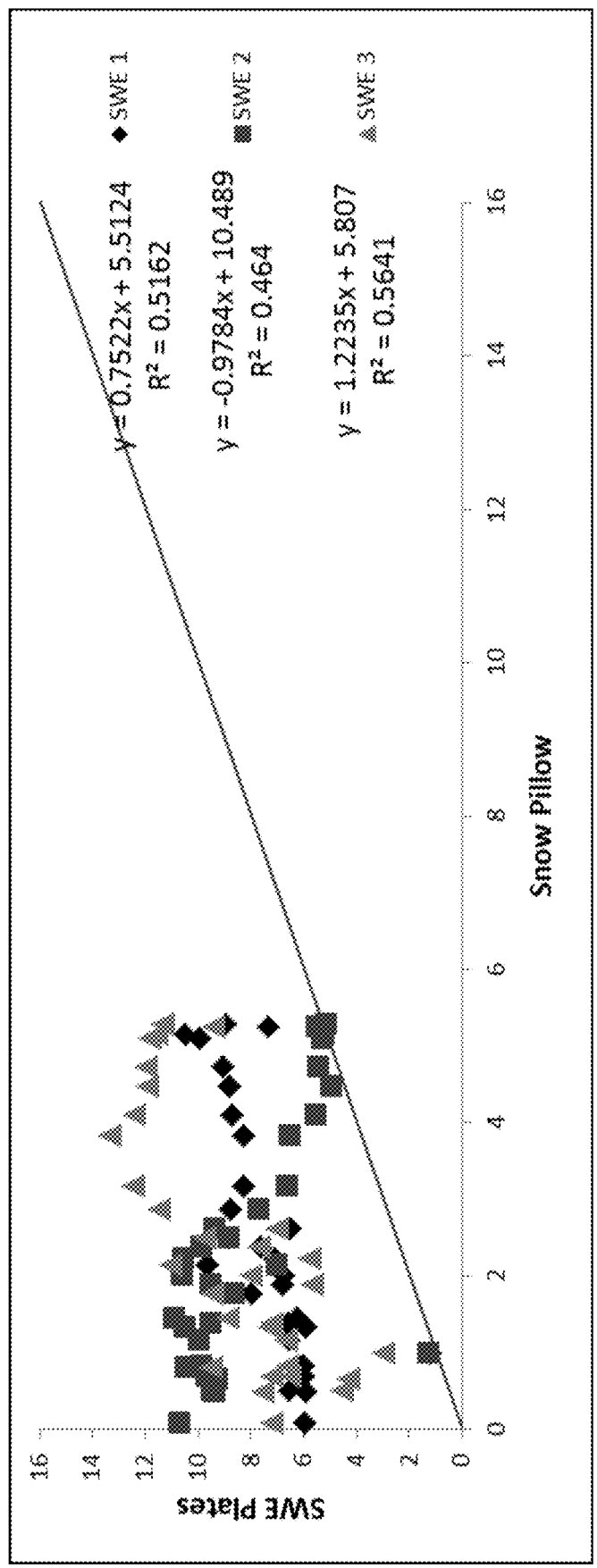
FIG. 33 is an early season comparison of SWE plates versus snow pillows.
Figure 34:
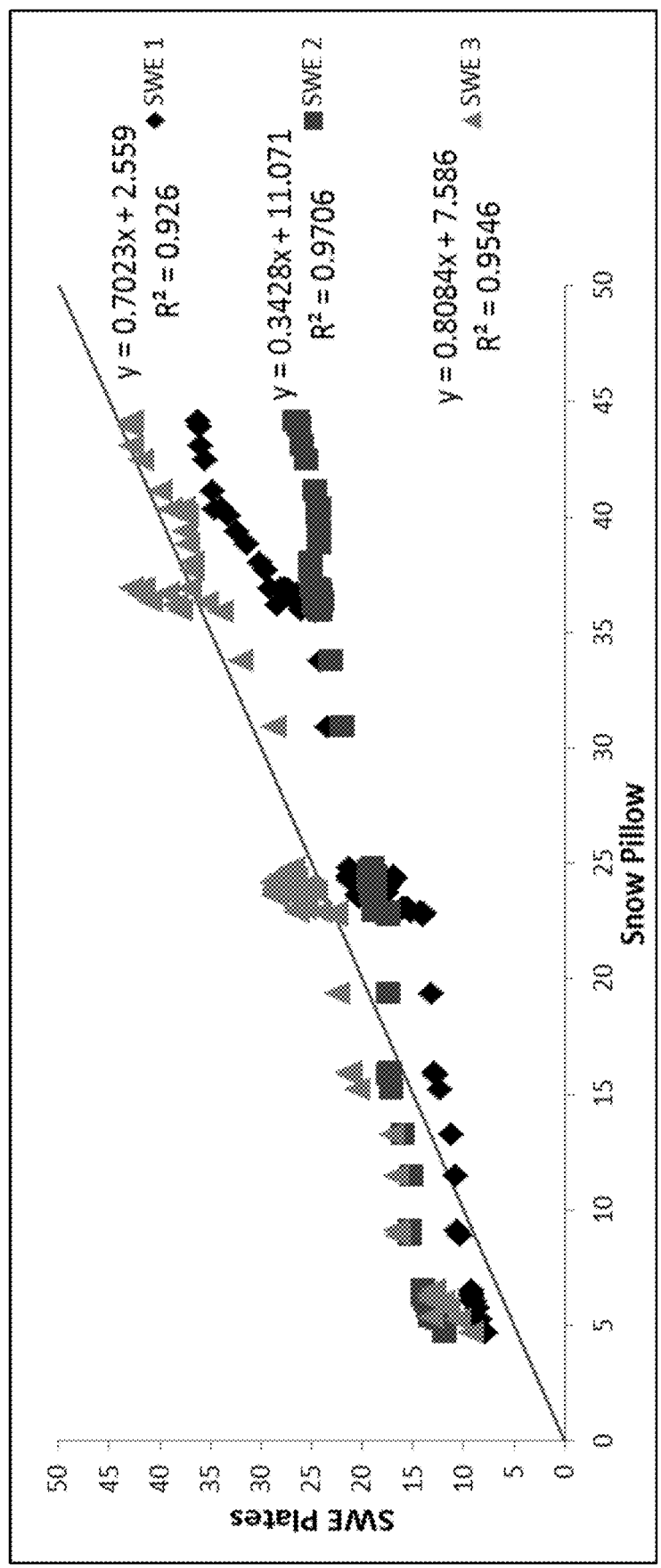
FIG. 34 is a comparison of accumulation to peak SWE measured by three SWE sensors versus that measured by a snow pillow.
Figure 35:
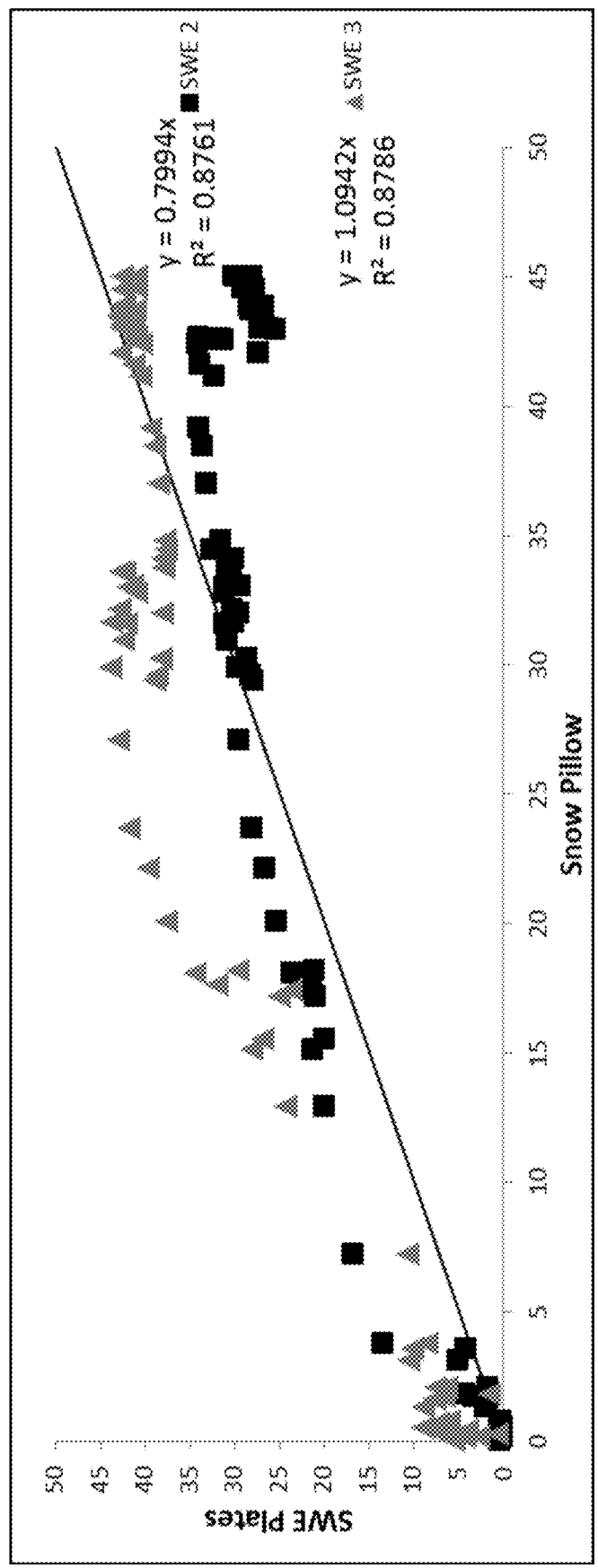
FIG. 35 is a comparison of SWE sensors of an embodiment described herein to snow pillows during melt phase.

Additional field calibration tests were also performed at CRREL UCSB Eastern Sierra Snow Study Site (CUES), Mammoth Mountain, Calif. SWE plate data was compared to the snow pillow data (FIG. 32). FIG. 32 is comparison of three SWE plates to the snow pillow during the 2014-2015 winter season. Ultrasonic sonar depth measurements are displayed to show sensor response to accumulation and melt events. SWE 1 began having electrical malfunction in December 2014 and showed differential response to input until complete failure in mid-March 2015. SWE 2 shows limited response compared to SWE 3 and the snow pillow to snow increases starting in late December 2014. This is likely due to bridging caused by a thick ice lens in the snowpack that was created when a warm storm raised snow levels above 10,000 ft and was followed by a high pressure ridge of colder temperatures. This underestimation of SWE continued until mid-March 2015, when the snowpack became isothermal and the sensor measurement resolved by increasing SWE 10 cm while the snow depth was declining. SWE 3 was installed less than three meters away from the snow pillow. SWE 2 was placed approximately six meters away from the snow pillow in a flat open area and SWE 1 is roughly ten meters away from the snow pillow next to the wind mast depth sensor. The site, though considered more homogeneous than the other study sites, actually showed clear differences between all three sensors as well as the snow pillow. This can be a product of the micro-topography and the wind redistribution of the snow within the study area. Linear regression of SWE for each sensor versus the snow pillow for early season had similar agreement to that of Subalpine East comparison to the SNOTEL snow pillow and the replicate sensor pairs at Subalpine West. This shows that the proximity of the sensors to either the snow pillow or themselves as shown in Subalpine West does not matter in early season intermittent snowpack. The regression resulted in a slope of 0.52 and an $r^2=0.52$ for SWE 1 which was furthest from the snow pillow, a slope of 0.98 and an $r^2=0.46$ for SWE 2, and a slope of 1.22 and an $r^2=0.56$ for SWE 3 which was located just adjacent to the snow pillow (FIG. 33). FIG. 33 is an early season comparison of SWE plates versus the snow pillow at the CUES station, Mammoth, Calif. showed similar results to sensor comparisons at other study sites. This is caused by high variability of intermittent snowpack from smaller early season storms. Accumulation to peak showed better agreement between the sensors and the snow pillow with regression results of a slope of 0.70 and an $r^2=0.93$ for SWE1, a slope of 0.34 and an $r^2=0.97$ for SWE 2 and a slope of 0.80 with an $r^2=0.95$ for SWE 3. (FIG. 34). FIG. 34 is an early season comparison of SWE plates versus the snow pillow at the CUES station, Mammoth, Calif. showed similar results to sensor comparisons at other study sites. This is caused by high variability of intermittent snowpack from smaller early season storms. While the SWE sensors had good agreement, SWE 1 had a high p-value of 0.07. This was likely due to electrical malfunction in the sensor from water in the wiring junction box (discovered after the season). This error can be seen in FIG. 32 where SWE 1 began to have different response behavior to input starting in December 2014 and finally resulting in sensor failure in March 2015. With the SWE 1 failure, SWE plates 2 and 3 were compared to the snow pillow during melt (FIG. 31). Regression results had good correlation between the sensors and the snow pillow with a slope of 0.80 for SWE 2 and a slope of 1.09 for SWE 3 and both showing an $r^2=0.88$. The CUES site is an open area without tree canopy and the melt phase results are consistent with the sun exposed sensors at the NevCAN Subalpine West site, as the two SWE sensors and the snow pillow all have equal amounts of solar radiation. This result is supported by studies that show that increased solar radiation due to sun angle is a driver of snow melt in open exposed areas. Though there was good agreement between SWE 2 and the snow pillow, the regression did result in a high p-value of 0.29. This is likely due to bridging from a thick ice lens (discovered during manual snow core sampling in March 2015) that caused an underestimation of SWE starting in late December 2014 until mid-March 2015, at which time the snowpack became isothermal and the sensor showed in increase in SWE of 10 cm while the snow depth was declining (see FIG. 32). This type of error is common in ground based pressure sensors as well as the recovery of actual SWE measurement when the snow pack becomes isothermal. FIG. 35 shows a comparison of SWE 2 and 3 to the snow pillow during melt phase. The sensors had good agreement with the snow pillow on the timing of the snow melt. This is likely due to the equal exposure to solar radiation that has higher intensity in spring as the sun angle changes. While there was good agreement, SWE 2 did have a high p-value and the lower significance can be due to bridging caused by ice layers as described in FIG. 32.

Sensor Error

Figure 36:
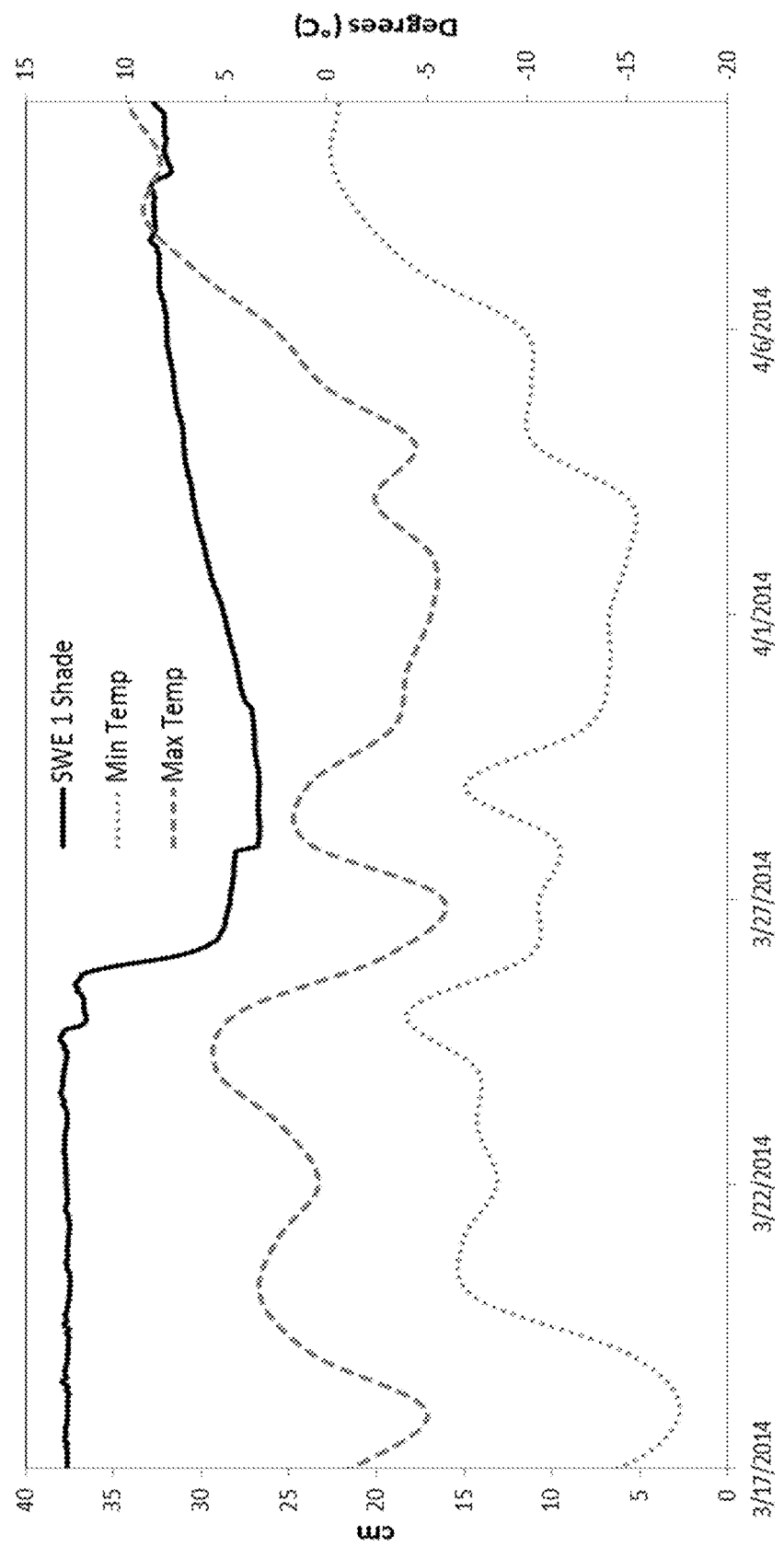
FIG. 36 is a close up of sensor error and recovery experienced by an SWE sensor of an embodiment described herein.
Figure 37:
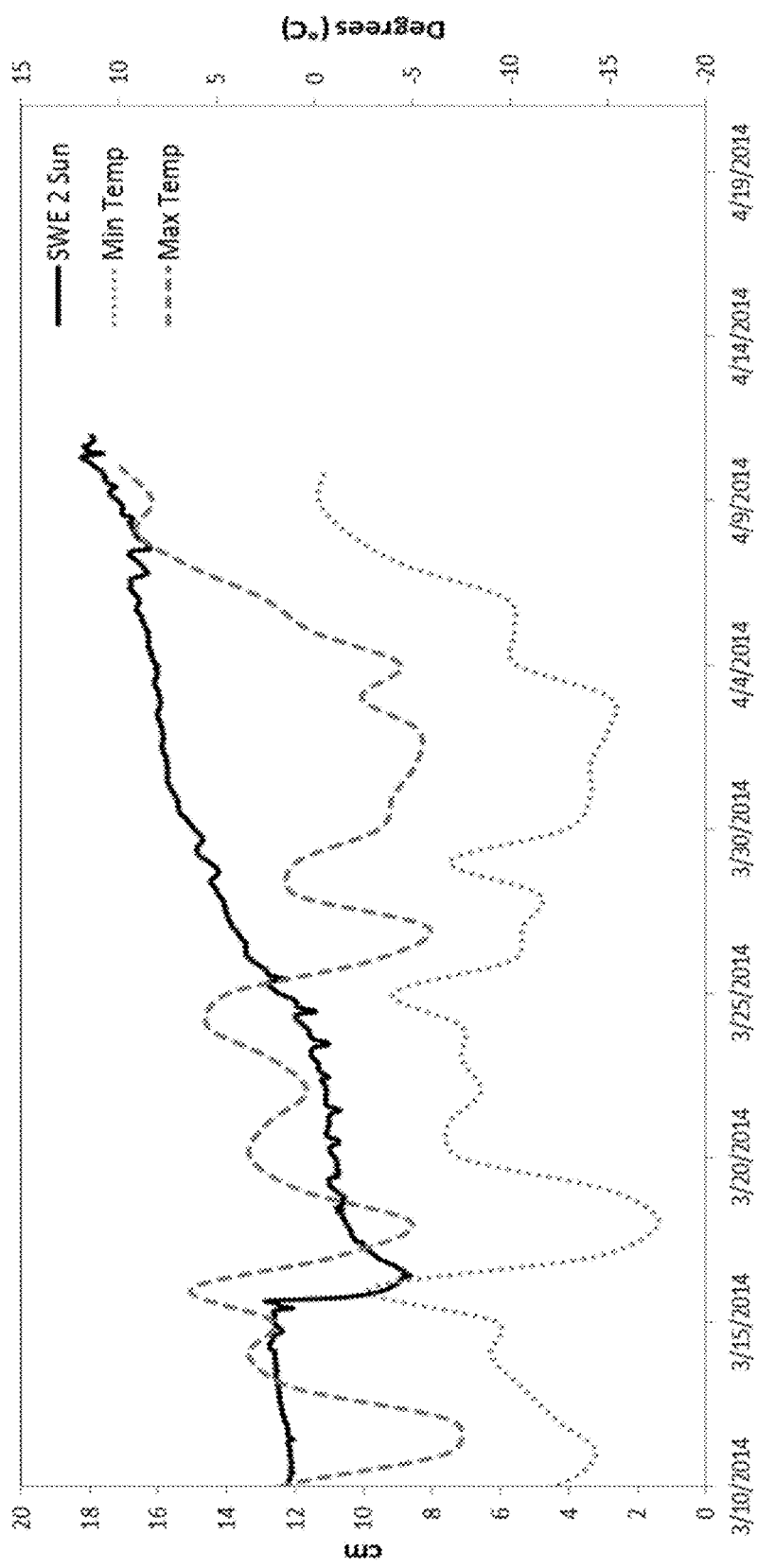
FIG. 37 is another example of sensor bridging caused by physical properties of the snow at the snow/sensor interface for the sensor of an embodiment described herein.
Figure 38:
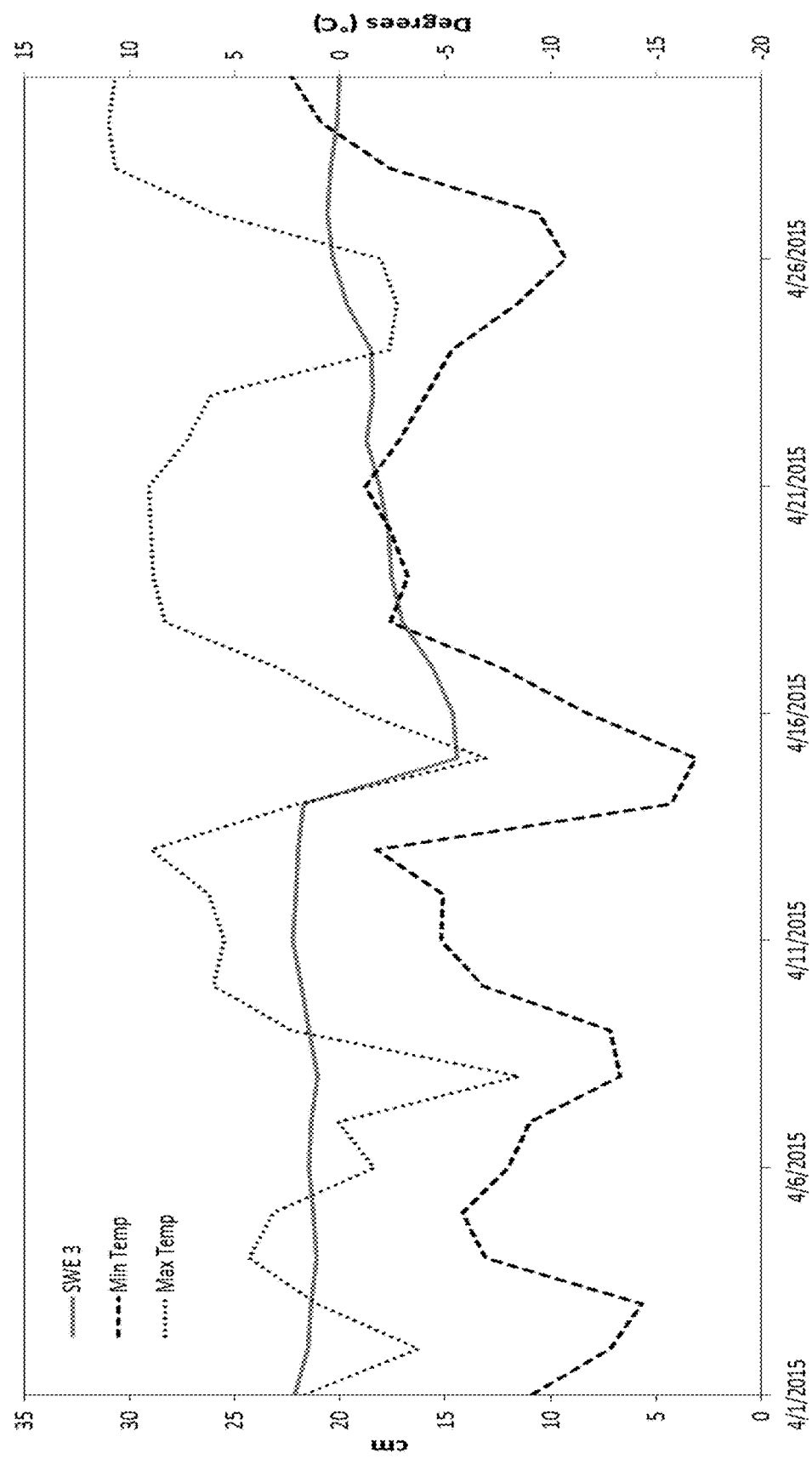
FIG. 38 is an example of snow bridging shown in FIG. 24.

The response of the SWE plates to accumulation and melt has been observed at all sites. Bridging is a common error that occurs with ground based pressure sensors. A very clear example of bridging happened to SWE 1 in FIG. 17 in March 2014. A closer examination shows the sharp decline in SWE 1 and lack of response to a precipitation event captured by the bulk precipitation gage (FIG. 36). This error can be attributed to an extended freeze event after the snowpack had been in a melt freeze cycle as shown by the minimum and maximum temperatures at that time (FIG. 36). After the temperatures rise and the snowpack becomes isothermal the measurement error ends with the sensor registering the real weight of the snowpack again. FIG. 36 shows a close up of the sensor error encountered in March 2014 for SWE 1 at the NevCAN Subalpine West site originally shown in FIG. 17. Temperature measured at the study site show a clear drop in daily temperatures that coincide with the bridging error. When the temperature begins to rise the sensor measurement begins to recover which is consistent with previous studies. Several studies have examined this type of error in both snow pillows as well as load cell ground based pressure sensors and the underestimation or sudden drop in sensor measurement and subsequent recovery at Subalpine West in FIGS. 17 and 36 are consistent with their previous findings. The sun exposed sensor showed a similar drop and similar recovery after warm temperatures returned (FIGS. 17 and 37). FIG. 37 shows bridging caused by physical properties of the snow at the snow/sensor interface. This example is from SWE 2 at the NevCAN Subalpine West site as originally seen in FIG. 17. Once again the measurement error is shown by a sudden drop in SWE measurement that is accompanied with a sudden shift in temperatures. The sensor does again resolve to proper measurement of SWE after the temperatures rise and the snowpack becomes isothermal. Another example of sensor error caused by bridging occurred on shaded SWE plate 3 at the Subalpine West site in April 2015 (FIGS. 24 and 38). FIG. 34 is an example of snow bridging originally seen in FIG. 24 from the Subalpine West site occurred in April 2015, was also accompanied by a drop in temperature. Previous studies have suggested that these errors are unavoidable, though in the past the increased size of sensor area has been thought to decrease the possible effects of the errors.

Figure 39:
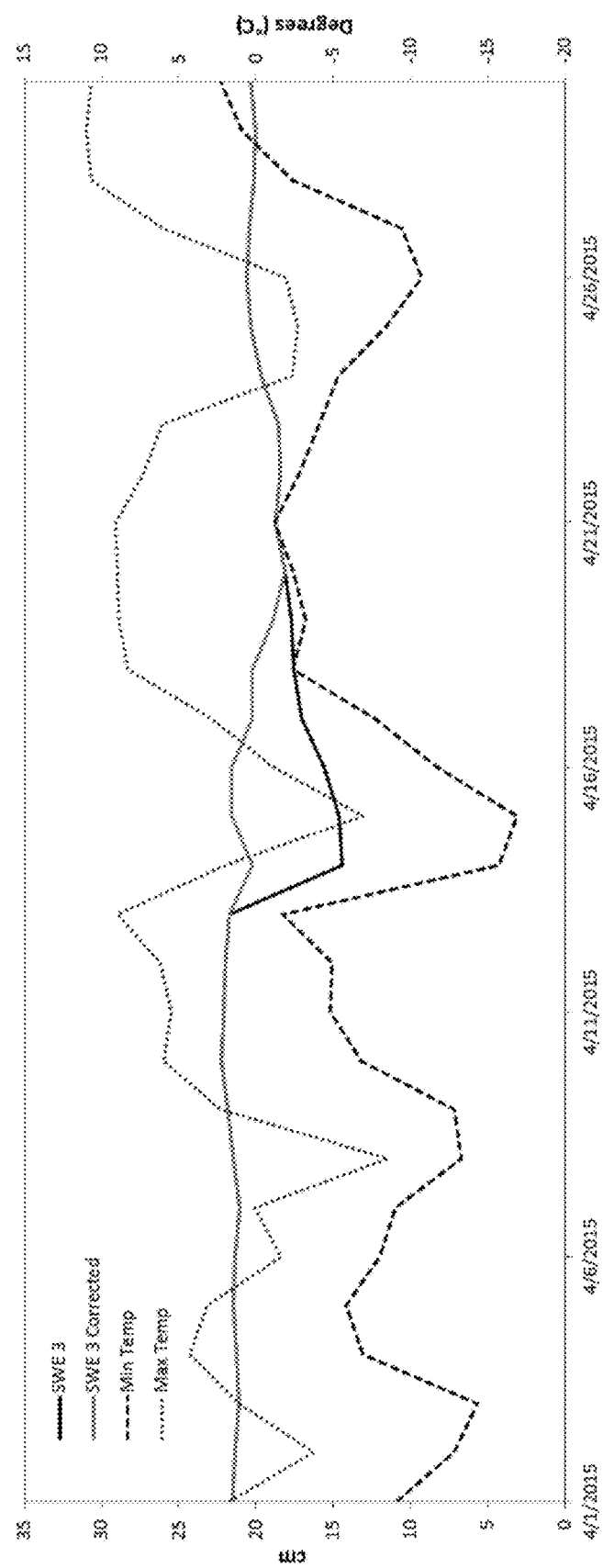
FIG. 39 is a replicate of FIG. 38 with data error corrections.

Sensor errors caused by physical properties of the snow are the most common errors incurred by ground based pressure sensors and were observed in several sensors during this study, usually accompanied with sudden temperature change. All the observed errors caused by snow bridging did resolve over time, on average within two weeks, with stabilized temperatures. This type of snow bridging is also common with metal bladder snow pillows used by the SNOTEL network, and they have the same recovery response after the temperature of snowpack increases. If necessary, gaps in data can be filled using the following equations, using snow depth measurements and a reference density measurement taken when the sensor error occurred (FIG. 39). FIG. 39 is a replicate of FIG. 38 with data error corrections. The inherent errors caused by physical properties of the snow have been well documented. That being said it is essential to make QA/QC assessments of all data and use equations when needed to correct erroneous data. Initial snow density is given by, $$SWE' = \frac{\rho_{ref}}{\rho_w} h_s \quad (4)$$

where $$\rho_{ref} = \frac{h_s}{SWE} \rho_w \quad (5)$$

Spatial Autocorrelation of SWE

Figure 40:
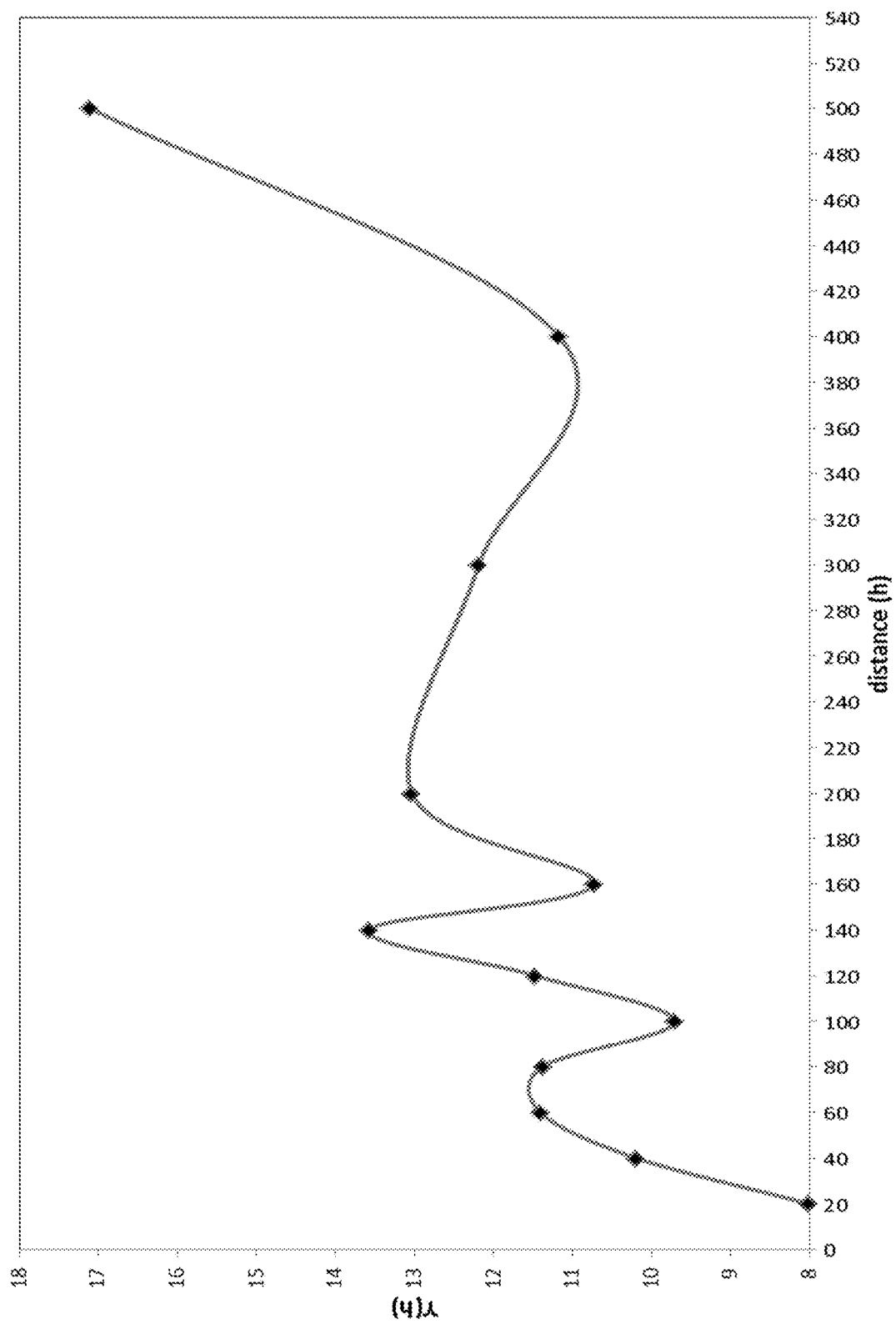
FIG. 40 is a semi-variogram of SWE using sixty manual core samples.
Figure 41:
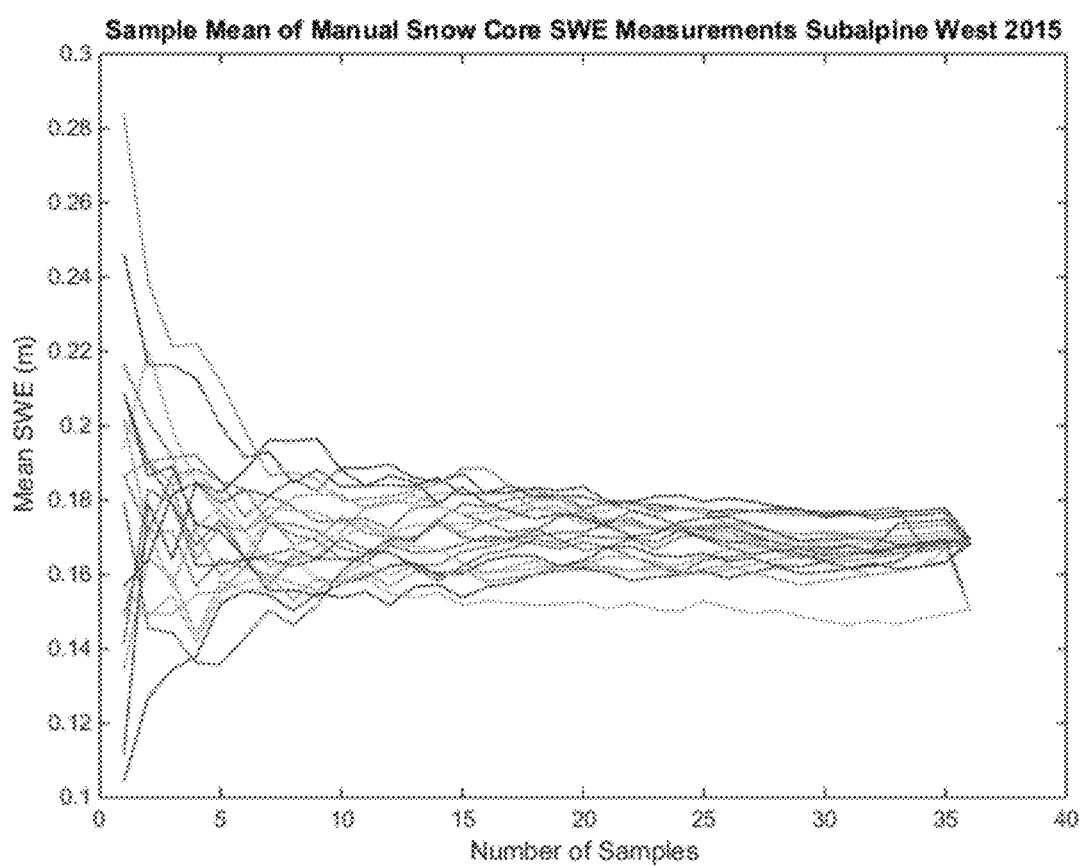
FIG. 41 is a statistical resampling of the sixty snow cores shown in FIG. 40.

A semi-variogram for SWE was calculated using sixty snow core samples taken on Mar. 21, 2015 at the Subalpine West site (FIG. 40). In FIG. 40, the low number of samples does not define the range of the semi-variogram very well but the sill is at 80 cm of lag distance for paired samples. This would agree with previous studies that found high variability in samples taken as close as one meter apart. Defining this correlation range is important in designing sample schemes and sensor networks to estimate watershed scale SWE. The x-axis is the distance of each sample pair and the y-axis is the calculated variance based on the sum of squares for each set of sample pairs. The lower variance ($\gamma(h)$) on the y-axis indicates similarity. Typically a semi-variogram reaches a sill, at which point measurements are considered spatially uncorrelated. The jump in distance from the origin is called the nugget and the range is the distance from the sill that data becomes negligible. For our purposes we used the sill as the distance at which samples become variable. The sill for these manual SWE samples is at 80 cm; anything past that threshold is considered noise or uncorrelated. Using the 80 cm correlation length, a Matlab code was programmed to perform statistical resampling to estimate the number of samples needed at that length to get within 10 percent of the seventy five meter transect population mean. Results of statistical resampling show that it takes roughly ten independent samples to get within 10% of the transect population mean ($\approx 0.17$ m) at the Subalpine West site (FIG. 41). FIG. 41 shows results of statistical resampling of the sixty snow cores taken at the Subalpine West site in March 2015. A simple model was run using the correlation length of 80 cm to estimate how many samples would be needed at a minimum of that distance to get within 10% of the population mean that was $\approx 0.17$ m of SWE. The results show that in order to get a measurement of average SWE in a seventy five meter plot you would need to take at least ten samples. Sampling schemes for watershed and larger areas would need to have multiple SWE samples in order to estimate both SWE and density for further estimations. As SWE is directly related to both depth and density, the correlation length of 80 cm support findings from previous studies that suggest variability in manual snow density samples taken within 1-10 meters and that depth has a much higher variability over multiple samples than density, so as the sample lengths go beyond 80 cm there is unrelated variability. This length becomes important when considering estimation of SWE at the plot scale as well as over larger watershed areas using ground based measurements for verification.

Spatial Variability of Depth, Density and SWE

Figure 42:
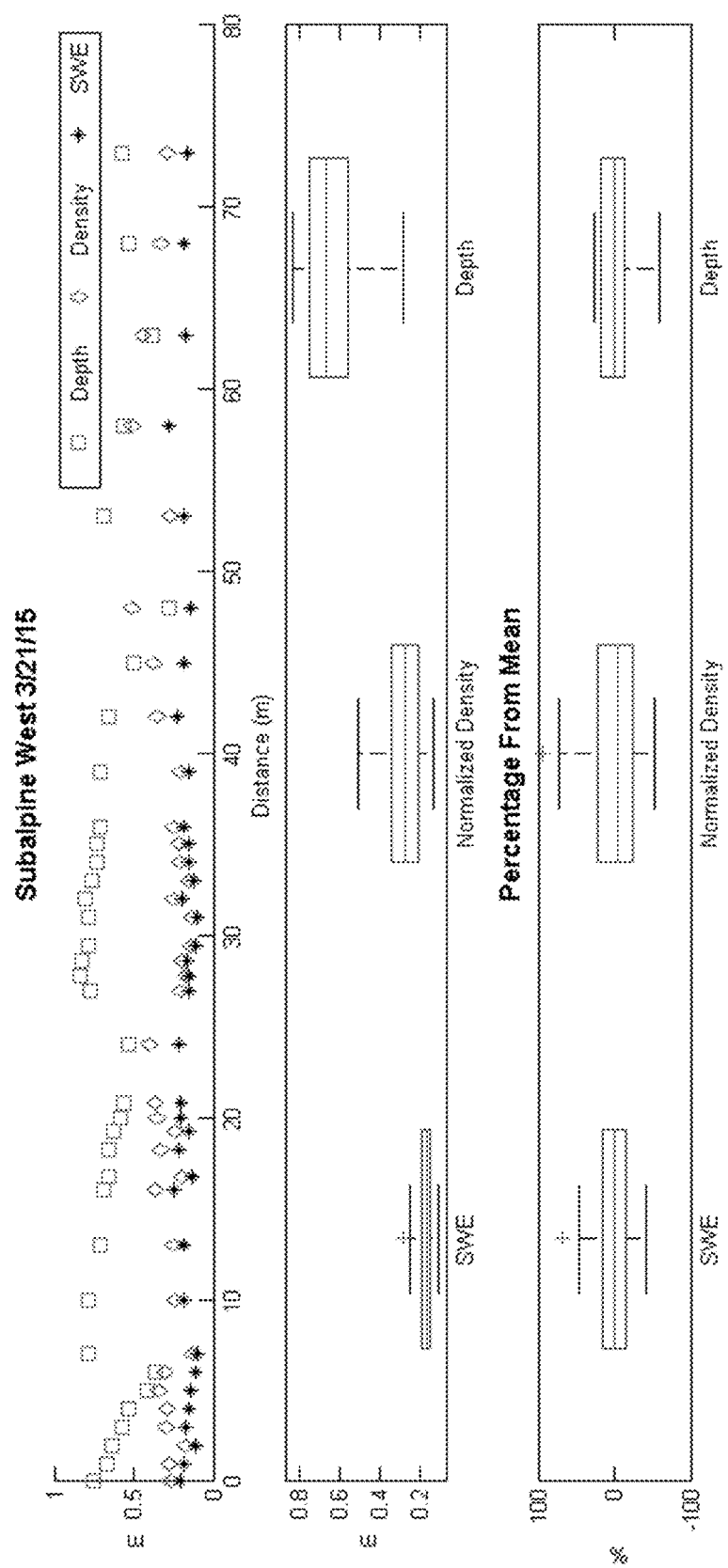
FIG. 42 are a graph and boxplots showing depth, density and SWE for thirty six snow core samples.

Knowing that the components of SWE measurement are depth and normalized density of snow, each component's effect on SWE was examined in conjunction with the spatial variability of the snowpack. The manual core samples, taken from 20 cm to 5 m apart, over two winter seasons was used to show the spatial variability of SWE. The coefficient of variation of SWE from the sixty samples taken in March 2015 at Subalpine West was 22.34%, with a maximum of 28.3 cm and a minimum 9.7 cm. Depth and density were examined to estimate their effect on SWE. The depth values had a coefficient of variability of 19% with a depth between 85 cm and 28 cm, and density had a coefficient of variation of 33% with normalized density (unit-less) between 0.51 and 0.12. Depth has a larger range of values and had a higher standard deviation at 0.13 than density at 0.09. FIG. 42 displays the spatial variability of SWE and its two components, snow depth and normalized density using the 80 cm threshold estimated by the semi-variogram to avoid skewing the data based on autocorrelation. Depth has a greater absolute value than density; however density is more variable when looking at the change from the percentage from the mean. FIG. 42 shows depth, density and SWE for the thirty six snow core samples that are within the correlation range of 80 cm are graphed in the top section. In general as depth decreases, density increases. The second graph is a boxplot showing the mean in red and one standard deviation in the box, while the whiskers indicate the upper and lower range to three standard deviations (red crosses outside the whiskers are considered outliers). The depth has a larger range of absolute values and thus a larger range of variability, but when the three components are looked at as the range of percentage from the mean (lower box) then the density has a higher variability and thus a greater effect on the SWE value. The idea that density matters has an important effect on SWE measurement, as depth measurements outnumber density measurements 30:1 but estimating SWE based on depth measurements alone can be misleading.

Figure 43:
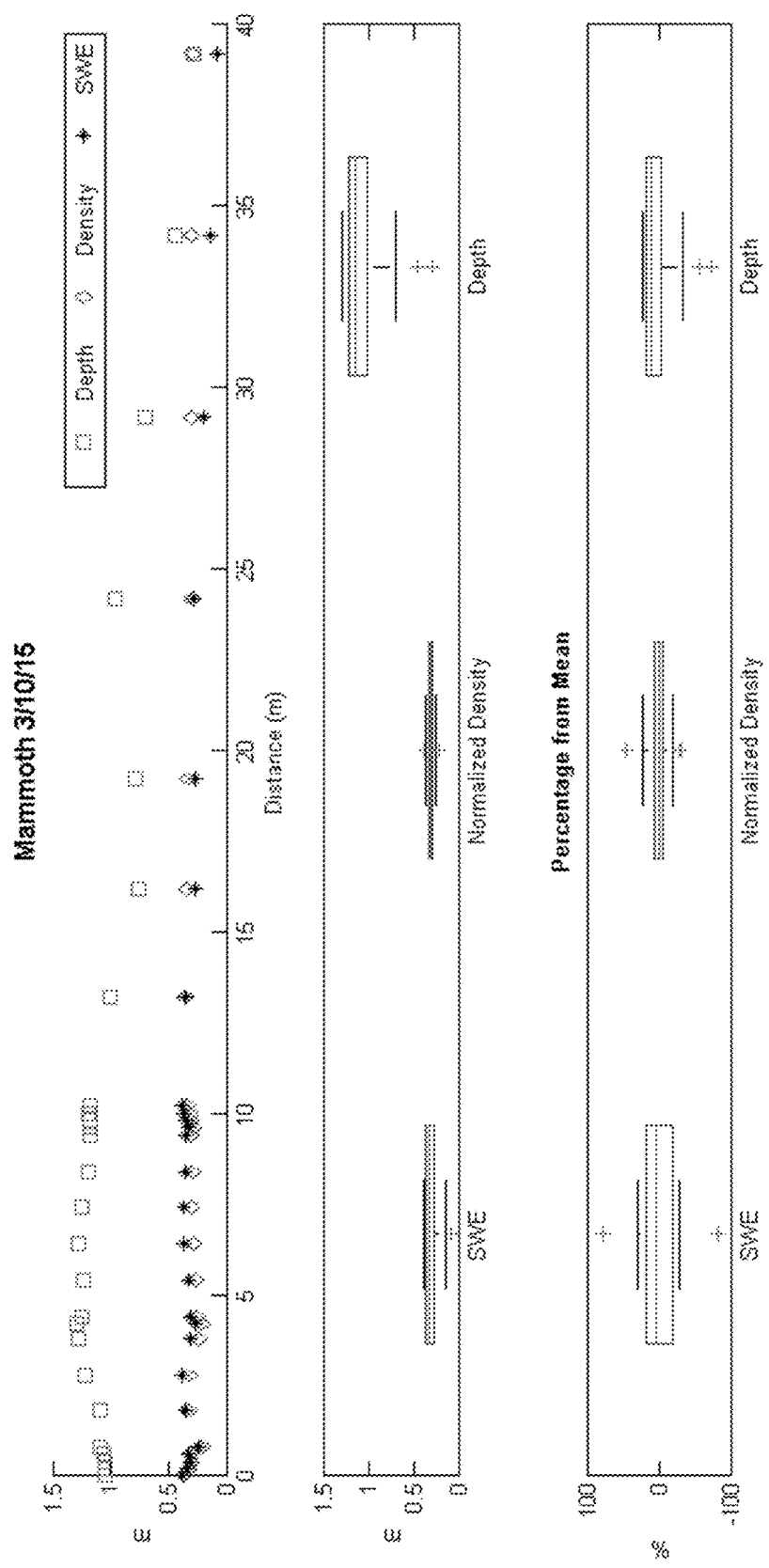
FIG. 43 is depth and density data from a site transect.

The Mammoth site did not have a long enough fetch to acquire enough core samples to define a semi-variogram. The twenty seven samples were taken over thirty nine meters in March 2015 had a coefficient of variation of 25.32% for SWE, 24.29% for depth and 15.52% for density. SWE varied between 38 cm and 8 cm, depth was between 28 cm and 1.30 m, and normalized density was between 0.44 and 0.21. The standard deviation was much higher for depth at 0.25 than density at 0.05. This is also reflected in the difference from the percentage of the mean (FIG. 43). FIG. 43 is data from the CUES site transect, which began at in-between SWE 3 and the snow pillow and continued the length of the study site using the same sample scheme as Subalpine West (0.2 m-5 m sample distances). Looking at the depth, density and SWE in the upper box it is clear that the depth declined drastically at the eastern side of the transect. The density at this site had less variability as was expected in the "homogenous" setting, and SWE was less variable overall as well. This result was expected as this site was chosen to represent a homogenous area. Most likely the correlation length for samples would be larger than the forested setting of the NevCAN study site. Most important is the clear effect of micro-topography on the snowpack as the depths became very shallow within the open snow field proving that depth can have a much greater variability in all settings.

Figure 44:
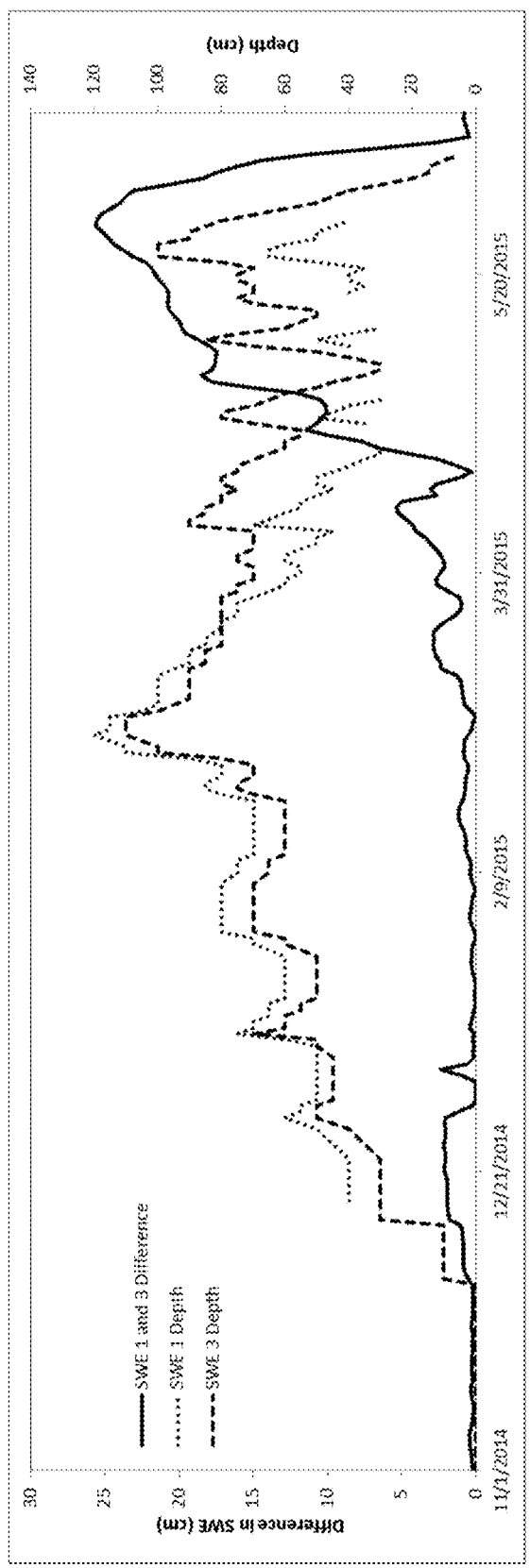
FIG. 44 is the difference in SWE between sensors located less than 2 m apart.
Figure 45:
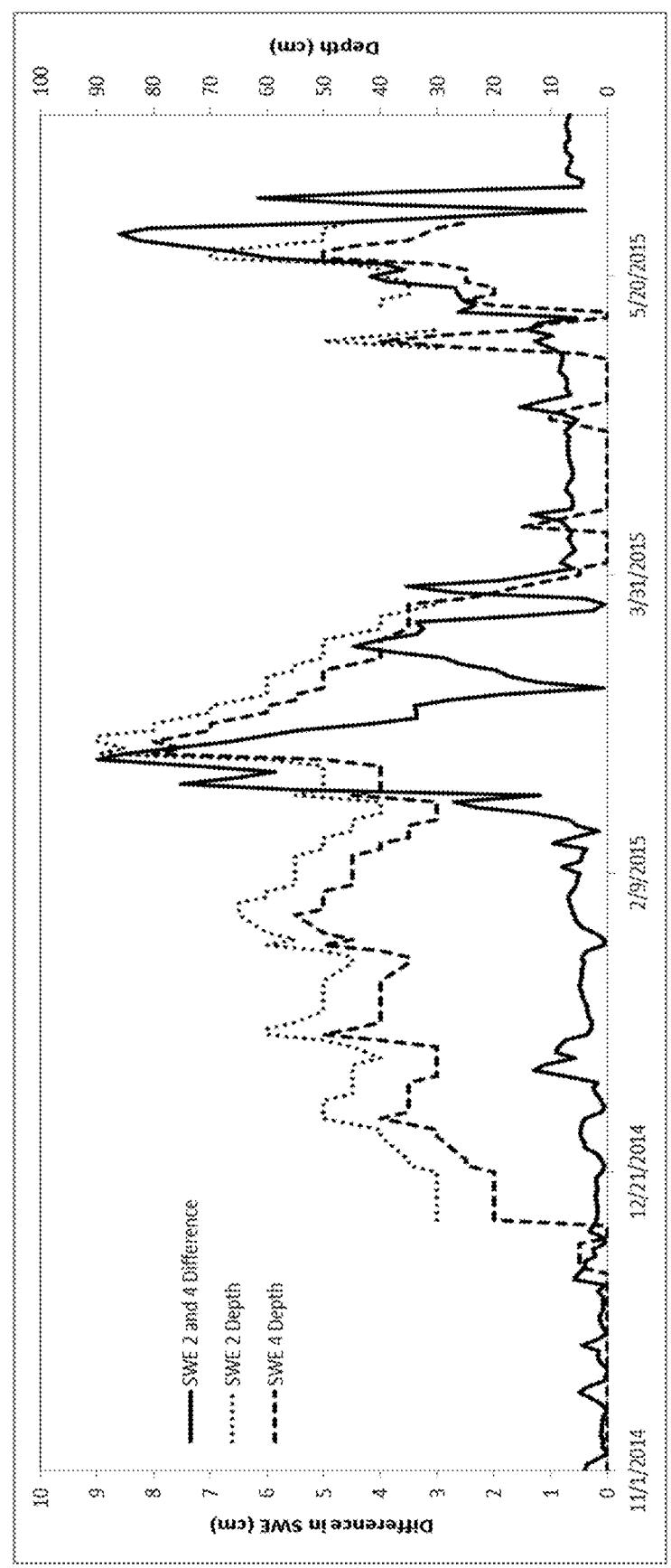
FIG. 45 is SWE and depth data for a sun-exposed sensor pair.

Spatial variability was also observed in the pressure sensor SWE measurements from both Subalpine West and Mammoth in sensors varying from 10 m to <2 m apart (see FIGS. 24 and 32). Higher variability between sensors developed during the melt phase process (FIGS. 44 and 45). FIG. 44 depicts the difference in SWE between sensors located <2 m apart. The depth profile shows melt processes. This graph is of sensors located in the protected shade area at Subalpine West. Snow accumulation and melt were less variable throughout the season. Daily photos show complete melt out on the northern most plate while the other plate was still completely covered, thus the large increase in differences in SWE from April through melt out. FIG. 45 shows that the variability was much higher in the sun exposed sensor pair due to greater fluctuation in the snowpack. Melt from late January to mid-February and again in late February created differences between the sensors varying from 4.5 to 9 cm of SWE. Late season intermittent snowpack after the early April melt out also caused large differences of up to 8.5 cm of SWE between the sensors. This result leads to the confidence in the sensor measurements accuracy and lack of errors in this phase. Differences in SWE were calculated for the complete time series between the co-located pairs of sensors at the Subalpine West site. The shade protected sensors had smaller seasonal differences until melt off when the northern most sensor (SWE 1) became snow free much sooner than SWE 3 which was slightly downslope and closer to the trees. This created a difference of up to 20 cm of SWE from the sensors. The low r-squared value (0.03) for this set of sensors during melt phase agrees with this assessment as the high r-squared value of 0.97 from the accumulation to peak shows the steady agreement with small difference in SWE until melt. The differences between the sun exposed pair of sensors is much more volatile as the melt phase happened earlier and more often due to the higher than normal seasonal temperatures and low snowpack. As the sensors experienced larger fluctuation so did the differences between the sensors. Although this pair had better statistical agreement of melt timing with an r-squared value of 0.75, they showed differences of up to 9 cm of SWE at times during the multiple melt phases. The high variability of snow ablation in forested areas is well known and studied, thus giving no reason to think these differences are due to sensor errors. Again this concept supports the need for multiple measurements of SWE during all phases of snow pack evolution in order to make plot to watershed scale estimates of water equivalent.

Temporal Variability of Depth, Density, and SWE

Figure 46:
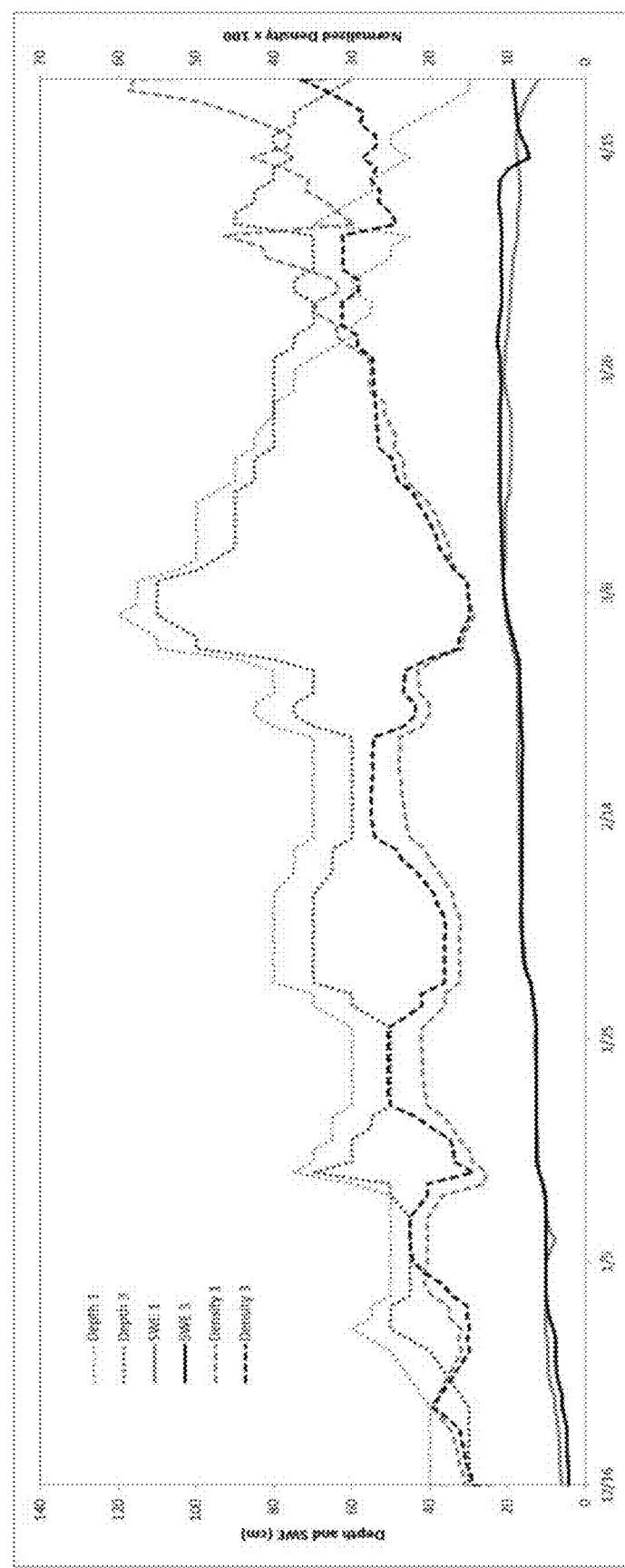
FIG. 46 is the SWE, density, and depth data for a shade-protected SWE sensor pair.
Figure 47:
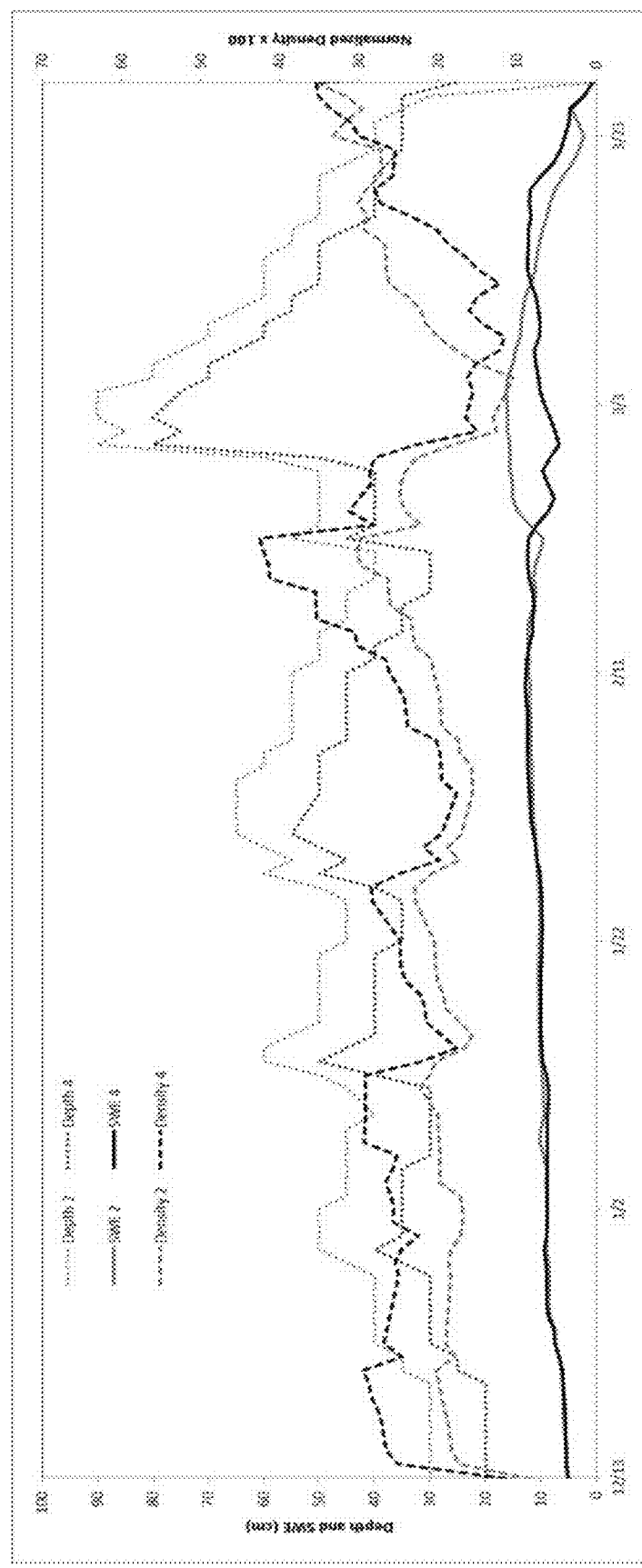
FIG. 47 is depth and SWE data for a sun-protected pair of SWE sensors.

Manual SWE samples give a measurement of depth, density and SWE at one point in time. The pressure sensor data produces a time series that shows the temporal variability of SWE. More detailed temporal changes can be observed using continuous depth measurements along with the pressure sensors. Using the depth measurements, snow density can be calculated. It is the density values that are lacking in snow measurement as a whole. Examining the pressure sensor data from Subalpine West, (FIGS. 46 and 47) it shows that depth and density can change quite a bit over the season as well as fluctuate at times while SWE remains relatively stable. As a rule, as depth decreases, density increases and as the snowpack metamorphoses over time it compacts holding the melted snow water like a sponge. FIG. 46 shows the fluctuation of depth and density of the snowpack on the shade protected sensors. As stated previously, these sensors had greater measurement stability as there was less impact of direct solar radiation that initiates increased melt and less wind effect on the snow distribution compared to the sun exposed pair of sensors. The stability shows a nice relationship between the depth and the density as the previous decreases while the latter increases. The normalized density shown as a percentage of water $$\left(\frac{\rho_{snow}}{\rho_{water}} \times 100\right)$$

of the downslope (SWE 3) sensor measurement fluctuated over 250% between 14.48% and 36.66% and the upslope (SWE 1) sensor 380% between 15.60% and 58.70%. SWE1 showed the highest density as it was closer to being melted out in the time period shown and thus most likely absorbed the greatest amount of water from the surrounding snowpack. At the bottom of the graphic is the SWE measurement over the same time period. Note that the SWE does not fluctuate with the same magnitude of the depth and density for SWE 1, as it fluctuated from 6.24 cm to 12.02 cm of water equivalent. More interesting is the fluctuation in SWE 1 compared to density during the middle of the winter from Jan. 13, 2015 to Feb. 21, 2015. During this time period the SWE increased by 35% from 12.02 cm to 16.25 cm whereas the density fluctuated by 80% from 14.41% to 27.22%, but the key is that it fluctuated through high density and low density in conjunction with the storm and melt cycles. This observation is the important point made by studies looking at the variability and lack of snow density measurement and its effects on large scale SWE estimation. As model estimations of SWE are becoming more important, as the need for watershed and basin scale SWE rise in both water balance projections and popularity among water management decision makers, models based on depth measurements are not accounting for much of the seasonal changes in density. Furthermore, density in lower snowpack drought years does not fluctuate in normal seasonal patterns with stabilized measurements in early, middle and melt phase. FIG. 46 depicts data for a shade protected SWE sensor pair at Subalpine West, Snake Range, Nev. The fluctuation in depth and density over the winter months follow the storm and metamorphosis cycles. Though there are fluctuations of over 80% in density between mid-January and late February SWE only increased 30%. This type of density fluctuation shows the importance of measuring density for larger scale SWE estimations based on depth measurements. FIG. 47 shows the sun exposed sensor pair SWE with the depth and density profile. This set of sensors shows an even more pronounced pattern of large fluctuation in density than the shade protected pair due to continual metamorphosis of the snowpack. Density for SWE 2 fluctuated 400% between 8.94% and 35.52% and 350% for SWE 4 between 12.12% and 42.56%. This clearly shows the plot scale variability in snowpack as these two sensor pairs are less than 10 meters from each other as the change in density is greater in the exposed pair and the SWE is measured over 6 cm greater in the shade protected pair. More importantly these changes in density did not follow the traditional seasonal patterns of early, middle and melt, but instead the density and depth fluctuated over time during both early and middle season and did not just increase with the end of season melt phase. FIG. 47 data is for the Sun protected pair of SWE sensors with depth and density profiles from Subalpine West study site. These sensors show a more pronounced pattern of fluctuations in density measurements with SWE 2 changing over 400% and SWE 4 changing 380%. More important is the difference in both the amount of SWE and fluctuations in density show the high variability in plot scale measurement of snowpack as these sensors are less than 10 meters from the shade protected sensor pair profiled in FIG. 46.

Figure 48:
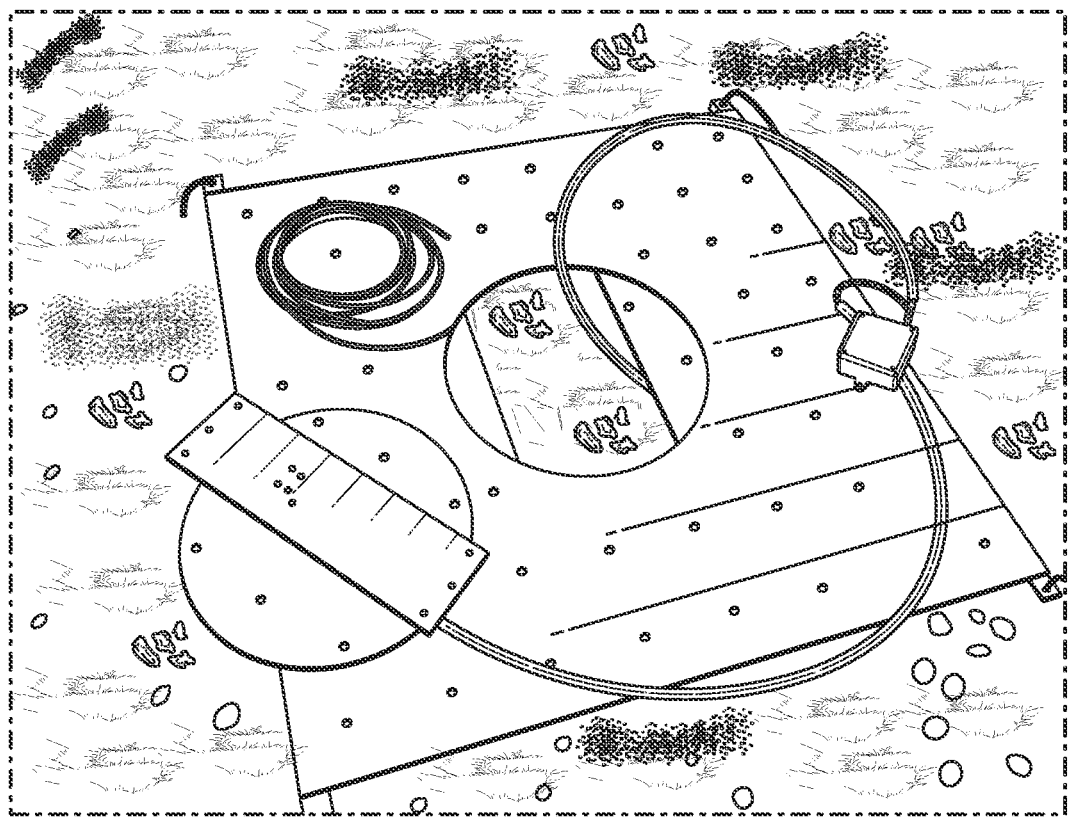
FIG. 48 is a photograph of an exemplary embodiment of the SWE sensor described herein.

FIG. 48 depicts an exemplary SWE sensor in accordance with the concepts discussed herein. As shown in FIG. 48, two lower plates may be suspended below the inert plate. These lower plates may be largely parallel to one another, with a space between them. When in use, the weight plate and pressure sensor may rest or be mounted on the two lower plates that suspend below the inert plate. In this manner, the pressure sensor may be elevated off of the ground.

As shown in FIG. 48, the weight plate and pressure sensor may be joined together and may, as a unit, be separable from the surrounding inert plate. In this manner, a malfunctioning, dirty, or defective pressure sensor may be removed without removal of the entire unit. Thus, for example, a structure supporting each weight plate that is, in turn, coupled to a surface of the inert plate (e.g., one or both of the lower parallel plates) can be sized such that it can be removed through the opening provided by the inert plate.

FIG. 48 also illustrates perforations that may be made on both the inert plate and the weight plate in order to, e.g., facilitate drainage. FIG. 48 further illustrates how the exemplary SWE sensor unit may be held in place by mounting holes placed in each corner, through which stakes or other maintaining implements may be placed.

FIG. 48 illustrates a square inert plate that is roughly four feet on a side. See also FIG. 5. However, alternative embodiments may use larger or smaller inert plates, but preferably such plates are between about 3-5 feet on a side. In addition, the shape of the inert plate can vary including, e.g., to account for local or specific terrain or geographic features. Preferably the edges of the weight plate and inert plate are complementary, such that the gap between the two structures is generally the same size along the entire perimeter of the weight plate. In a preferred embodiment, the edges of the weight plate are rounded, such as the circular edges shown in FIGS. 5 and 48.

The weight plate shown in FIG. 48 is circular and roughly eighteen inches in diameter. The size of the weight plate can vary; however, the circular weight plates preferably has a diameter of about 12-24 inches, and more prefer 18-22 inches, and, more preferably still between about 18-20 inches.

Using the SWE sensors described herein, spatial variability of snowpack can be observed over time at the same scales as the manual core sample studies, and with significantly less effort. Several methods, including laboratory tests and field comparisons to other measurement devices validated the measurement response and accuracy of the SWE sensor. A wide range of SWE variability was also measured when using manual snow cores to validate the pressure sensors. An experimental plan using the core samples was carried out to estimate how many measurements, and at what interval, would be needed to estimate a mean SWE at the plot scale. Results show that at least ten independent samples are needed at a distance of 80 cm or greater to get within 10% of the actual measured SWE at Subalpine West, which is a forested mountain study site. The high variability of snowpack is affected by the aspect, exposure and micro-topographical changes that are typical to the mountainous regions where a majority of the snow falls in the western United States. The placement of the sensors at the Subalpine West site and CUES site show how micro-topography changes coupled with wind redistribution and aspect can affect the depth and density of snow and thus the SWE. All of the SWE sensors in this study showed both spatial and temporal variability. With this in mind, both SWE sensor data and manual snow core results suggest that multiple ground based measurements must be taken to make plot to watershed scale SWE estimations.

Depth measurements outnumber density measurements 30:1, but only using depth measurements for SWE estimations using density models can be misleading. Density models like these are based on monthly density measurements and results of this study show density fluctuating up to 400% within the season and sometimes over 100% in a given month. More important is the ratio of density to depth measurements. For example, in the western United States the MRCS and CWDR typically take snow course measurements twice a season and in some cases only once around April 1, meaning many areas might only get one density measurement over a season. This can lead to large overestimation of SWE based on the limited data. This validates the idea that density must be measured due to the depth/density/SWE relationship and more density measurements can help validate larger SWE models estimations.

In view of the many possible embodiments to which the principles of the disclosed invention may be applied, it should be recognized that the illustrated embodiments are only preferred examples of the invention and should not be taken as limiting the scope of the invention.

We claim:

1. A system for determining snowpack characteristics, comprising:
    a weight plate;
    at least one pressure sensor coupled to the weight plate; and
    an inert plate surrounding the weight plate, the inert plate having an opening that receives the weight plate;
    a first metal plate and a second metal plate that is spaced-apart from the first metal plate, the first and second metal plates supporting the inert plate, and the first and second metal plates being suspended below the inert plate,
    wherein the weight plate and the inert plate are laterally spaced apart from one another to provide a first gap therebetween, the weight plate having a perimeter and the first gap extends the entirety of the perimeter of the weight plate,
    wherein the weight plate and the at least one pressure sensor are supported by a third metal plate, the third metal plate being removably secured to the first and second metal plates, and
    wherein the third metal plate, weight plate, and the at least one pressure sensor are configured to be installed and removed as a unit through the opening in the inert plate.

2. The system of claim 1, wherein the weight plate and inert plate are aluminum.

3. The system of claim 1, wherein the two spaced-apart plates are parallel to one another.

4. The system of claim 1, wherein the first and second metal plates are attached to the inert plate and are suspended below the inert plate.

5. The system of claim 1, wherein the weight plate and inert plate contains holes to allow for liquid drainage.

6. The system of claim 1, wherein the inert plate contains anchoring holes in one or more corners.

7. The system of claim 1, wherein the weight plate is a circular plate between 12-24 inches in diameter.

8. The system of claim 1, wherein the weight plate is less than ½ inches thick.

9. The system of claim 1, wherein the at least one pressure sensor comprises a strain gauge loadcell.

10. The system of claim 1, wherein the at least one pressure sensor comprises a single point resistive loadcell.

11. The system of claim 1, wherein the weight plate and inert plate collectively have an area that is between 10 and 20 square feet.

12. The system of claim 1, further comprising a data logger.

13. The system of claim 1, wherein the weight plate has a top surface that extends from a first side to a second side of the weight plate and the top surface sits below an upper surface of the inert plate.

* * * * *